(12) United States Patent
Knight et al.

(10) Patent No.: US 8,749,620 B1
(45) Date of Patent: Jun. 10, 2014

(54) 3D LIGHT FIELD CAMERAS, IMAGES AND FILES, AND METHODS OF USING, OPERATING, PROCESSING AND VIEWING SAME

(75) Inventors: Timothy J. Knight, Palo Alto, CA (US); Colvin Pitts, Snohomish, WA (US); Yi-Ren Ng, Redwood City, CA (US); Alex Fishman, San Jose, CA (US)

(73) Assignee: Lytro, Inc., Mountain View, CA (US)

( * ) Notice: Subject to any disclaimer, the term of this patent is extended or adjusted under 35 U.S.C. 154(b) by 333 days.

(21) Appl. No.: 13/027,946

(22) Filed: Feb. 15, 2011

Related U.S. Application Data

(60) Provisional application No. 61/306,464, filed on Feb. 20, 2010.

(51) Int. Cl.
| | |
|---|---|
| *H04N 13/02* | (2006.01) |
| *H04N 3/04* | (2006.01) |
| *H04N 13/00* | (2006.01) |
| *H04N 13/04* | (2006.01) |
| *H04N 1/04* | (2006.01) |

(52) U.S. Cl.
CPC ....... *H04N 13/0011* (2013.01); *H04N 13/0418* (2013.01); *H04N 2201/02493* (2013.01); *H04N 1/0429* (2013.01); *H04N 3/04* (2013.01)
USPC .......................................................... 348/49

(58) Field of Classification Search
None
See application file for complete search history.

(56) References Cited

U.S. PATENT DOCUMENTS

| | | | |
|---|---|---|---|
| 725,567 A | 4/1903 | Ives | |
| 4,383,170 A | 5/1983 | Takagi et al. | |
| 4,661,986 A | 4/1987 | Adelson | |
| 4,694,185 A | 9/1987 | Weiss | |
| 4,920,419 A | 4/1990 | Easterly | |
| 5,076,687 A | 12/1991 | Adelson | |

(Continued)

FOREIGN PATENT DOCUMENTS

| | | |
|---|---|---|
| DE | 19624421 | 6/1996 |
| WO | 03052465 | 6/2003 |

(Continued)

OTHER PUBLICATIONS

Adelson et al , "Single Lens Stereo with a Plenoptic Camera" IEEE Translation on Pattern Analysis and Machine Intelligence, Feb. 1992. vol. 14, No. 2, pp. 99-106.

(Continued)

*Primary Examiner* — Dave Czekaj
*Assistant Examiner* — Tyler W Sullivan
(74) *Attorney, Agent, or Firm* — Raubvogel Law Office

(57) ABSTRACT

A 3D stereo image of a scene is generated by generating first image data of the scene using light field data representing light rays from a first direction, and second image data of the scene using light field data representing light rays from a second direction. The 3D stereo image of the scene is then generated using the first image data and the second image data. A microlens array may be used to direct light rays onto a photosensor array, wherein each microlens of the microlens array includes a physical aperture which correlates to a plurality of associated photosensors, a first virtual aperture which correlates to a first subset of the associated photosensors, and a second virtual aperture which correlates to a second subset of the associated photosensors. Each virtual aperture thus provides light rays from a different direction for use in generating the 3D stereo image.

35 Claims, 43 Drawing Sheets

(56) References Cited

U.S. PATENT DOCUMENTS

| | | | |
|---|---|---|---|
| 5,282,045 | A | 1/1994 | Mimura et al. |
| 5,610,390 | A | 3/1997 | Miyano |
| 5,748,371 | A | 5/1998 | Cathey, Jr. et al. |
| 5,757,423 | A | 5/1998 | Tanaka et al. |
| 5,949,433 | A | 9/1999 | Klotz |
| 6,023,523 | A * | 2/2000 | Cohen et al. ............. 382/154 |
| 6,028,606 | A | 2/2000 | Kolb et al. |
| 6,061,083 | A * | 5/2000 | Aritake et al. ............. 348/51 |
| 6,097,394 | A | 8/2000 | Levoy et al. |
| 6,201,899 | B1 | 3/2001 | Bergen |
| 6,320,979 | B1 | 11/2001 | Melen |
| 6,483,535 | B1 | 11/2002 | Tamburrino et al. |
| 6,577,342 | B1 | 6/2003 | Wester |
| 6,597,859 | B1 | 7/2003 | Leinhart et al. |
| 6,842,297 | B2 | 1/2005 | Dowski, Jr. et al. |
| 6,900,841 | B1 | 5/2005 | Mihara |
| 6,927,922 | B2 | 8/2005 | George et al. |
| 7,034,866 | B1 | 4/2006 | Colmenarez et al. |
| 7,336,430 | B2 | 2/2008 | George |
| 7,620,309 | B2 | 11/2009 | Georgiev |
| 7,623,726 | B1 | 11/2009 | Georgiev |
| 7,936,392 | B2 * | 5/2011 | Ng et al. ............. 348/349 |
| 7,949,252 | B1 * | 5/2011 | Georgiev ............. 396/334 |
| 8,155,478 | B2 | 4/2012 | Vitsnudel et al. |
| 8,290,358 | B1 * | 10/2012 | Georgiev ............. 396/326 |
| 2002/0159030 | A1 | 10/2002 | Frey et al. |
| 2003/0103670 | A1 | 6/2003 | Schoelkopf et al. |
| 2003/0117511 | A1 | 6/2003 | Belz et al. |
| 2003/0156077 | A1 | 8/2003 | Balogh |
| 2004/0114176 | A1 | 6/2004 | Bodin et al. |
| 2004/0257360 | A1 | 12/2004 | Sieckmann |
| 2005/0080602 | A1 | 4/2005 | Snyder et al. |
| 2006/0082879 | A1 * | 4/2006 | Miyoshi et al. ............. 359/462 |
| 2006/0130017 | A1 | 6/2006 | Cohen et al. |
| 2006/0285741 | A1 * | 12/2006 | Subbarao ............. 382/154 |
| 2007/0071316 | A1 | 3/2007 | Kubo |
| 2007/0097206 | A1 * | 5/2007 | Houvener et al. ............. 348/26 |
| 2007/0230944 | A1 | 10/2007 | Georgiev |
| 2007/0252074 | A1 | 11/2007 | Ng et al. |
| 2008/0007626 | A1 | 1/2008 | Wernersson |
| 2008/0018668 | A1 | 1/2008 | Yamauchi |
| 2008/0131019 | A1 | 6/2008 | Ng |
| 2008/0152215 | A1 | 6/2008 | Horie et al. |
| 2008/0180792 | A1 | 7/2008 | Georgiev |
| 2008/0187305 | A1 | 8/2008 | Raskar |
| 2008/0193026 | A1 | 8/2008 | Horie et al. |
| 2008/0226274 | A1 | 9/2008 | Spielberg |
| 2008/0232680 | A1 * | 9/2008 | Berestov et al. ............. 382/154 |
| 2008/0266655 | A1 | 10/2008 | Levoy et al. |
| 2008/0309813 | A1 | 12/2008 | Watanabe |
| 2009/0027542 | A1 | 1/2009 | Yamamoto et al. |
| 2009/0041381 | A1 | 2/2009 | Georgiev et al. |
| 2009/0041448 | A1 | 2/2009 | Georgiev et al. |
| 2009/0102956 | A1 | 4/2009 | Georgiev |
| 2009/0128658 | A1 | 5/2009 | Hayasaka et al. |
| 2009/0128669 | A1 | 5/2009 | Ng et al. |
| 2009/0140131 | A1 | 6/2009 | Utagawa |
| 2009/0185801 | A1 | 7/2009 | Georgiev et al. |
| 2009/0268970 | A1 * | 10/2009 | Babacan et al. ............. 382/232 |
| 2009/0273843 | A1 | 11/2009 | Raskar |
| 2009/0295829 | A1 | 12/2009 | Georgiev et al. |
| 2010/0026852 | A1 | 2/2010 | Ng et al. |
| 2010/0111489 | A1 * | 5/2010 | Presler ............. 386/52 |
| 2010/0128145 | A1 | 5/2010 | Pitts et al. |
| 2010/0129048 | A1 | 5/2010 | Pitts et al. |
| 2010/0141802 | A1 | 6/2010 | Knight et al. |
| 2010/0277629 | A1 | 11/2010 | Tanaka |
| 2011/0129165 | A1 | 6/2011 | Lim et al. |
| 2012/0050562 | A1 | 3/2012 | Perwass et al. |

FOREIGN PATENT DOCUMENTS

| | | |
|---|---|---|
| WO | 2006039486 | 4/2006 |
| WO | 2007092545 | 8/2007 |
| WO | 2007092581 | 8/2007 |

OTHER PUBLICATIONS

Agarwala, A., et al., "Interactive Digital Photomontage," ACM Transactions on Graphics, Proceedings of SIGGRAPH 2004, vol. 32, No. 3, 2004.

Jin-Xang Chai et al., "Plenoptic Sampling", ACM SIGGRAPH 2000, Annual Conference Series, 2000, pp. 307-318.

Dowski et al., "Wavefront coding: a modern method of achieving high performance and/or low cost imaging systems" SPIE Proceedings, vol. 3779.

Georgiev, T., et al., "Spatio-Angular Resolution Tradeoff in Integral Photography," Proceedings of Eurographics Symposium on Rendering, 2006.

Gortler et al., "The lumigraph" SIGGRAPH 96, pp. 43-54.

Haeberli, "A Multifocus Method for Controlling Depth of Field" GRAPHICA Obscura, 1994, pp. 1-3.

Isaksen, A., et al., "Dynamically Reparameterized Light Fields," SIGGRAPH 2000, pp. 297-306.

Ives, H., "Optical properties of a Lippman lenticulated sheet," J. Opt. Soc. Am. 21, 171 (1931).

Jackson et al., "Selection of a Convolution Function for Fourier Inversion Using Gridding" IEEE Transactions on Medical Imaging, Sep. 1991, vol. 10, No. 3, pp. 473-478.

Levoy, M., et al., "Light Field Microscopy," ACM Transactions on Graphics, vol. 25, No. 3, Proceedings SIGGRAPH 2006.

Levoy et al.,"Light Field Rendering" SIGGRAPH 96 Proceeding, 1996. pp. 31-42.

Levoy, "Light Fields and Computational Imaging" IEEE Computer Society, Aug. 2006, pp. 46-55.

Lippmann, "Reversible Prints", Communication at the French Society of Physics, Journal of Physics, 7 , Mar. 4, 1908, pp. 821-825.

Lumsdaine et al., "Full Resolution Lightfield Rendering" Adobe Technical Report Jan. 2008, pp. 1-12.

Naemura et al., "3-D Computer Graphics based on Integral Photography" Optics Express, Feb. 12, 2001. vol. 8, No. 2, pp. 255-262.

Ng, R., et al. "Light Field Photography with a Hand-Held Plenoptic Camera," Stanford Technical Report, CSTR 2005-2, 2005.

Ng, R., "Digital Light Field Photography," Dissertation, Department of Computer Science, Stanford University, Jun. 2006.

Ng., R., "Fourier Slice Photography," ACM Transactions on Graphics, Proceedings of SIGGRAPH 2005, vol. 24, No. 3, 2005, pp. 735-744.

Okano et al., "Three-dimensional video system based on integral photography" Optical Engineering, Jun. 1999. vol. 38, No. 6, pp. 1072-1077.

Sokolov, "Autostereoscopy and Integral Photography by Professor Lippmann's Method" , 1911, pp. 23-29.

Tanida et al., "Thin observation module by bound optics (TOMBO): concept and experimental verification" Applied Optics 40, Apr. 11, pp. 1806-1813.

Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.

Vaish et al., "Using plane + parallax for calibrating dense camera arrays", In Proceedings CVPR 2004, pp. 2-9.

Wilburn et al., "High Performance Imaging Using Large Camera Arrays", ACM Transactions on Graphics (TOG), vol. 24, Issue 3 (Jul. 2005), Proceedings of ACM SIGGRAPH 2005, pp. 765-776.

Adelson, E. H., and Bergen, J. R. 1991. The plenoptic function and the elements of early vision. In Computational Models of Visual Processing, edited by Michael S. Landy and Anthony Movshon. Cambridge, Mass.: mit Press.

Adobe, "Photoshop CS6 / in depth: Digital Negative (DNG)", http://www.adobe.com/products/photoshop/extend.displayTab2html. Retrieved Jan. 2013.

Georgiev, T., et al., Plenoptic Camera 2.0 (2008).

(56) References Cited

OTHER PUBLICATIONS

Georgiev, T., et al., "Unified Frequency Domain Analysis of Lightfield Cameras" (2008).
Mallat, Stephane, "A Wavelet Tour of Signal Processing", Academic Press 1998.
Nakamura, J., "Image Sensors and Signal Processing for Digital Still Cameras" (Optical Science and Engineering), 2005.
Ogden, J., "Pyramid-Based Computer Graphics", 1985.
Story, D., "The Future of Photography", Optics Electronics, Oct. 2008.
Portable Network Graphics format: http://en.wikipedia.org/wiki/Portable_Network_Graphics. Retrieved Jan. 2013.
Exchangeable image file format: http://en.wikipedia.org/wiki/Exchangeable_image_file_format. Retrieved Jan. 2013.
Extensible Metadata Platform: http://en.wikipedia.org/wiki/Extensible_Metadata_Platform. Retrieved Jan. 2013.
Compression standard JPEG XR: http://en.wikipedia.org/wiki/JPEG_XR. Retrieved Jan. 2013.
Methods of Variable Bitrate Encoding (http://en.wikipedia.org/wiki/Variable_bitrate#Methods_of_VBR_encoding). Retrieved Jan. 2013.
Lazy loading of image data (http://en.wikipedia.org/wiki/Lazy_loading). Retrieved Jan. 2013.
Key framing for video animation (http://en.wikipedia.org/wiki/Key_frame). Retrieved Jan. 2013.
Data overlay techniques for real-time visual feed. For example, heads-up displays (http://en.wikipedia.org/wiki/Head-up_display). Retrieved Jan. 2013.
Autofocus systems and methods (http://en.wikipedia.org/wiki/Autofocus). Retrieved Jan. 2013.
Williams, L., "Pyramidal Parametrics", Computer Graphics (1983).

* cited by examiner

Left/right stereo with smaller disparity: images will look "less" 3D

Left/right stereo with viewpoint shifted to the left

Left/right stereo

Portrait mode stereo, allowing a stereo image to be captured with camera held vertically (i.e.) with a 90 or 270 degree rotation about the optical axis

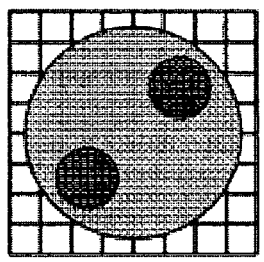

Virtual apertures chosen at an arbitrary angle, permitting stereo images to be generated from an arbitrarily rotated captured image

FIGURE 9G

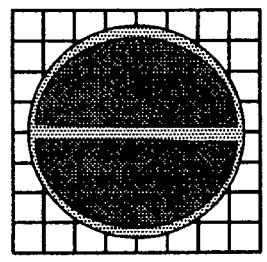

Left/right stereo using substantially all available pixels to reduce noise in refocused image

FIGURE 9H

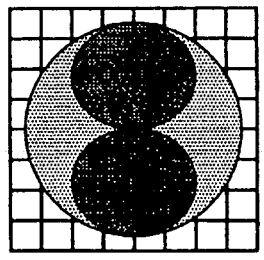

Left/right stereo with shallower depth of field: refocusing in 3D

FIGURE 9E

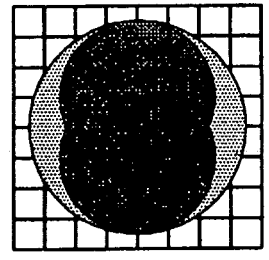

Left/right stereo with even shallower depth of field: virtual apertures may overlap

FIGURE 9F

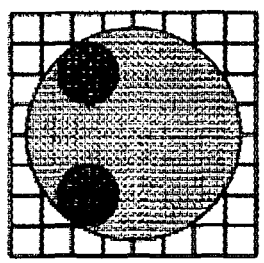
FIGURE 9I — Virtual apertures chosen to result in a "vertical" perspective shift

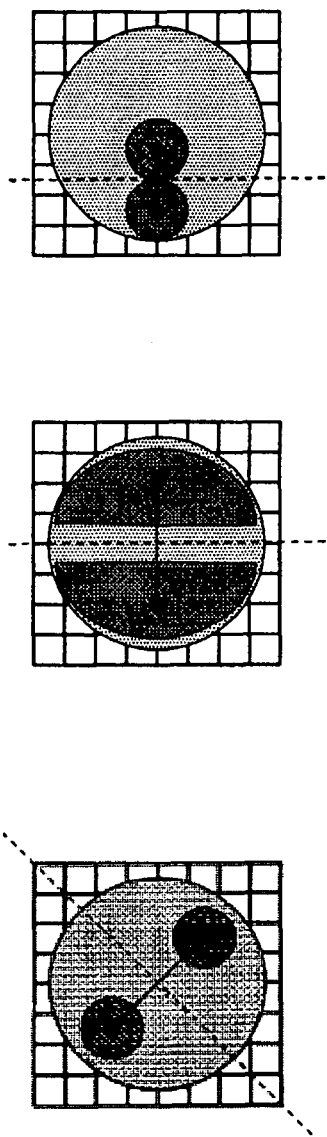

FIGURE 27A Right eye view, focused on nose.
FIGURE 27B Right eye view, extended depth of field.

Conceptual virtual apertures for stereoscopic extended depth of field.

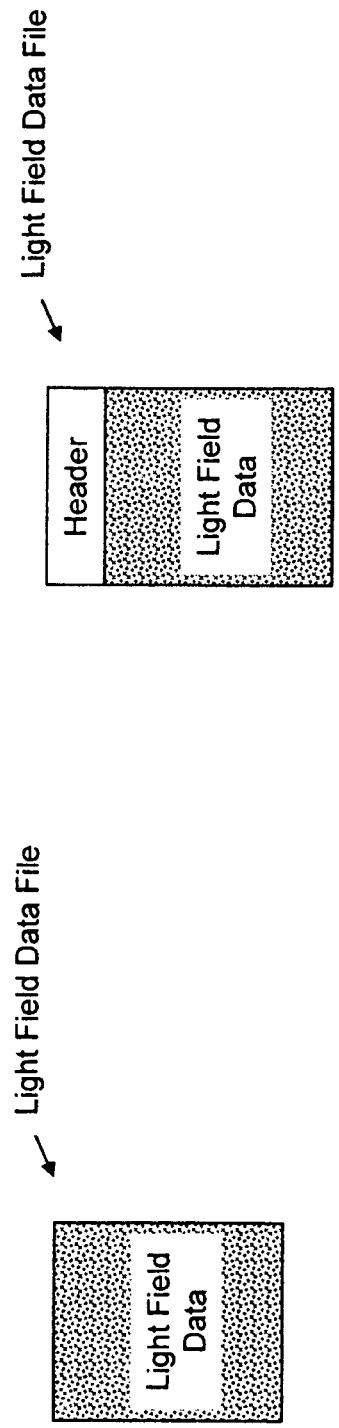

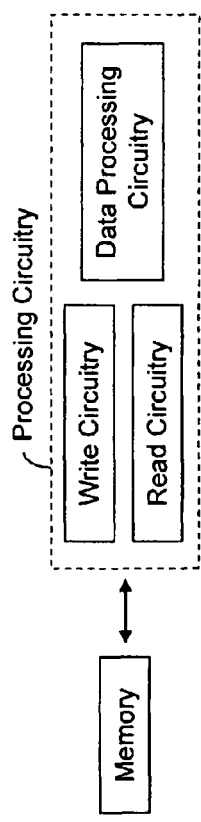
FIGURE 32G
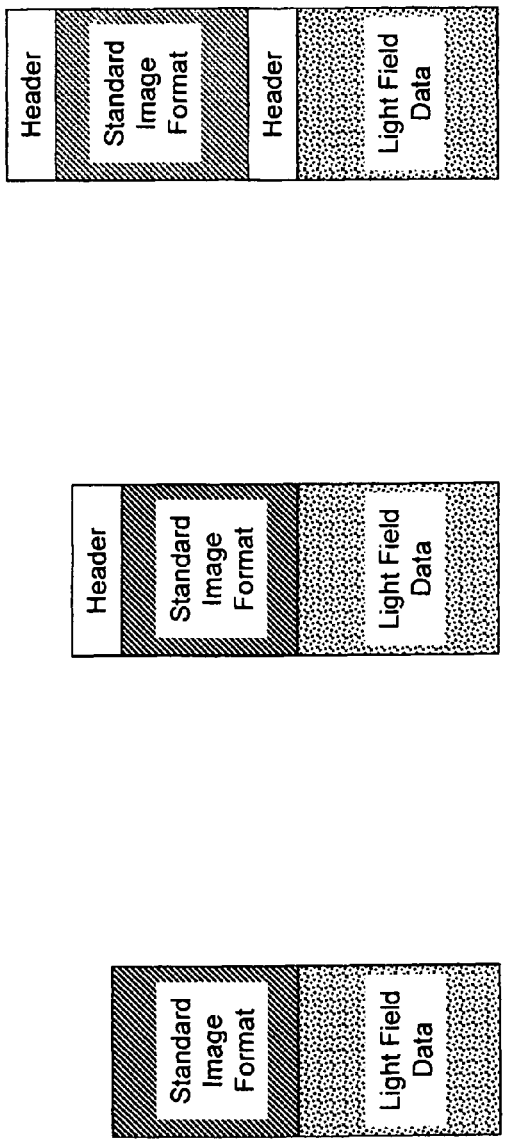
FIGURE 33C
FIGURE 33B
FIGURE 33A

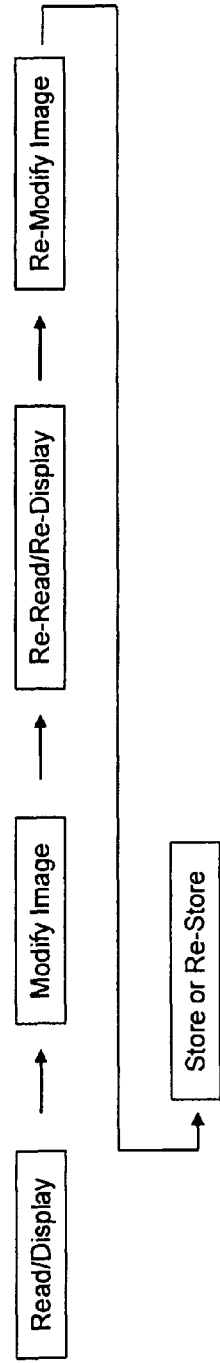
FIGURE 34A
FIGURE 34B
FIGURE 34C

3D LIGHT FIELD CAMERAS, IMAGES AND FILES, AND METHODS OF USING, OPERATING, PROCESSING AND VIEWING SAME

RELATED APPLICATION

This application claims priority to U.S. Provisional Application Ser. No. 61/306,464, entitled "3D Light Field Cameras, Images and Files, and Methods of Using, Operating and Processing Same", filed Feb. 20, 2010. The contents of U.S. Provisional Application Ser. No. 61/306,464 are incorporated herein by reference.

INTRODUCTION

The present inventions relate to, among other things, circuitry, techniques, devices and/or systems for generating, viewing and/or providing three dimensional (3D) images (for example, video or still) of a scene from light field data by processing the light field data to generate a plurality of two dimensional (2D) images (for example, two) therefrom wherein at least two images include different perspectives or viewpoints.

Notably, the light field data may be acquired, captured and/or received from any light field acquisition device, now known or later developed. Indeed, the light field data may be acquired, captured, received and/or processed via the devices and processes described and illustrated in U.S. patent application Ser. No. 12/622,655 ("System of and Method for Video Refocusing", Pitts et al., Nov. 20, 2009), U.S. patent application Ser. No. 12/622,673, U.S. patent application Ser. No. 12/632,979 ("Light Field Camera and System, and Methods of Using and Manufacturing Same", Knight et al., Dec. 8, 2009), and/or U.S. patent application Ser. No. 12/698,843 ("Light Field Camera Image File and Configuration Data, and Method of Using, Storing and Communicating Same", Knight et al., Feb. 10, 2010); the contents of these non-provisional patent applications are incorporated herein by reference, in their entirety.

SUMMARY

There are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

Importantly, this Summary may not be reflective of or correlate to the inventions protected by the claims in this or continuation/divisional applications hereof. Even where this Summary is reflective of or correlates to the inventions protected by the claims hereof, this Summary may not be exhaustive of the scope of the present inventions.

In certain aspects the present inventions are directed to circuitry and techniques of generating a three dimensional (3D) image of a scene. For example, in a first principal aspect, certain of the present inventions are directed to a method of generating a three dimensional (3D) image of a scene and comprise acquiring light field data of light from the scene via one acquisition, wherein the light includes a first subset of light rays from a first direction and a second subset of light rays from a second direction. The method further includes (i) generating first image data of the scene using light field data which corresponds to the first subset of light rays from the first direction, wherein the first image data represents an image of the scene from a first perspective and (ii) generating second image data of the scene using light field data which corresponds to the second subset of light rays from the second direction, wherein the second image data represents an image of the scene from a second perspective. The 3D image of the scene is generated using the first image data and the second image data.

In one embodiment, the 3D image of the scene is generated by 3D encoding the first image data of the scene and the second image data of the scene. For example, the 3D encoding may include encoding the first image data of the scene using a first color channel and encoding the second image data of the scene using a second color channel. Notably, the method may include receiving a user input which determines the extent to which the image appears 3D.

In one embodiment, a difference between the first perspective and the second perspective corresponds to different perspectives of the scene within a virtual aperture plane. In another embodiment, a difference between the first perspective and the second perspective corresponds to different perspectives of the scene within different virtual aperture planes.

In another principal aspect, the present inventions are directed to a method of generating a three dimensional (3D) image of a scene, comprising receiving light field data of light from the scene corresponding to one acquisition by a light field acquisition device having a physical aperture, wherein the light includes a plurality of subsets of light rays including a first subset of light rays from a first direction and a second subset of light rays from a second direction. The method of this aspect of the inventions further includes (i) generating first image data of the scene using light field data which correlates to a first virtual aperture, wherein a size of the first virtual aperture is less than a size of the physical aperture of the light field acquisition device, and wherein the first image data represents an image of the scene from a first perspective and (ii) generating second image data of the scene using light field data which correlates to a second virtual aperture, wherein a size of the second virtual aperture is less than the size of the physical aperture of the light field acquisition device and the first and second virtual apertures correspond to different portions of the physical aperture, and wherein the second image data represents an image of the scene from a second perspective. The method also includes generating a 3D image of the scene using the first image data and the second image data.

In one embodiment of this aspect of the inventions, the method also includes receiving a user input which is representative of a size, shape and/or location of the first virtual aperture and/or second virtual aperture. In another embodiment, the method further includes defining two or more characteristics of the first virtual aperture and the second virtual aperture.

Notably, generating the 3D image of the scene may include 3D encoding the first image data of the scene and the second image data of the scene. For example, in one embodiment, the 3D encoding the first image data of the scene and the second image data of the scene may include encoding the first image data of the scene using a first color channel and encoding the second image data of the scene using a second color channel.

In one embodiment, at least one difference between the first perspective and the second perspective corresponds to different perspectives of the scene within a virtual aperture plane. In another embodiment, a difference between the first perspective and the second perspective corresponds to different perspectives of the scene within different virtual aperture planes.

In yet another principal aspect, the present inventions are directed to a light field acquisition device comprising photosensor array (having a plurality of photosensors) to acquire light field data corresponding to light rays from the scene, a microlens array to direct light rays onto the photosensor array, wherein the microlens array includes a plurality of microlens and wherein each microlens of the microlens array is associated with a first subset of photosensors and a second subset of photosensors. Processing circuitry, coupled to the photosensor array, (a) generates first image data of the scene using light field data from the first subset of photosensors associated with each microlens of the microlens array, wherein the first image data is representative of an image of the scene from a first perspective and (b) generates second image data of the scene using light field data from the second subset of photosensors associated with each microlens of the microlens array, wherein the second image data is representative of an image of the scene from a second perspective.

The processing circuitry generates a 3D image (having a 3D effect) of the scene using the first image data and the second image data. For example, in one embodiment, the processing circuitry generates the 3D image of the scene by 3D encoding the first image data of the scene and the second image data of the scene. In this regard, the 3D encoding of the first image data and the second image data may include encoding the first image data using a first color channel and encoding the second image data using a second color channel.

In one embodiment, a relationship between the first subset of photosensors associated with each microlens and the second subset of photosensors associated with each microlens defines a difference between the first perspective and the second perspective within a virtual aperture plane. Here, an interface, coupled to the processing circuitry, may receive input data which is representative of the relationship between the first subset of photosensors associated with each microlens and the second subset of photosensors associated with each microlens.

In another embodiment, a relationship between the first subset of photosensors associated with each microlens and the second subset of photosensors associated with each microlens defines a difference between the first perspective and the second perspective within different virtual aperture planes. Here again, an interface, coupled to the processing circuitry, may receive input data which is representative of the relationship between the first subset of photosensors associated with each microlens and the second subset of photosensors associated with each microlens.

In yet another principal aspect, the present inventions are directed at light field acquisition system comprising a photosensor array (having a plurality of photosensors) to acquire light field data corresponding to light from the scene, a microlens array to direct light onto the photosensor array, wherein each microlens of the microlens array includes: (i) a physical aperture which correlates to a plurality of associated photosensors, (ii) a first virtual aperture which correlates to a first subset of the associated photosensors, and (iii) a second virtual aperture which correlates to a second subset of the associated photosensors. Processing circuitry, coupled to the photosensor array, generates: (a) first image data of the scene using light field data which correlates to the first virtual aperture, wherein the first image data represents an image of the scene from a first perspective, and (b) second image data of the scene using light field data which correlates to the second virtual aperture, wherein the second image data represents an image of the scene from a second perspective.

The processing circuitry generates a 3D image of the scene using the first image data and the second image data. For example, the processing circuitry may generate the 3D image of the scene by encoding the first image data of the scene (for example, using a first color channel) and the second image data of the scene (for example, using a second color channel) to provide a 3D effect. Notably, the light field acquisition system may also include a user interface to receive a user input which is representative of a size, shape and/or location of the first virtual aperture and/or second virtual aperture. For example, the user interface may receive the user input after the photosensors of the photosensor array acquire the light field data corresponding to light from the scene.

In one embodiment of this aspect of the inventions, a relationship between the first virtual aperture and the second virtual aperture defines a difference between the first perspective and the second perspective within a virtual aperture plane. In another embodiment, a relationship between the first virtual aperture and the second virtual aperture defines a difference between the first perspective and the second perspective within different virtual aperture planes.

Notably, the light field acquisition system may include an interface, coupled to the processing circuitry, to receive input data of a size and/or a location of the first virtual aperture and/or second virtual aperture.

In another principal aspect, the present inventions are directed to a method of simulating processing circuitry and/or a light field acquisition device (or aspects thereof) on a computing system wherein such circuitry and/or device are capable of generating a three dimensional (3D) image of a scene. The method of simulating comprises (i) simulating the acquisition of light field data of light from the scene via one acquisition, wherein the light includes a first subset of light rays from a first direction and a second subset of light rays from a second direction, (ii) simulating the generation of first image data of the scene using light field data which corresponds to the first subset of light rays from the first direction, wherein the first image data represents an image of the scene from a first perspective and (iii) simulating the generation of second image data of the scene using light field data which corresponds to the second subset of light rays from the second direction, wherein the second image data represents an image of the scene from a second perspective. This method may also include simulating the generation of a 3D image of the scene using the first image data and the second image data.

In yet another principal aspect, the present inventions are directed to a method of testing processing circuitry and/or a light field acquisition device (or aspects thereof) on a computing system wherein such circuitry and/or device are capable of generating a three dimensional (3D) image of a scene. The method of testing comprises testing the processing circuitry which (a) generates first image data of the scene using light field data from the first subset of photosensors associated with each microlens of the microlens array, (b) generates second image data of the scene using light field data from the second subset of photosensors associated with each microlens of the microlens array, wherein the first and second image data are representative of an image of the scene from a first and second perspective, respectively. The method of testing may also include generating a 3D image of the scene using the first image data and the second image data wherein the 3D image includes a 3D effect.

As stated herein, there are many inventions, and aspects of the inventions, described and illustrated herein. This Summary is not exhaustive of the scope of the present inventions.

Indeed, this Summary may not be reflective of or correlate to the inventions protected by the claims in this or continuation/divisional applications hereof.

Moreover, this Summary is not intended to be limiting of the inventions or the claims (whether the currently presented claims or claims of a divisional/continuation application) and should not be interpreted in that manner. While certain embodiments have been described and/or outlined in this Summary, it should be understood that the present inventions are not limited to such embodiments, description and/or outline, nor are the claims limited in such a manner (which should also not be interpreted as being limited by this Summary).

Indeed, many other aspects, inventions and embodiments, which may be different from and/or similar to, the aspects, inventions and embodiments presented in this Summary, will be apparent from the description, illustrations and claims, which follow. In addition, although various features, attributes and advantages have been described in this Summary and/or are apparent in light thereof, it should be understood that such features, attributes and advantages are not required whether in one, some or all of the embodiments of the present inventions and, indeed, need not be present in any of the embodiments of the present inventions.

BRIEF DESCRIPTION OF THE DRAWINGS

In the course of the detailed description to follow, reference will be made to the attached drawings. These drawings show different aspects of the present inventions and, where appropriate, reference numerals illustrating like structures, components, materials and/or elements in different figures are labeled similarly. It is understood that various combinations of the structures, components, and/or elements, other than those specifically shown, are contemplated and are within the scope of the present inventions.

Moreover, there are many inventions described and illustrated herein. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

FIGS. 9A-9I illustrate exemplary embodiments of virtual apertures (illustrated in connection with a microlens image corresponding to a view of the physical aperture as seen through a particular lenslet/microlens of the microlens array, projected onto the photosensor array) according to at least certain aspects of certain embodiments of the present inventions; notably, (i) the different axes along which pairs of virtual apertures may be chosen, for example, include: a variable separation between virtual apertures (compare FIGS. 9A, 9B with FIGS. 9C, 9D) to further apart (FIGS. 9A, 9B and 9G) wherein virtual apertures that are farther apart may result in a pair of output images with a larger perspective shift between them relative to virtual apertures closer together, resulting in differences in the amount of stereo disparity (a greater amount of 3D effect in the output image for virtual apertures that are farther apart), (ii) different locations of the apertures relative to the main aperture origin wherein virtual apertures that are not centered about the origin (FIG. 9D) may provide an output image with a perspective shift relative to the origin, and providing virtual apertures above or below the horizontal axis (FIG. 9I), may result in a perspective shift equivalent to moving your head up or down as you view the scene, (iii) different rotational angles between the line joining the two virtual apertures and the horizontal axis (FIGS. 9B and 9G), (iv) different sizes and shapes of the virtual apertures wherein implementing a larger aperture results in a shallower depth of field in the output image, and vice-versa (compare FIGS. 9E, 9F, 9H) wherein the size of the virtual apertures result in 3D images with a larger depth of field, and larger virtual apertures allow refocusing in 3D over shallow depths of field.

Figure 13:
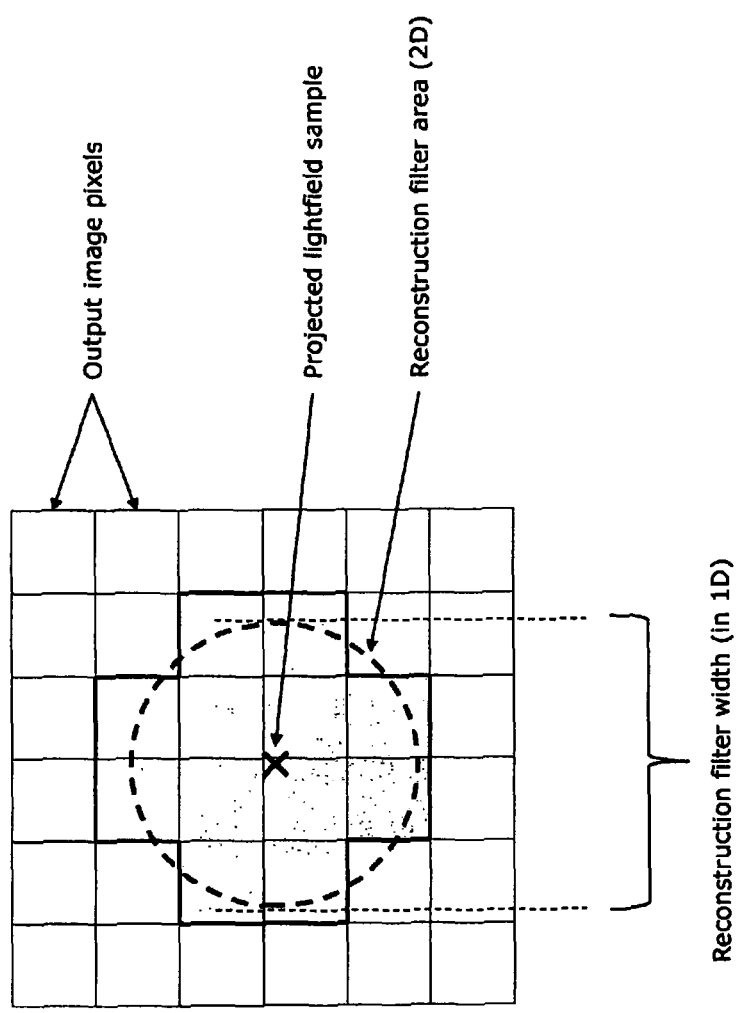
Figure 14:
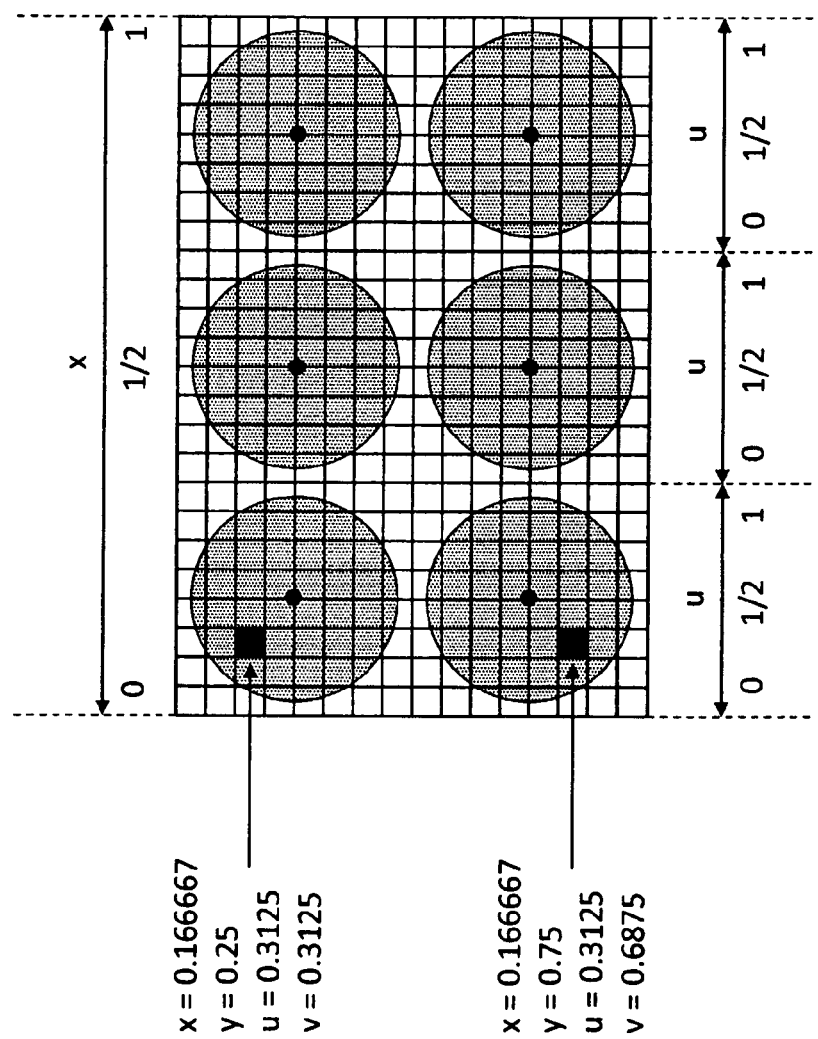
Figure 15:
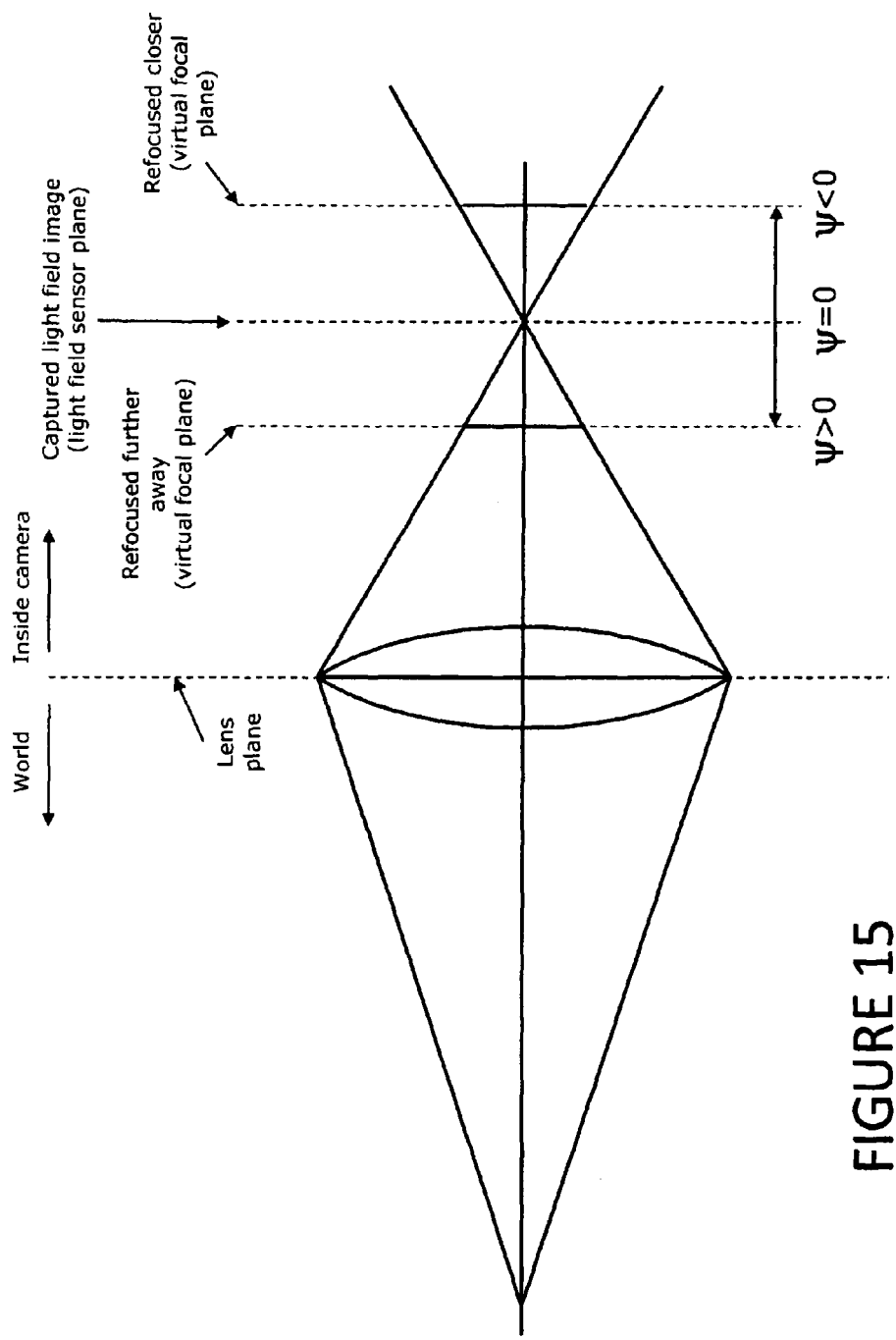
Figure 16B:
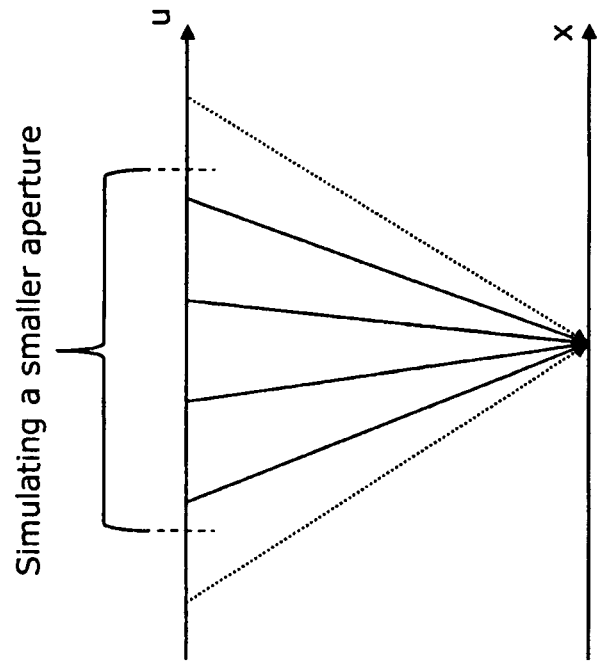
Figure 16A:
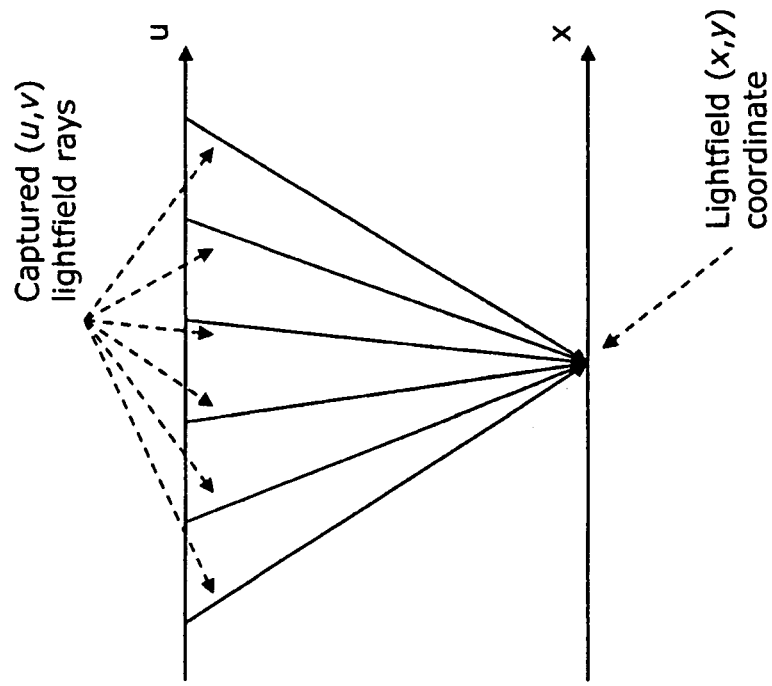
Figure 17:
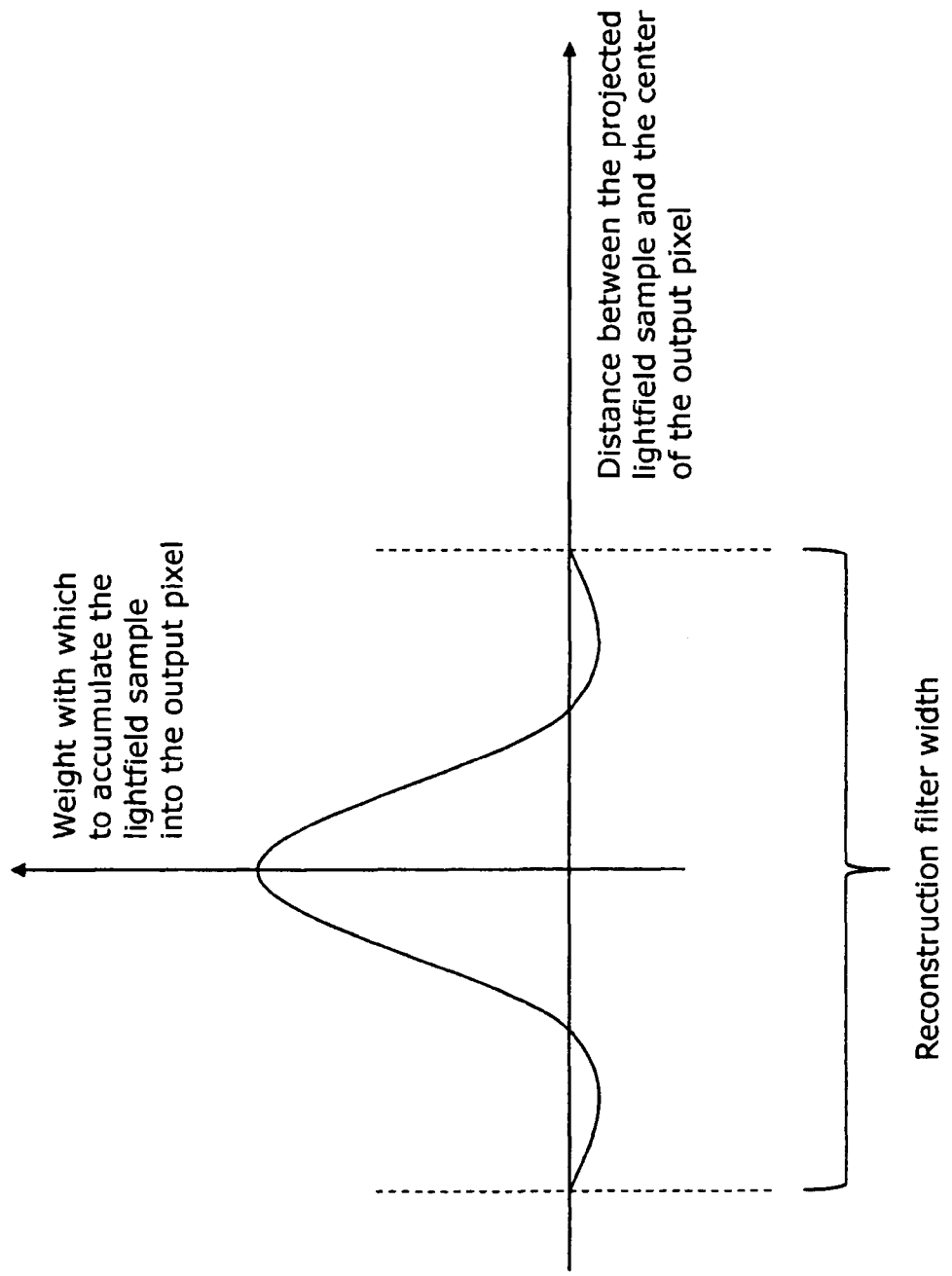
Figure 18B:
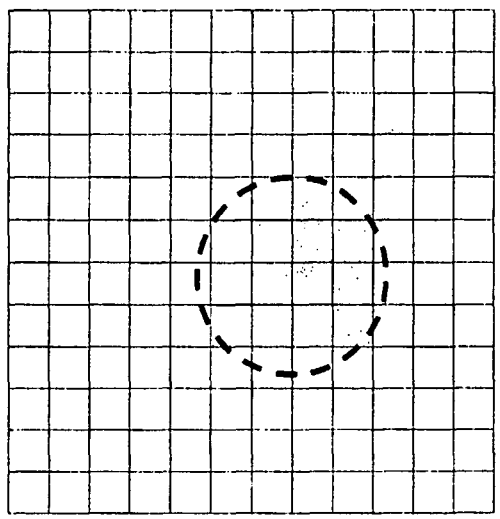
Figure 18A:
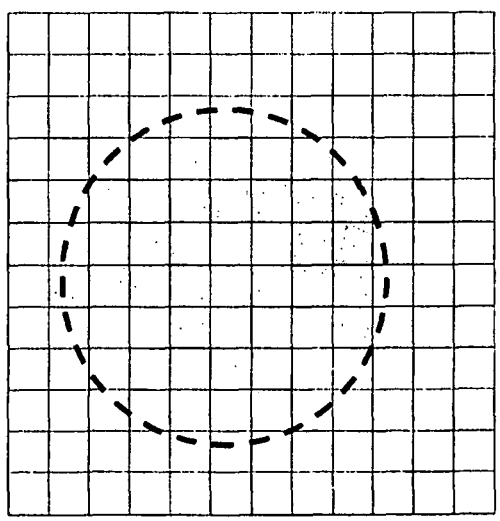
Figure 19B:
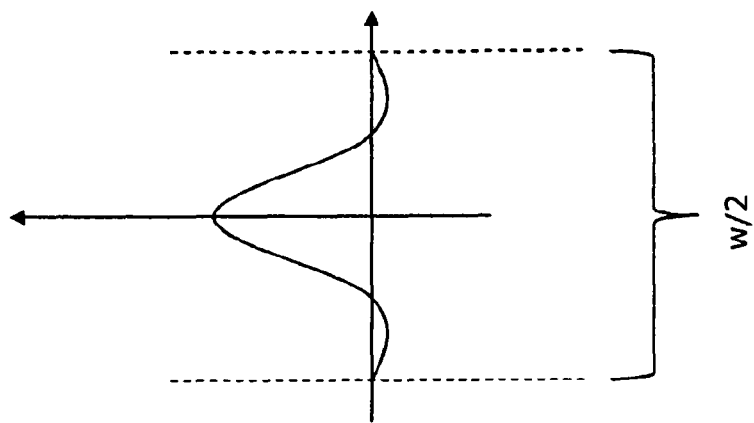
Figure 19A:
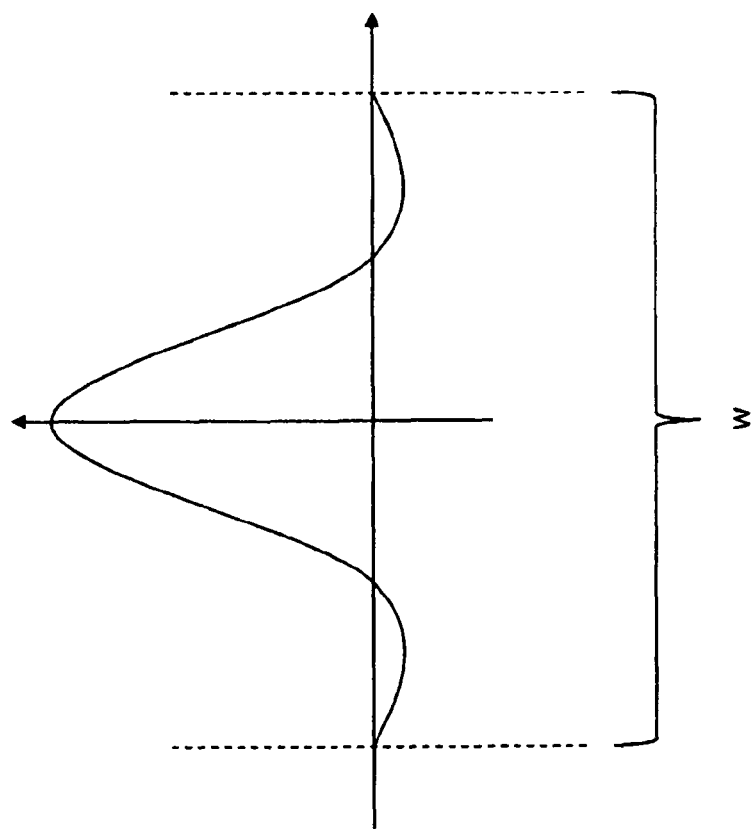
Figure 20:
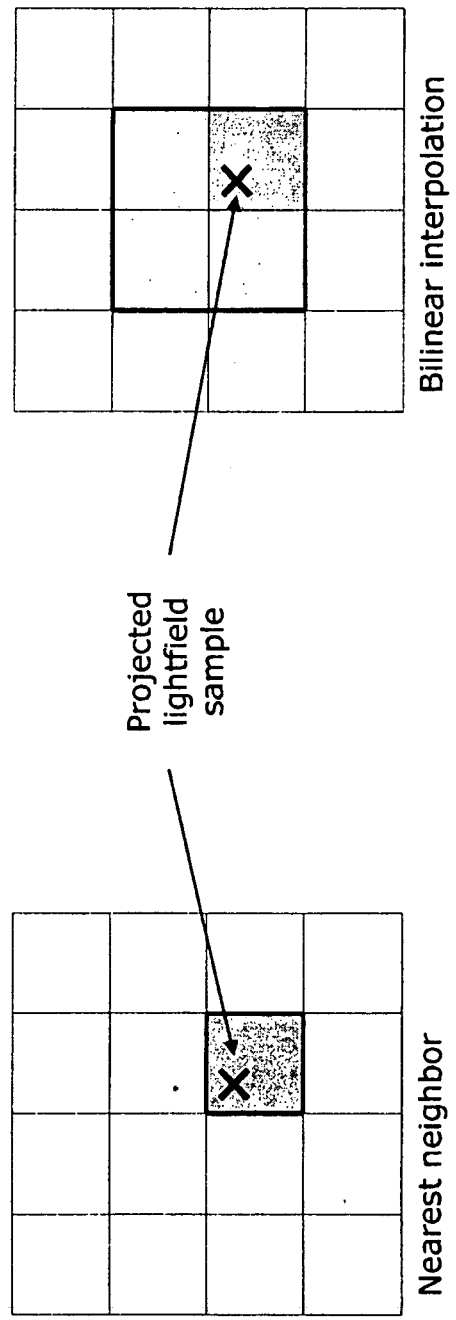
Figure 21:
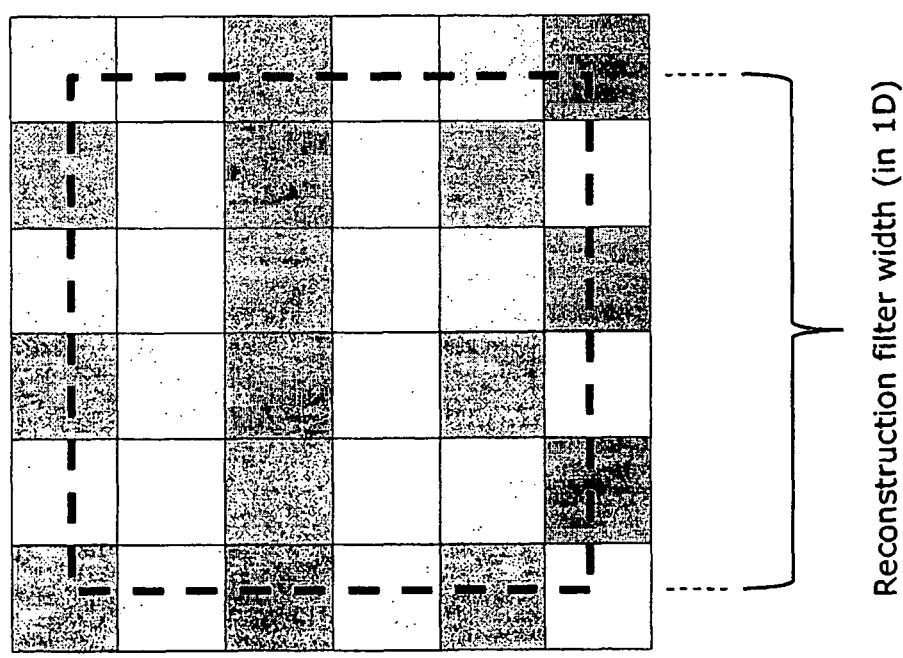
Figure 22:
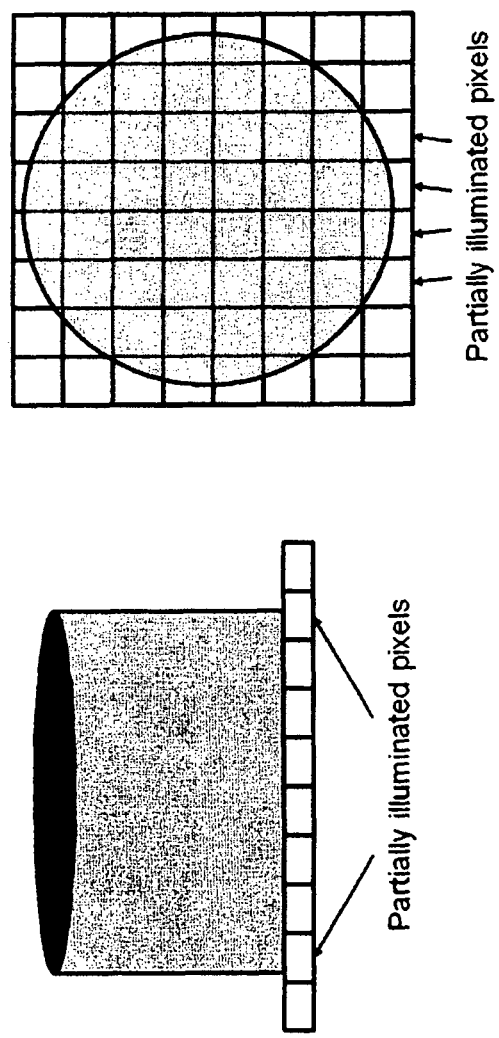
Figure 23:
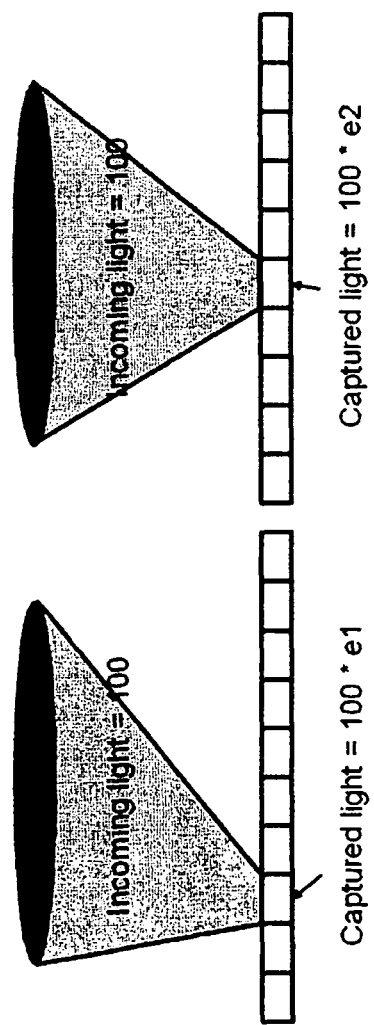
Figure 25A:
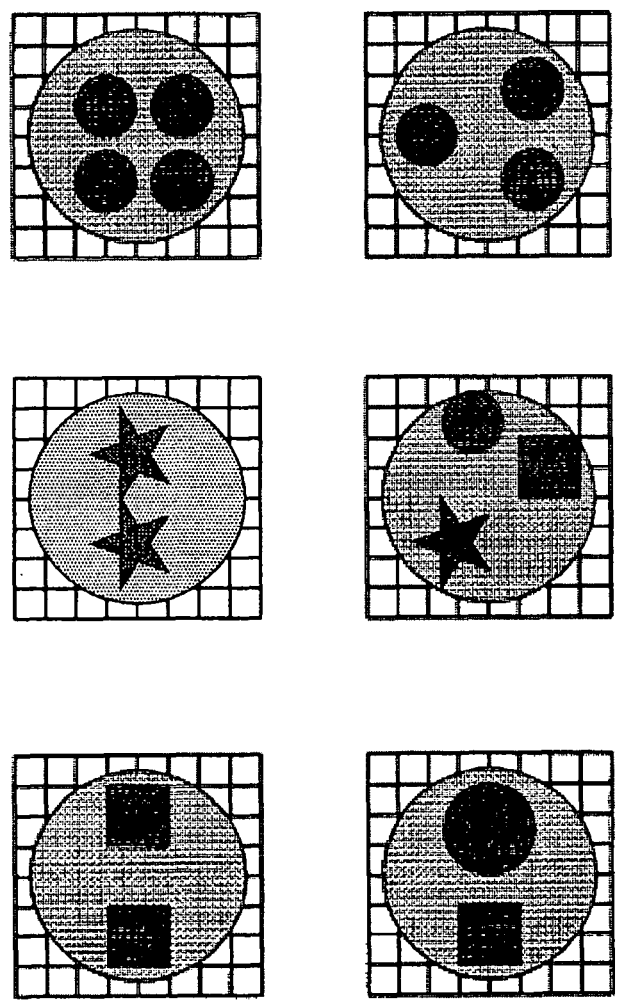
Figure 25B:
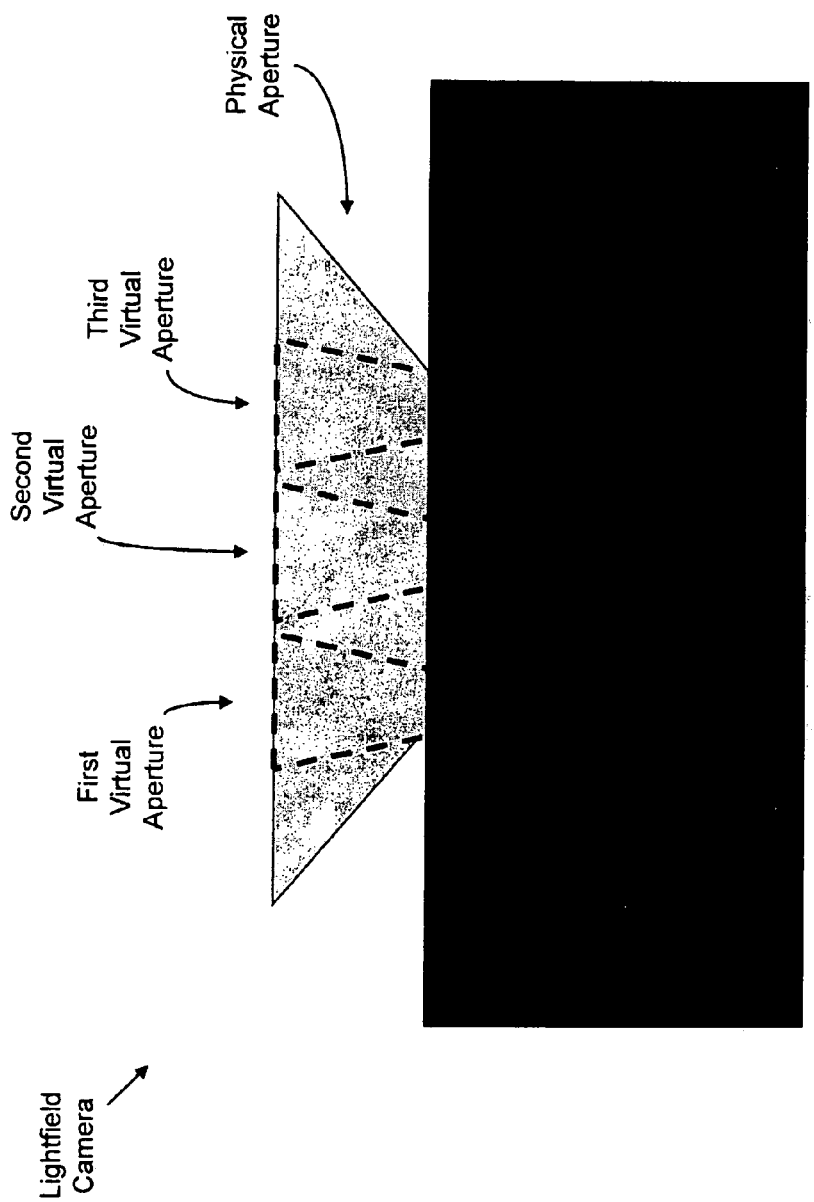
Figure 25C:
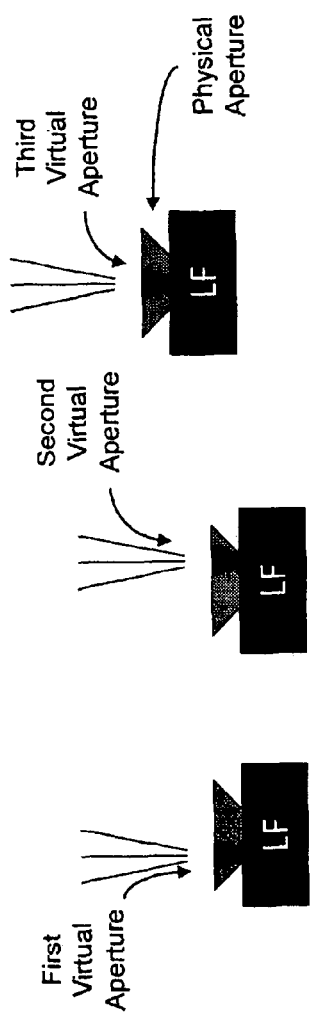
Figure 25D:
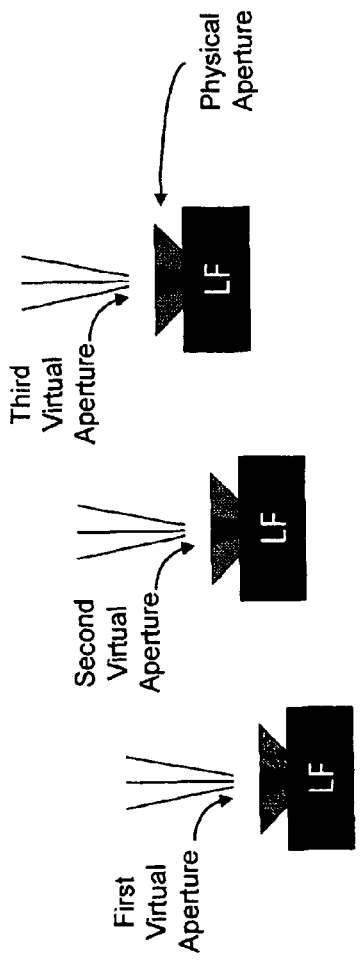
Figure 25E:
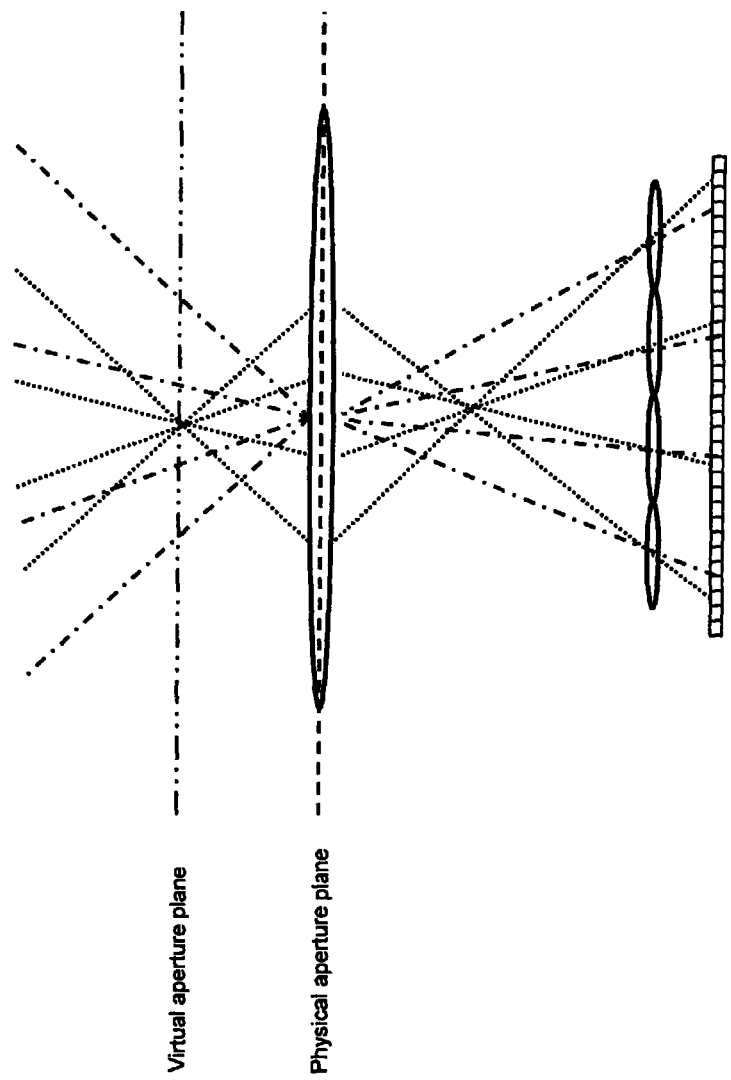
Figure 26:
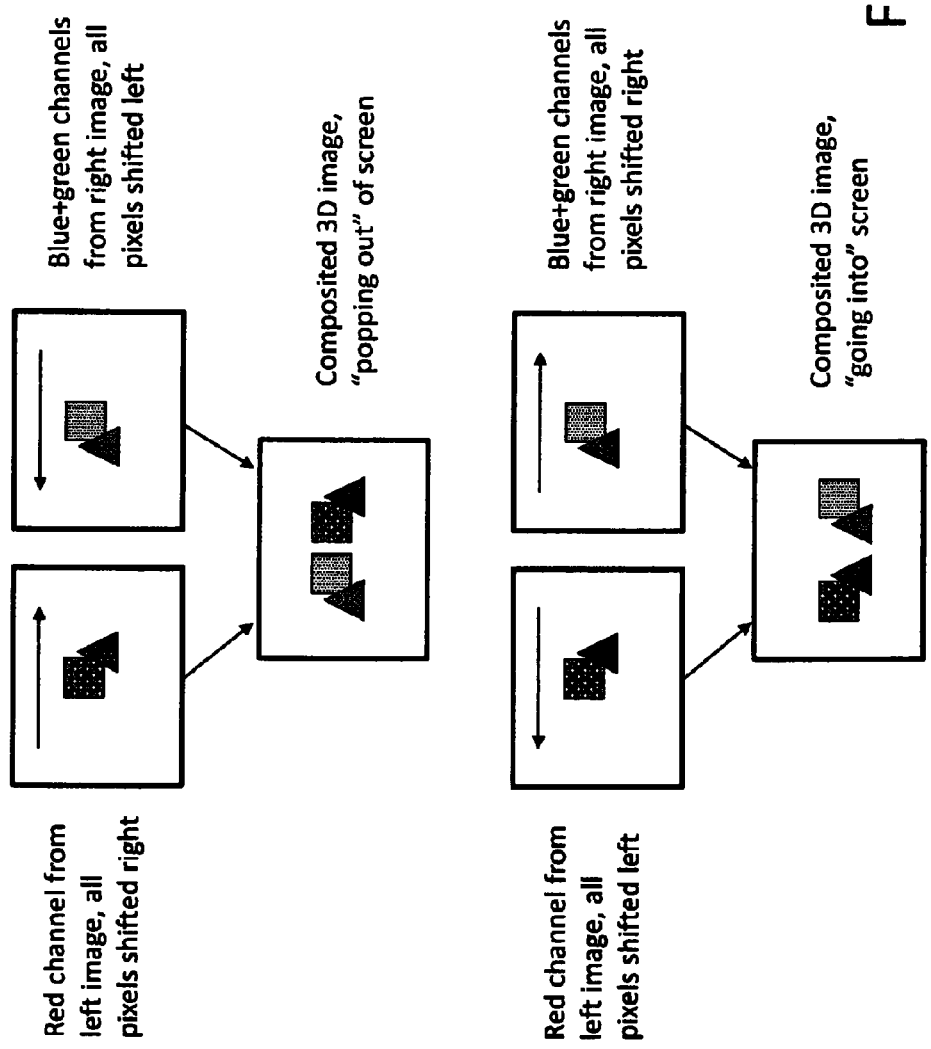
Figure 28:
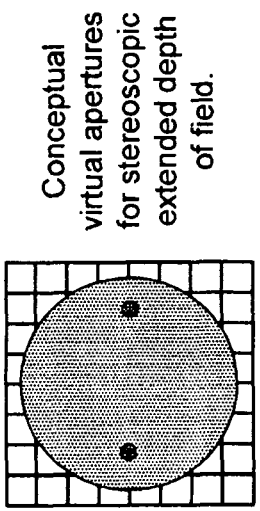
Figure 29:
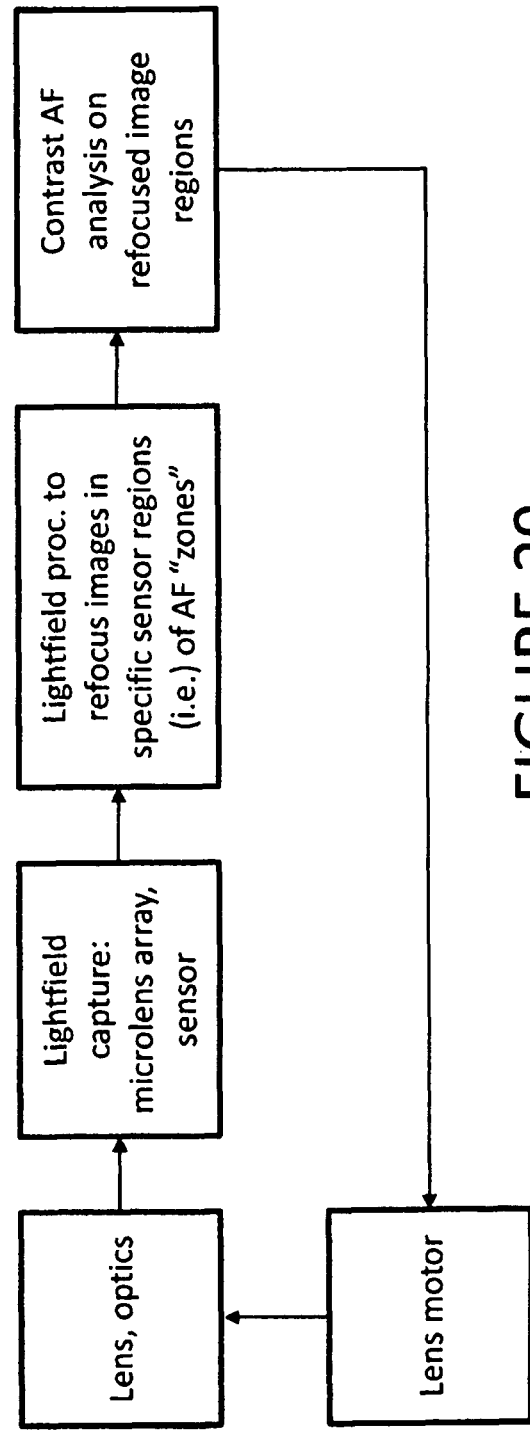
Figure 30:
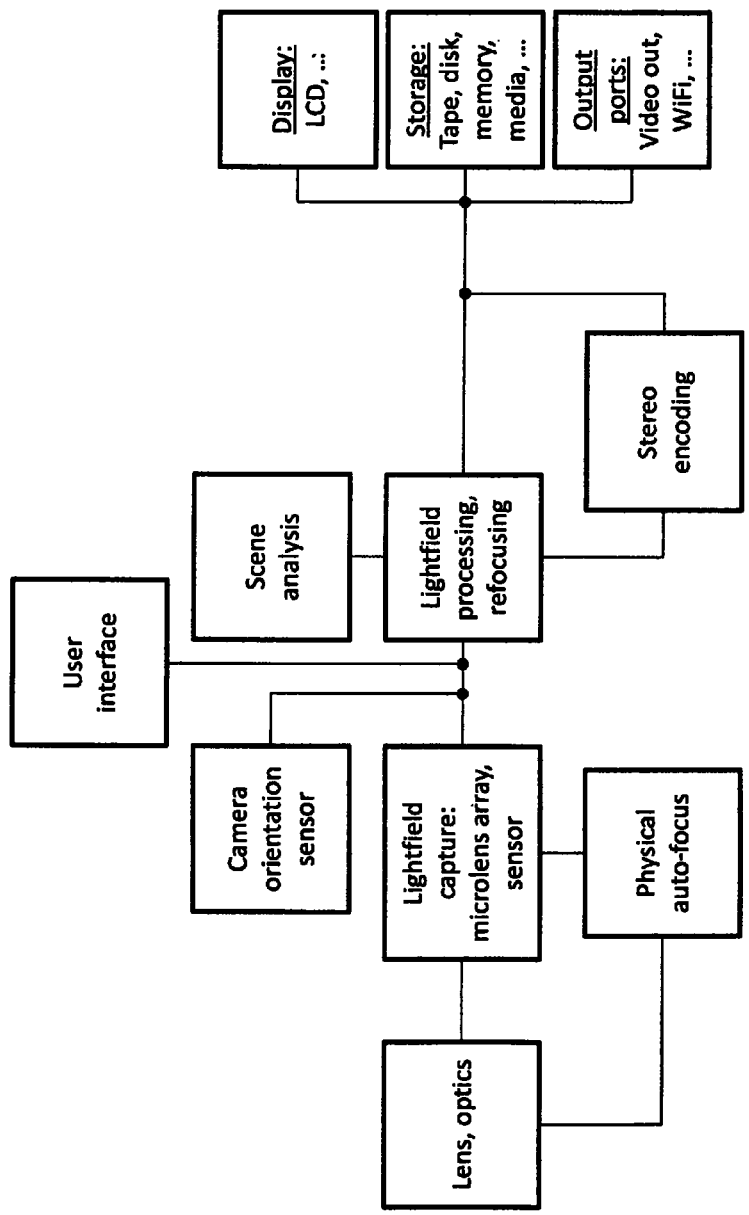
Figure 32A:
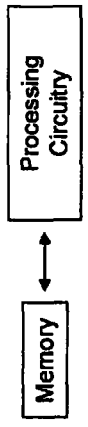
Figure 32B:
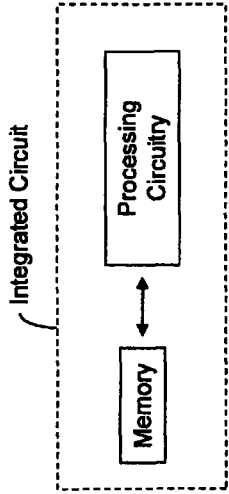
Figure 32C:
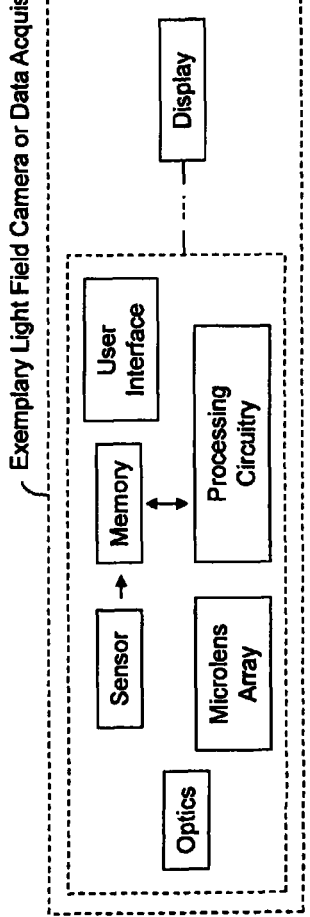
Figure 32D:
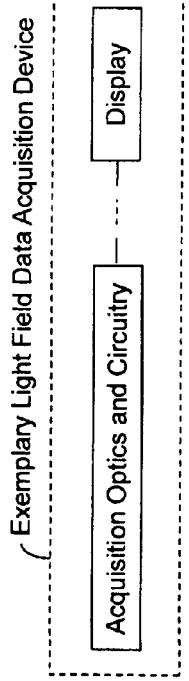
Figure 32E:
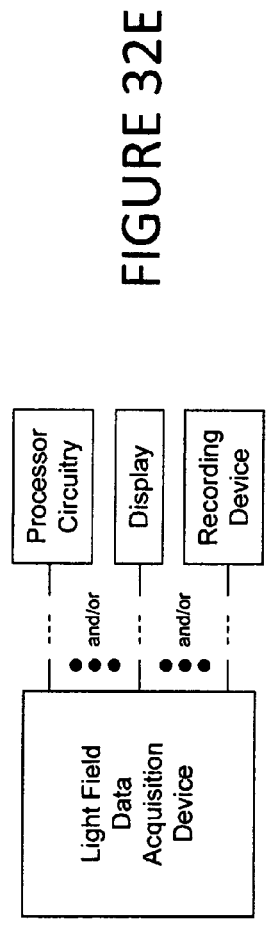
Figure 32F:
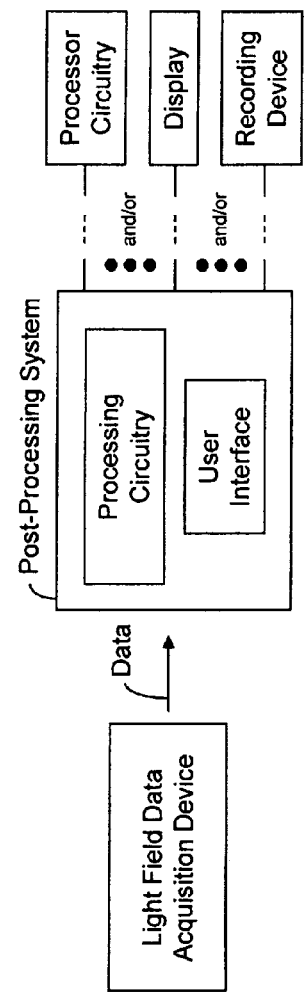
Figure 34D:
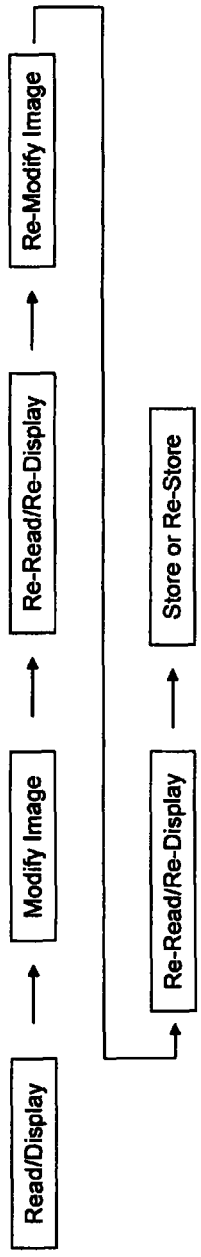
Figure 34E:
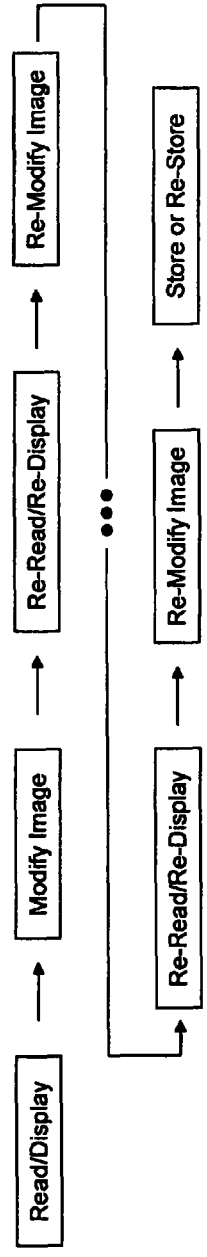
Figure 35:
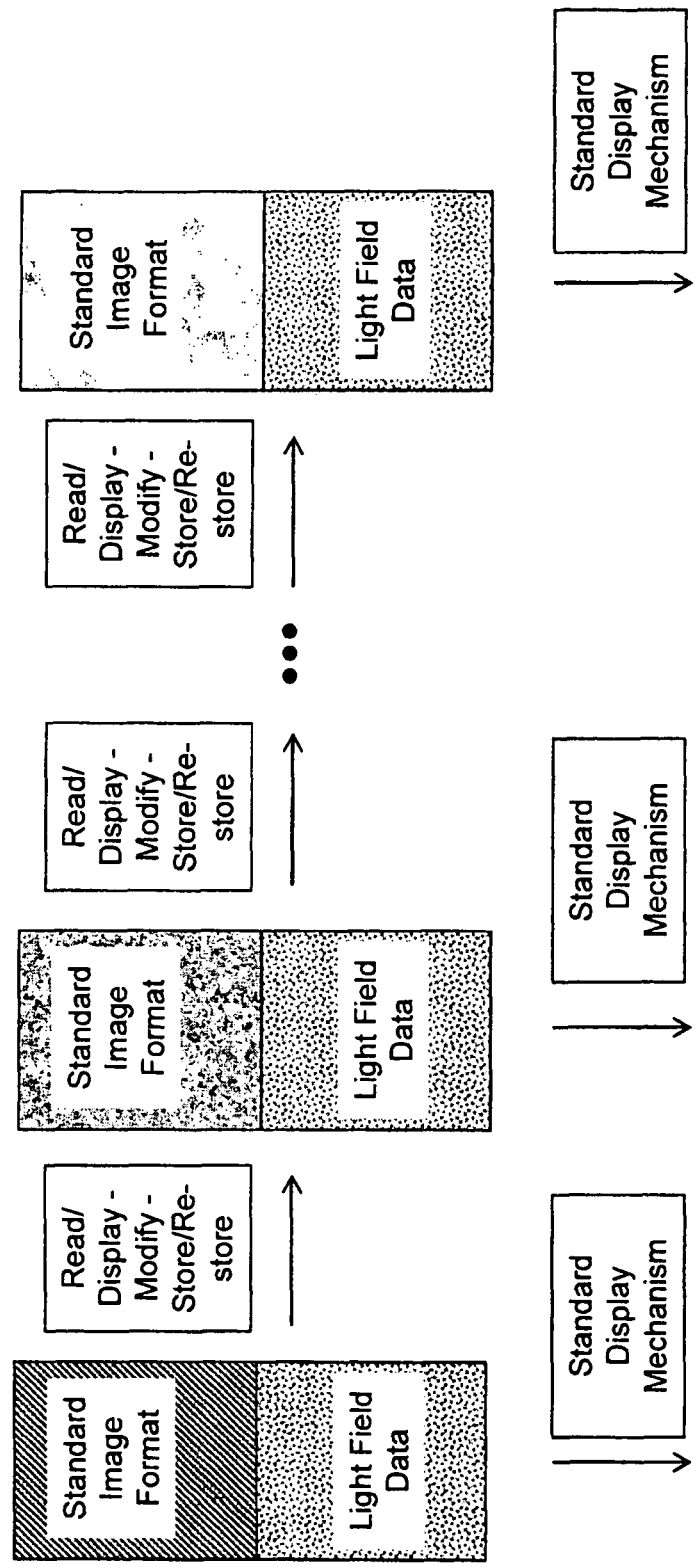

12, and the separation is less than the separation between neighboring ray bundles from the same microlens;

FIG. 13 is an illustration of an exemplary embodiment of a single projected light field sample in which the rectangular grid represents the output image pixels, according to at least certain aspects of certain embodiments of the present inventions;

FIG. 14 illustrates an exemplary embodiment of an exemplary normalized light field image coordinate system, according to at least certain aspects of certain embodiments of the present inventions;

FIG. 15 is an illustration of psi (kg) as a value that relates to the refocusing depth of an image and that may be used to specify and/or characterize a suitable focus depth to use for computing the refocused image, according to at least certain aspects of certain embodiments of the present inventions; notably, psi=0 corresponds to a refocused image the focus depth of which corresponds to that of the captured light field itself; that is, a psi=0 image has objects in focus if they were in focus in the captured light field image; psi>0 and psi<0 correspond to focus depths that are "further away" and "closer", respectively;

FIG. 16A is an illustration of an exemplary embodiment of a set of rays passing through a microlens where the light field coordinate (x,y,u,v) describes a single ray from the set; notably, (x,y) refer to the microlens that the rays pass through (i.e., the spatial coordinate) and (u,v) refer to the direction of the ray;

FIG. 16B is an illustration of an exemplary embodiment of a technique to generate refocused images with extended depths of field (EDoF) by simulating a smaller aperture, according to at least certain aspects of certain embodiments of the present inventions, wherein, for example, only (x,y,u,v) light field samples whose (u,v) directional components are within a desired range are used to compute the refocused image;

FIG. 17 is an illustration of an exemplary embodiment of a reconstruction filter function that may be implemented in certain embodiments of the present inventions; notably, the axis titles illustrate/indicate the mode of using the filter;

FIGS. 18A and 18B illustrate exemplary embodiments of different exemplary reconstruction filter sizes that may be implemented in certain embodiments of the present inventions; notably, FIGS. 18A and 18B depict two examples of the extent to which source light field samples are "spread out" when accumulated into the output image;

FIGS. 19A and 19B illustrate exemplary embodiments of reconstruction filters with varying exemplary sizes but identical shape that may be implemented in certain embodiments of the present inventions; notably, in the depicted exemplary embodiments the right filter's width (FIG. 19B) is half that of the left filter's width (FIG. 19A);

FIG. 20 is an illustration of exemplary embodiments of the accumulation of a light field sample into two example projection image neighborhoods, according to at least certain aspects of certain embodiments of the present inventions, where the left grid illustrates an exemplary embodiment of the "nearest neighbor" approach which writes each light field sample into a single output pixel (the nearest one to the projected output location) and the right grid illustrates an exemplary embodiment of the "bilinear approach" which spreads each light field sample out into a grid (for example, 2×2) of the projection image;

FIG. 21 is an illustration of an example of a projection image comprising a grid of unevenly weighted pixels, where the weight of each pixel is a function of how many light field samples were accumulated into it, with the darkness/lightness of each pixel representing its weight, according to at least certain aspects of certain embodiments of the present inventions;

FIG. 22 is an illustration of an exemplary embodiment of an area of an image sensor illuminated by a projected microlens or lenslet image where certain capture elements receive partial illumination and record a partial value corresponding to the partial illumination, according to at least certain aspects of certain embodiments of the present inventions;

FIG. 23 is an illustration of an exemplary embodiment of two different pixels recording different values while receiving an identical number of photons, but from different angles of the incident light, where the capture efficiency of the first pixel is e1 and of the second pixel is e2, according to at least certain aspects of certain embodiments of the present inventions;

FIG. 24 illustrates exemplary embodiments of virtual apertures (illustrated in connection with a microlens image corresponding to a view of the physical aperture as seen through a particular lenslet/microlens of the microlens array, projected onto the photosensor array) according to at least certain aspects of certain embodiments of the present inventions; notably, the virtual apertures illustrated in each of the exemplary embodiments include symmetry about an axis and various/predetermined/selectable sizes, shapes and/or locations;

FIG. 25A illustrates exemplary embodiments of more than two virtual apertures, having various/predetermined/selectable sizes, shapes and/or locations, according to at least certain aspects of certain embodiments of the present inventions, wherein the present inventions may generate output images corresponding to more than two virtual apertures (for example, three, four, etc. virtual apertures) having various positions, shapes, and sizes, thus producing multiple different perspectives on a scene;

FIGS. 25B-25D illustrate, in block diagram form, exemplary embodiments of more than two virtual apertures (in this illustrative embodiment, three), according to at least certain aspects of certain embodiments of the present inventions;

FIG. 25E conceptually illustrates light rays passing through two different viewpoints. One viewpoint is centered on the physical aperture. The second viewpoint is centered on a virtual aperture plane located in front of the physical aperture. The illustration conceptually shows how the light rays on the sensor surface change relative to the two viewpoints;

FIG. 26 illustrates an exemplary embodiment of the predetermined and/or selectable zero parallax plane parameter of the 3D processing according to at least certain aspects of certain embodiments of the present inventions, wherein, in this illustrative embodiment, a global shift of left/right images before compositing affects whether 3D objects "come out of" or "go into" image/screen, by moving the zero parallax plane;

FIGS. 27A and 27B illustrate exemplary embodiments of generating images having different depths of field wherein, in one embodiment, the systems and techniques of the present inventions may generate, produce and/or provide a 3D images (video or still) having a predetermined focus (or foci) across a plurality of depths (for example, over those depths including one or more subjects/objects of interest; implementing this data processing operation may result in images or video having a higher resolution and/or lower noise; notably, in FIGS. 27A and 27B, images generated for right eye viewing using normal refocusing and extended depth of field are illustrated, respectively;

FIG. 28 is an exemplary embodiment conceptually illustrating virtual apertures for stereoscopic extended depth of field, according to at least certain aspects of certain embodiments of the present inventions; notably, although an extended depth of field 3D is akin to creating two very small virtual apertures or "viewpoints" and computing a stereo pair of images based on the very small apertures, unlike using a very small aperture, extended depth of field imaging may use most, substantially all, or all of the data in the light field, which may result in higher resolution and/or lower noise in computed images;

FIG. 29 is a schematic block diagram illustration of an exemplary embodiment of a contrast-based auto-focus architecture, according to at least certain aspects of certain embodiments of the present inventions;

FIG. 30 is a schematic block diagram illustration of an exemplary embodiment of a video camera based on light field technology, according to at least certain aspects of certain embodiments of the present inventions, wherein in this embodiment, the video camera may record and/or capture 2D and/or 3D images (video and/or still);

FIGS. 31A and 31B are block diagram representations of exemplary electronic light field data files having one or more sets of light field data, according to at least certain aspects of certain embodiments of the present inventions and/or which may implement certain aspects of certain embodiments of the present inventions, wherein the file format or structure of the light field data file may include a start code and/or end code to indicate the beginning and/or end, respectively, of a set of a light field data; notably, the electronic data file format or structure may have a header section containing metadata (see FIG. 31B) which may include and/or consist of configuration data as described in U.S. patent application Ser. No. 12/698, 843 ("Light Field Camera Image File and Configuration Data, and Method of Using, Storing and Communicating Same", Knight et al., Feb. 10, 2010);

FIGS. 32A and 32B are block diagram representations of exemplary embodiments of processing circuitry coupled to memory according to at least certain aspects of certain embodiments of the present inventions, wherein the processing circuitry, which implements the one or more operations, described and/or illustrated herein, to generate, for example, 3D images, couples to memory containing light field data;

FIGS. 32C-32E are block diagram representations of exemplary light field data acquisition devices including, among other things, processing circuitry integrated therein which implements the one or more operations, described and/or illustrated herein, to generate, for example, 3D images (for example, video and/or still);

FIG. 32F is a block diagram representation of an exemplary light field data acquisition device and an exemplary post-processing system, wherein the post-processing system includes, among other things, processing circuitry integrated therein which implements the one or more operations, described and/or illustrated herein, to generate, for example, 3D images;

FIG. 32G is a block diagram representation of an exemplary embodiment of processing circuitry coupled to memory according to at least certain aspects of certain embodiments of the present inventions, wherein the processing circuitry includes read and write circuitry to interface with the memory containing light field data;

FIG. 33A is a block diagram representation of exemplary electronic data files having image data (which is representative of an image) arranged, organized and/or stored in a standard image format (as described in U.S. patent application Ser. No. 12/698,843), and one or more sets of light field data, according to at least certain aspects of certain embodiments of the present inventions and/or which may implement certain embodiments of the present inventions;

FIGS. 33B and 33C are block diagram representations of exemplary electronic data files having image data (which is representative of an image) arranged, organized and/or stored in a standard image format and one or more sets of light field data, according to at least certain aspects of certain embodiments of the present inventions and/or which may implement certain embodiments of the present inventions, wherein such electronic data files may include one or more headers having metadata which includes, for example, one or more sets of light field configuration data;

FIGS. 34A-34E are exemplary processing flows for post-processing the exemplary electronic data files having data (for example, one or more sets of light field data), according to at least certain aspects of certain embodiments of the present inventions and/or which may implement certain aspects of certain embodiments of the present inventions, wherein the exemplary post-processing flows may be employed in conjunction with the electronic data files of FIGS. 33A-33C; and FIG. 35 is a block diagram representation of exemplary electronic data files in conjunction with exemplary processing flows for post-processing data contained therein, according to at least certain aspects of certain embodiments of the present inventions and/or which may implement certain embodiments of the present inventions, wherein such electronic data files include image data (which is representative of an image) arranged, organized and/or stored in a standard image format and one or more sets of light field data, and the processing may utilize any standard display mechanism (as described in U.S. patent application Ser. No. 12/698,843), to view the standard image portion of the electronic data file; notably, such electronic files may include one or more headers (not illustrated) having metadata (which includes, for example, one or more sets of light field configuration data).

Again, there are many inventions described and illustrated herein. The present inventions are neither limited to any single aspect nor embodiment thereof, nor to any combinations and/or permutations of such aspects and/or embodiments. Each of the aspects of the present inventions, and/or embodiments thereof, may be employed alone or in combination with one or more of the other aspects of the present inventions and/or embodiments thereof. For the sake of brevity, many of those combinations and permutations are not discussed separately herein.

DETAILED DESCRIPTION

There are many inventions described and illustrated herein. In one aspect, the present inventions are directed to devices, systems, circuitry and techniques for generating, viewing and/or providing 3D images and/or video from light field data. In this regard, generating, viewing and/or producing 3D images or video includes processing the light field data to generate or provide a plurality of images (for example, two) therefrom wherein at least two images include different perspectives or viewpoints.

FIGS. 1-4 provide a high-level overview of the processes to generate, produce and/or provide a 3D stereo image from light field image data. Note that in these and all other figures in this document, the depth of field effect has been omitted for clarity purposes, and all illustrations of captured or computed images show scene objects as being all-in-focus (although such objects need not be in-focus).

Figure 1:
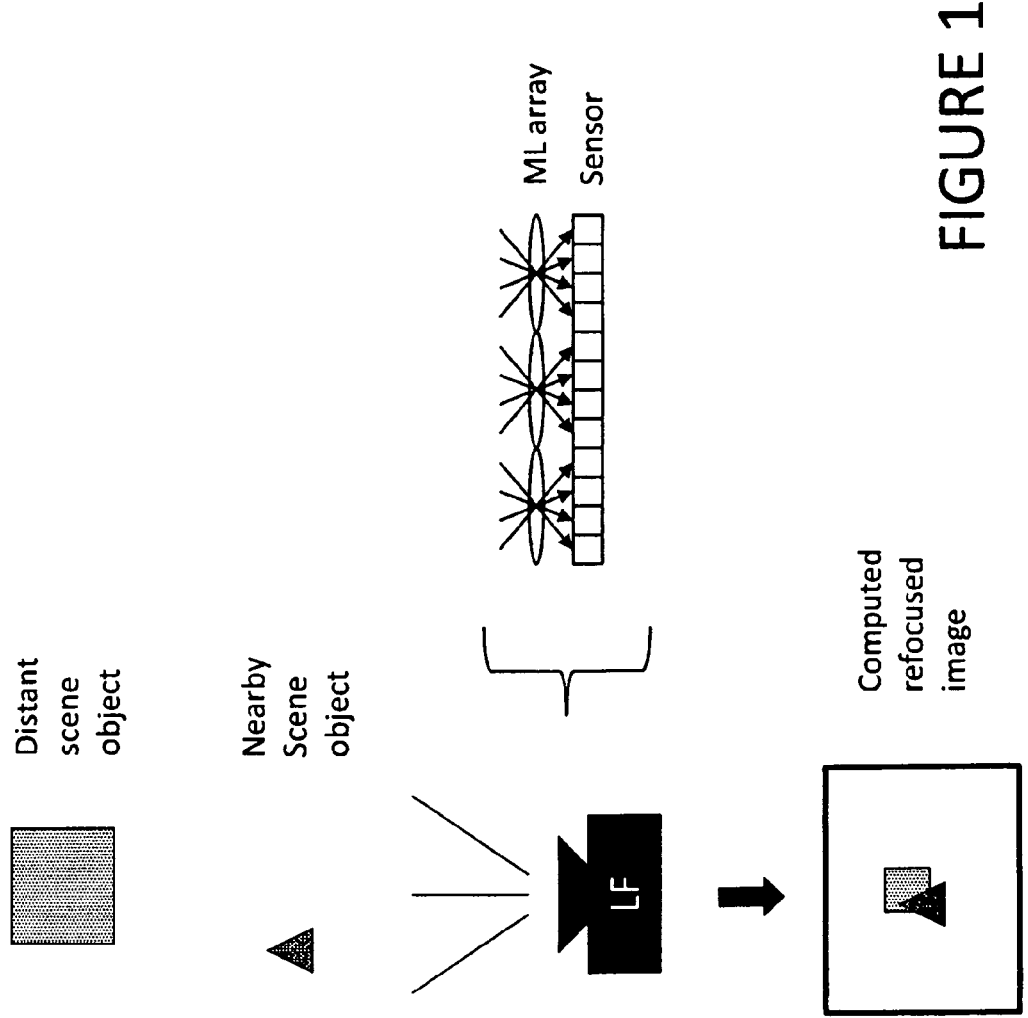
FIG. 1 is a block diagram representation of light field acquisition device or camera using light from all directions to generate an image (for example, a refocusable image); in this illustration, a cross-section of a portion of a (i) microlens array (ML array) and (ii) photosensor array, both of which are elements of and internal to the light field data acquisition device or camera of this exemplary embodiment, in conjunction with representative light or light rays, are depicted.
Figure 2:
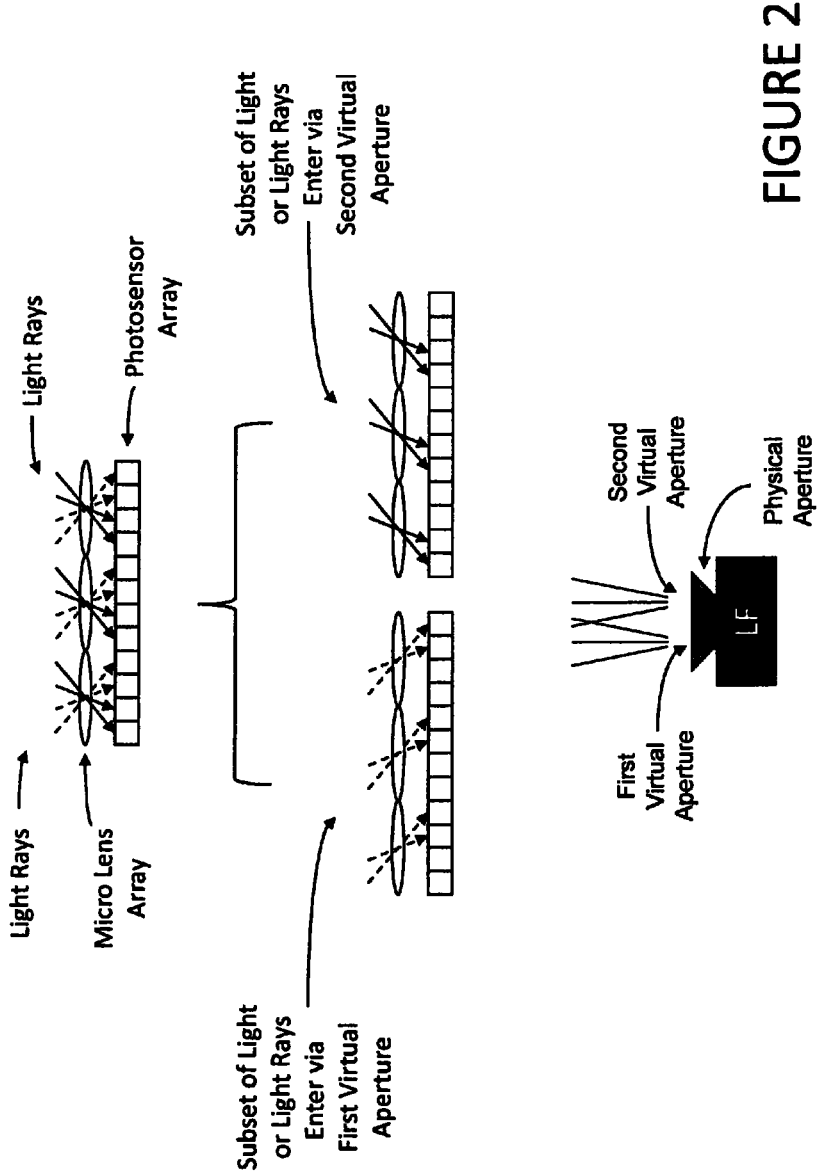
FIG. 2 is a block diagram representation of a light field data acquisition device or camera according to at least certain aspects of certain embodiments of the present inventions wherein a first subset of light or light rays from a first direction are employed by processing circuitry to generate a first image of the scene and a second subset of light or light rays from a second direction are employed to generate a second image of the scene, wherein the two images of the scene are from different perspectives; notably, selectively using a first subset of light or light rays (illustrated using dashed lines) from a first direction and a second subset of light or light rays (illustrated using solid lines) from a second direction may thereby characterize the single physical aperture of the light field data acquisition device or camera as two virtual apertures, namely the first virtual aperture and the second virtual aperture, wherein (i) the first subset of light or light rays (illustrated via the dashed lines) "enter" the first virtual aperture, are incident on the microlenses of the microlens array from a certain direction and are measured, sampled and/or detected by a subset of photosensors of the photosensor array and (ii) the second subset of light or light rays (illustrated via the solid lines) "enter" the second virtual aperture, are incident on the microlenses of the microlens array from a certain other direction and are measured, sampled and/or detected by a subset of the photosensors of the photosensor array.

1. The light field image data is acquired, captured and/or received. An output image (for example, a refocused output or virtual image) may be obtained, generated and/or computed using the captured light field data corresponding to light from the entire aperture, that is, from all directions (FIG. 1). Using at least two subsets of light field image data of a data acquisition or exposure, each subset of light field data corresponding to captured light rays (or bundles of light rays) that came from a certain direction (e.g., the left or the right) provides an image or refocused image that corresponds to an image that could or would have been captured using a different, virtual aperture. As such, when implementing the 3D light field processing according to the present inventions, the one physical aperture of the light field data acquisition device or camera may be characterized, considered and/ or illustrated as having a plurality of virtual apertures (two or more). (FIG. 2 illustrates two virtual apertures).

Figure 3:
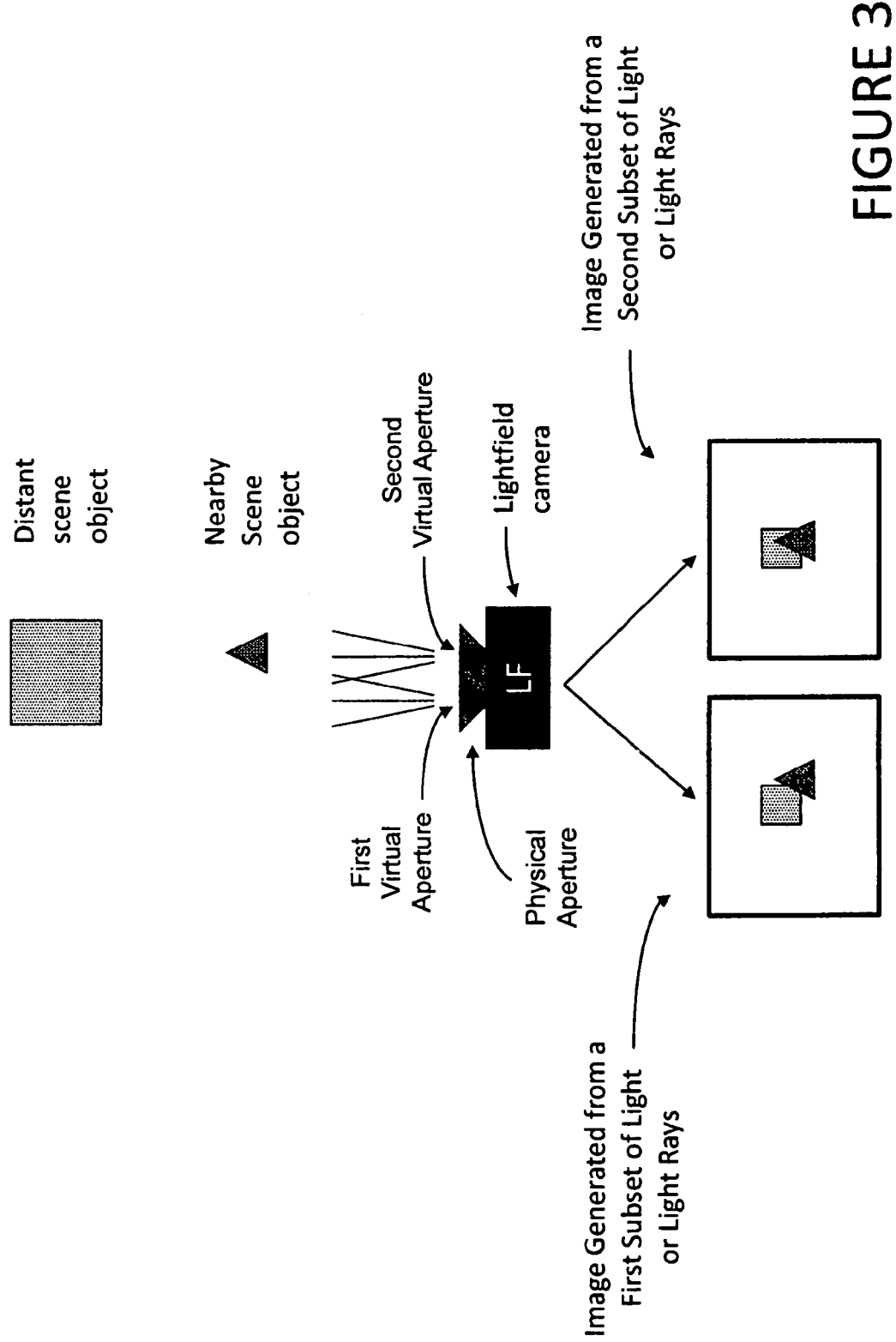
FIG. 3 is a block diagram representation of a light field data acquisition device or camera, according to at least certain aspects of certain embodiments of the present inventions, having two virtual apertures resulting from processing circuitry generating a first image using a first subset of light or light rays from a first direction and generating a second image using a second subset of light or light rays from a second direction, wherein the two images include a disparity (for example, a stereo-like disparity)

2. With that in mind, from the light field captured, sampled and/or acquired using a light field data acquisition device or camera having one physical aperture, two different virtual apertures may be simulated to generate, produce and/or provide at least two subsets of light field image data for each data acquisition or exposure. Each subset of light field data may generate a different output image, wherein each image includes a perspective shift (for example, horizontal) relative to the other image, thereby generating, producing and/or providing two images of the scene from different perspectives (FIG. 3). The perspective shift may be characterized as conceptually akin to that which occurs when moving your head from side to side: nearby objects and distant objects change position relative to each other.

Figure 4:
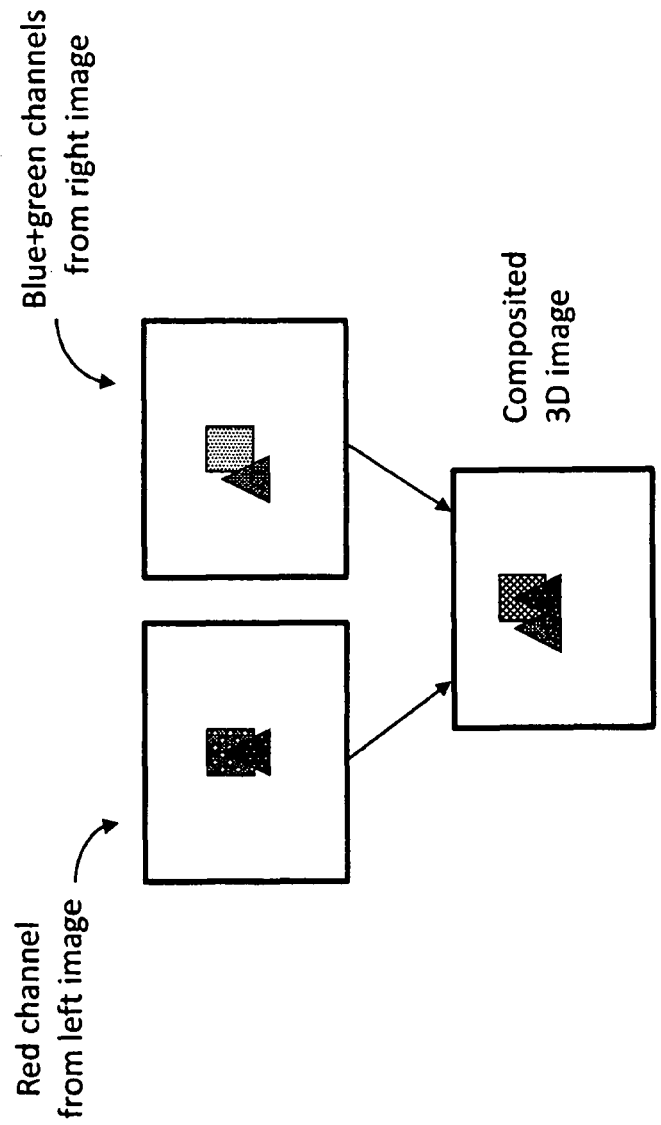
FIG. 4 is a block diagram illustration of an exemplary embodiment of the 3D encoding process according to at least certain aspects of certain embodiments of the present inventions, wherein the two images with stereo disparity may be viewed in 3D by taking a first color channel (for example, red) from the left image and second color channels (for example, blue and green) from the right image and generating a single, composite image; as such, when viewed with red/cyan glasses the image depicts or includes a 3D effect; notably, the present inventions may employ other 3D encoding techniques or methods; indeed, the present inventions may employ any encoding or processing method, whether now known or later developed, to generate images of a scene from different perspectives to thereby provide or produce a 3D effect.

3. The two related images, for example, one from the "left" perspective and one from the "right" perspective, may be further processed (for example, encoded and/or combined) to generate, produce and/or provide a 3D image. In one embodiment, such 3D processing may employ separate red/blue/green color channels to encode the two different images and view them with red/cyan glasses (FIG. 4). Other techniques or methods of encoding and/ or viewing 3D images may be employed, for example, 3D processing techniques that make use of glasses which include polarization and/or high-frequency shutters. Notably, other 3D processing techniques or methods that don't require special glasses may employ or include lenticular arrays. Indeed, the present inventions may employ any encoding or processing method, whether now known or later developed, to generate images of a scene from different perspectives to thereby provide or produce a 3D effect.

Perspective Changes

Within the Main Virtual Aperture Plane

Figure 5:
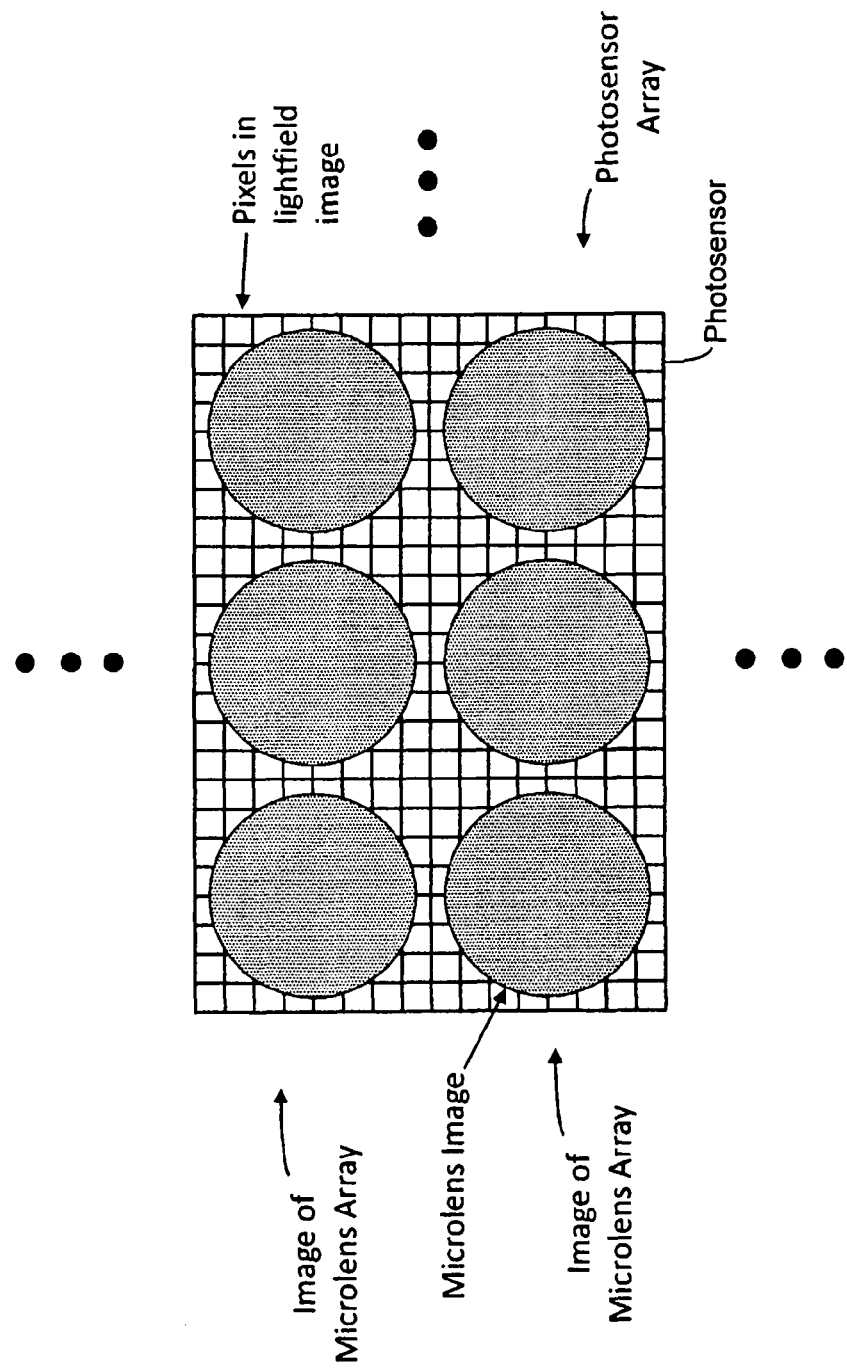
FIG. 5 is a representation of a captured light field image including a 2D grid of photosensors of the photosensor array and a 2D grid of microlens images imaged thereon wherein each microlens image corresponds to a view of the physical aperture as seen through a particular lenslet/microlens of the microlens array, projected onto the photosensor array; notably, the present inventions may implement a photosensor array which is rectangular or other shape (for example, circular, square, hexagon, octagon, etc.), photosensors which are square or other shaped (for example, circular, oval, hexagon, octagon, etc.), and/or lenslets/microlenses which are disk or other shaped (for example, oval, square, hexagon, octagon, etc.)
Figure 6:
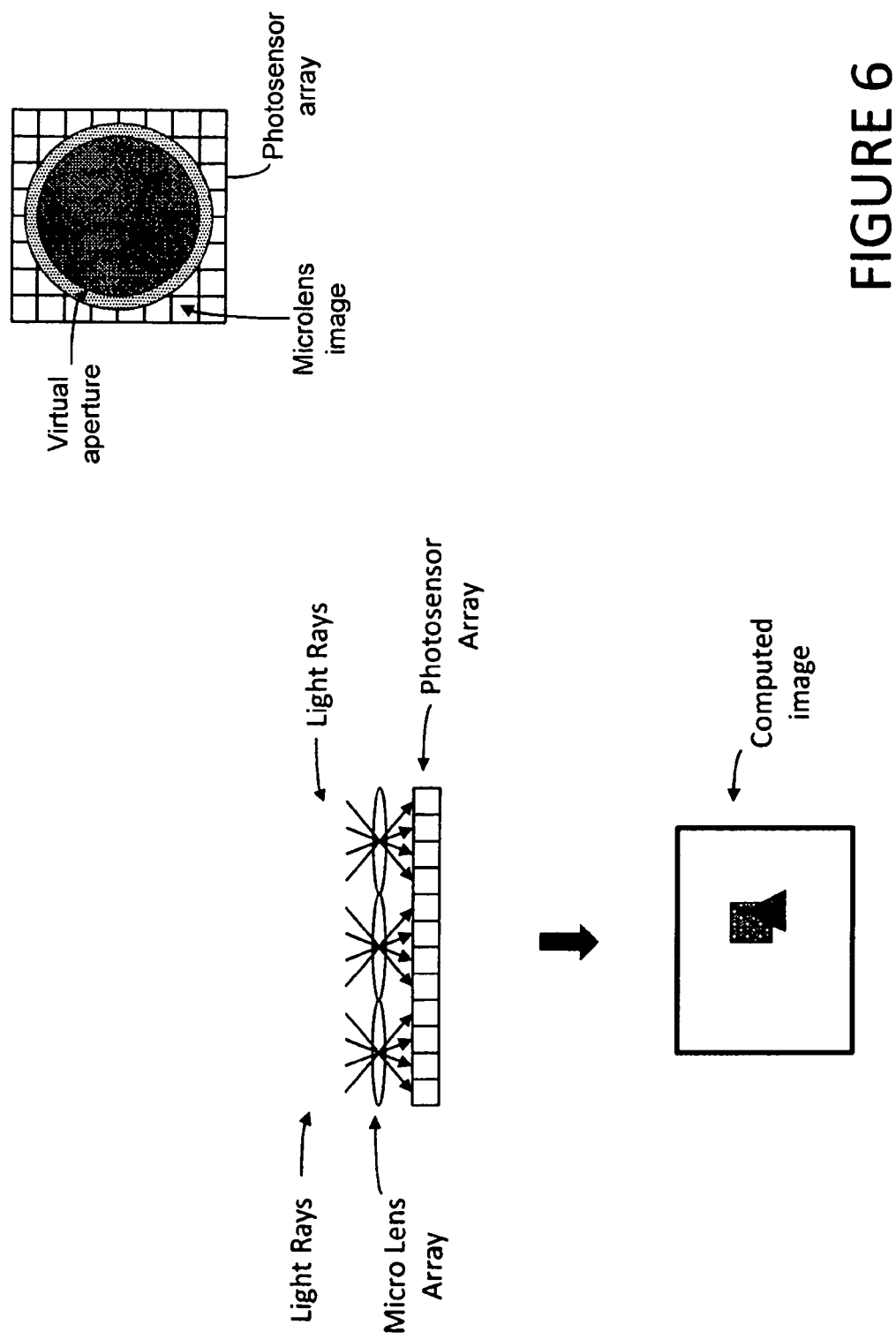
FIG. 6 is an illustration of a microlens image (corresponding to a view of the physical aperture as seen through a particular lenslet/microlens of the microlens array, projected onto the photosensor array) in conjunction with or compared to a virtual aperture—both overlayed on an associated portion of the photosensor array of the light field acquisition device, wherein light or light rays from all directions is/are used to generate an image (for example, a refocusable image); in this illustration, a cross-section of a portion of a microlens array (ML array) and a portion of photosensor array are depicted wherein light or light rays from all directions, as measured by the associated photosensors of the photosensor array, is/are used by processing circuitry to generate an image.
Figure 7A:
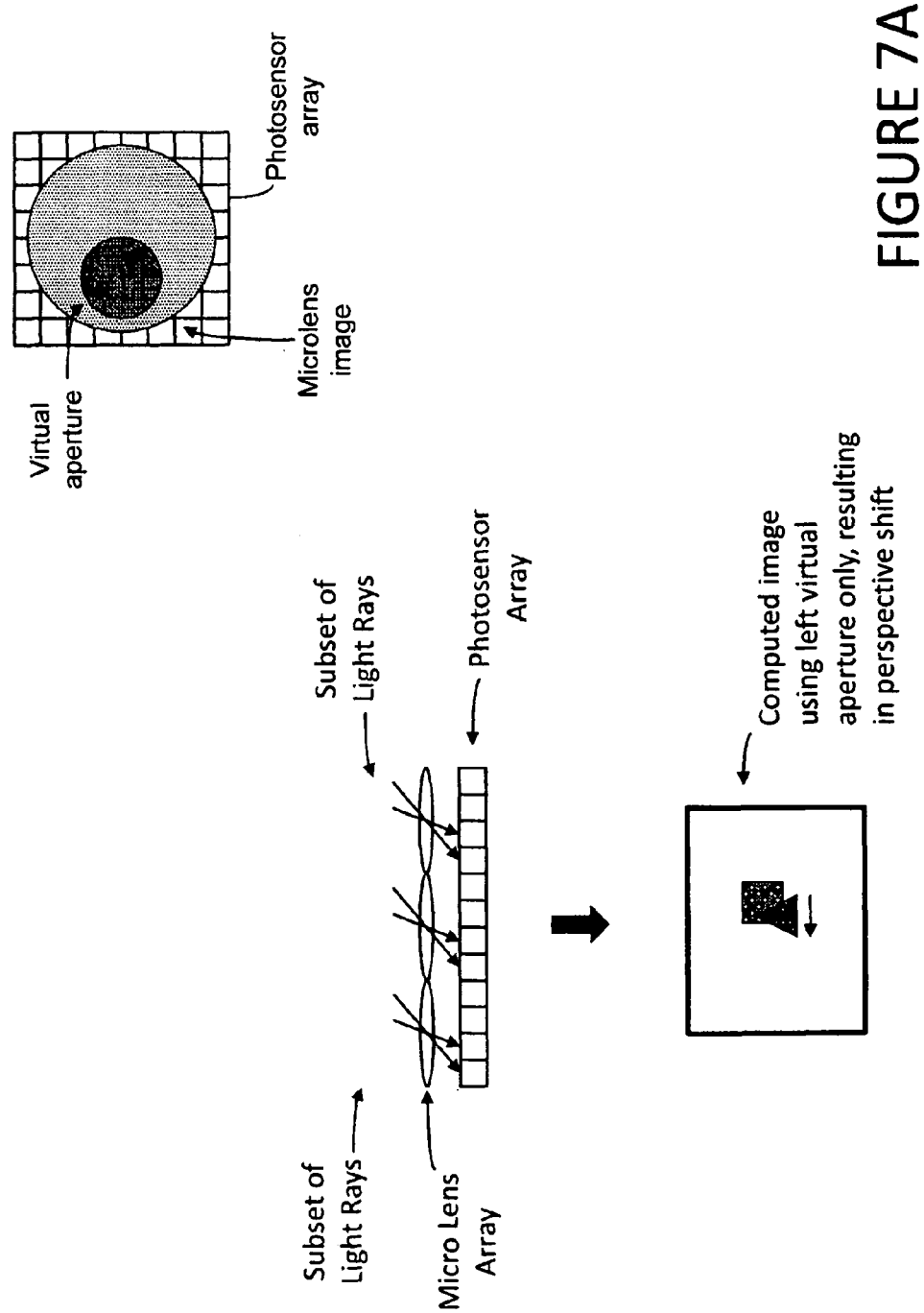
FIG. 7A is an illustration of a microlens image (corresponding to a view of the physical aperture as seen through a particular lenslet/microlens of the microlens array, projected onto the photosensor array) in conjunction with or compared to a virtual aperture—both overlayed on associated portion of the photosensor array of the light field data acquisition device or camera, according to at least certain aspects of certain embodiments of the present inventions; wherein the virtual aperture corresponds to or is associated with the data used by the processing circuitry to generate an image wherein the data corresponds to a subset of light or light rays (illustrated as solid lines) from a certain direction which correlates to the associated virtual aperture; in this illustrated embodiment, light or light rays from a certain direction (from the left), as measured or sampled by a subset of the photosensors of the photosensor array which are associated with the microlens, is/are used by processing circuitry to generate an image (for example, a refocusable image); a cross-section of a portion of a microlens array (ML array) and a portion of photosensor array are depicted in conjunction with the subset of light or light rays from a certain direction; wherein the image generated by the processing circuitry includes a perspective shift relative to the image of FIG. 6.
Figure 7B:
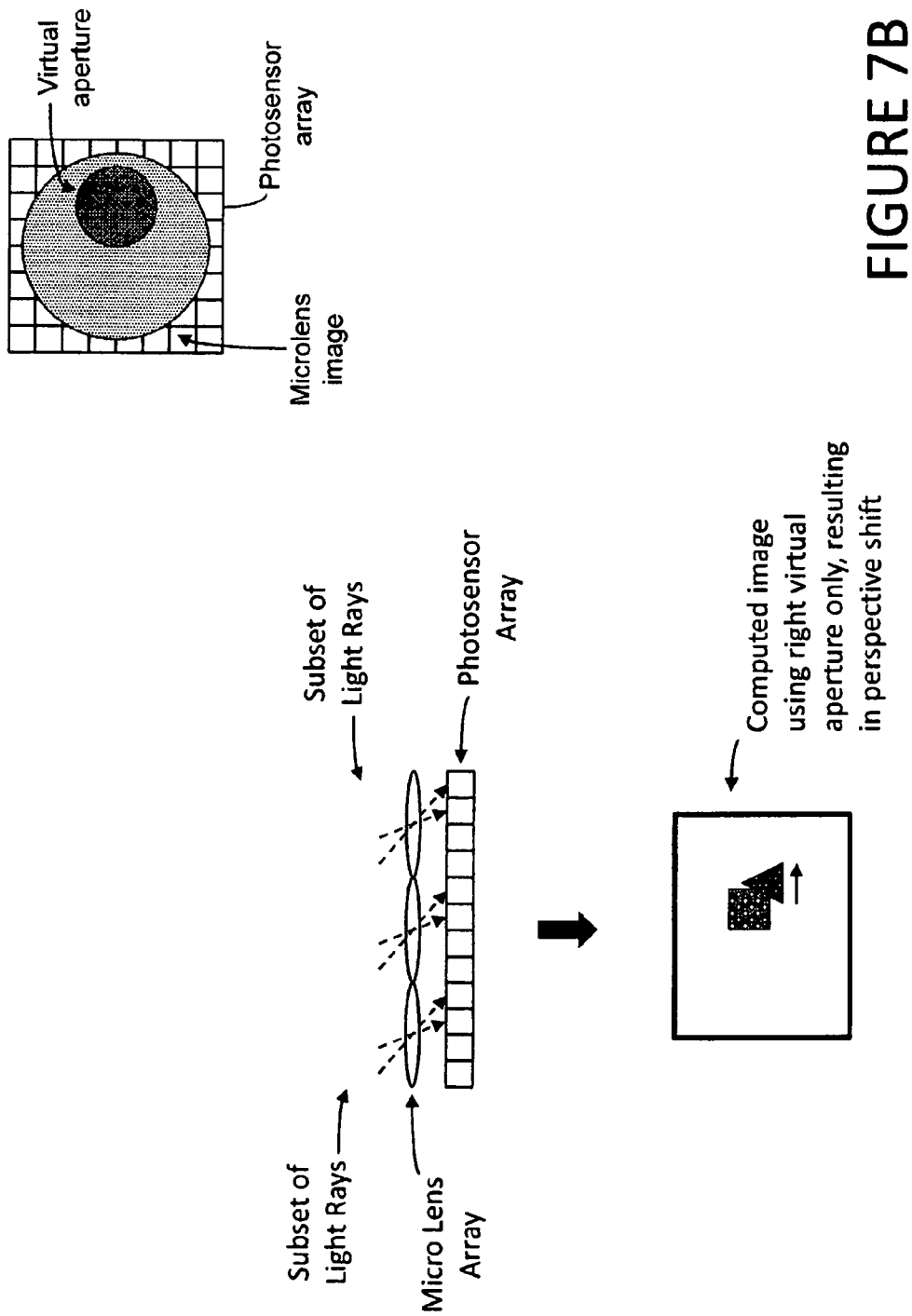
FIG. 7B is an illustration of a microlens image (corresponding to a view of the physical aperture as seen through a particular lenslet/microlens of the microlens array, projected onto the photosensor array) in conjunction with or compared to a virtual aperture—both overlayed on associated portion of the photosensor array of the light field data acquisition device or camera, according to at least certain aspects of certain embodiments of the present inventions; wherein the virtual aperture corresponds to or is associated with the data used by the processing circuitry to generate an image wherein the data corresponds to a subset of light or light rays (illustrated as dotted lines) from a certain direction which correlates to the associated virtual aperture; in this illustrated embodiment, light or light rays from a certain direction (from the right), as measured or sampled by a subset of the photosensors of the photosensor array which are associated with the microlens, is/are used by processing circuitry to generate an image (for example, a refocusable image); a cross-section of a portion of a microlens array (ML array) and a portion of photosensor array are depicted in conjunction with the subset of light or light rays from a certain direction; wherein the image generated by the processing circuitry includes a perspective shift relative to the images of FIGS. 6 and 7A.

An aspect to generating, viewing and/or producing a 3D stereo image from a light field is computing at least two different output images (for example, refocused images) with different perspectives or viewpoints—that is, each output image includes a perspective or viewpoint that is different from another of the output images. FIG. 5 illustrates a number of microlens images, each corresponding to a view of the physical aperture as seen through a particular lenslet/microlens of the microlens array, projected onto the photosensor array. In the illustrative embodiment, the captured image comprises a grid of 2D microlens images, and FIG. 6 generally illustrates processing the light field data and computing an image or refocused image using light rays (or bundles of light rays) available via the entire physical aperture. FIG. 7A generally illustrates processing the light field data and computing a refocused image using a left-side virtual aperture. Similarly, a corresponding shift occurs when the right-side virtual aperture is used. (See, FIG. 7B). The scene objects (the triangle and the square) shift relative to each other when the left-side virtual aperture is used, conceptually equivalent to moving your head from side to side when viewing the scene. (Compare FIGS. 6, 7A and 7B).

Figure 8:
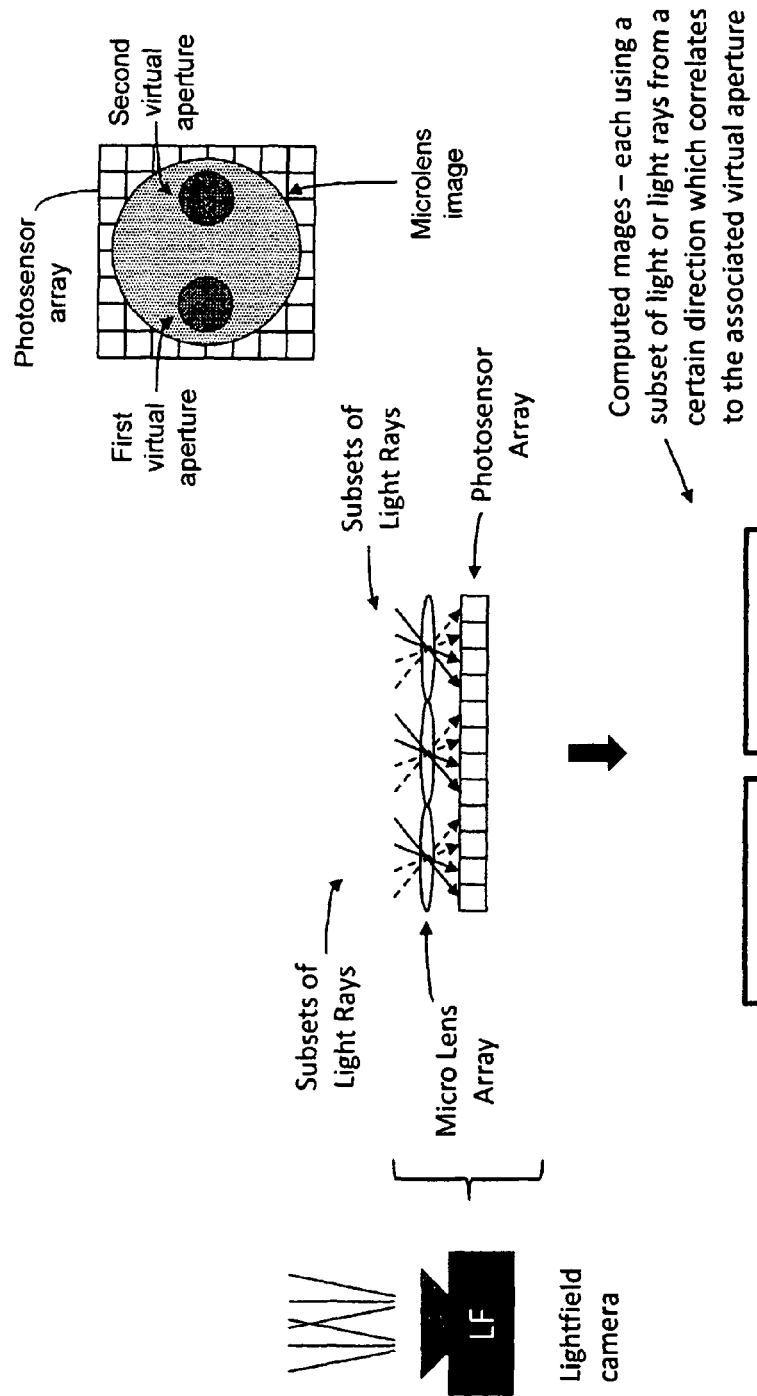
FIG. 8 is a block diagram representation of a light field data acquisition device according to at least certain aspects of certain embodiments of the present inventions wherein a first subset of light or light rays (illustrated as dashed lines) from a first direction are employed to generate a first image of the scene and a second subset of light or light rays (illustrated as solid lines) from a second direction are employed to generate a second image of the scene, wherein the two images of the scene are from different perspectives; notably, selectively using a first subset of light or light rays from a first direction and a second subset of light or light rays from a second direction may thereby characterize the single physical aperture of the light field data acquisition device as two virtual apertures, wherein (i) the first subset of light or light rays (illustrated using dashed lines), which is/are associated with or correlate to the first virtual aperture, is/are incident on and measured, sampled and/or detected by certain photosensors of the photosensor array which are associated with the microlens and (ii) the second subset of light or light rays (illustrated using solid lines), which is/are associated with or correlate to the second virtual aperture, is/are incident on and measured, sampled and/or detected by certain other photosensors of the photosensor array which are associated with the microlens; notably, using left/right virtual apertures to produce images with left/right stereo disparity corresponds to selecting virtual apertures on left and right sides of each microlens of the microlens array.

FIG. 8 illustrates two virtual apertures (for example, a matched pair) that may be used to produce first and second perspective images (for example, left- and right-shifted perspective images) using a single light field image captured using a light field data acquisition device or camera having one physical aperture.

In this regard, the light field image data is acquired and/or captured via the light field data acquisition device or camera. Two related output images (for example, two refocused output or virtual images) may be obtained, generated and/or computed using the captured light field data corresponding to light that came from two different directions (e.g., the left and the right—one of the subsets of light illustrated in solid lines and another subset of light illustrated in dashed lines). The subsets of light field image data provide two images that correspond to images that could or would have been captured using two different, virtual apertures. As such, when implementing the 3D light field processing according to the present inventions, the one physical aperture of the light field data acquisition device or camera may be characterized as having a plurality of virtual apertures (two virtual apertures in this illustrated exemplary embodiment).

With continued reference to FIG. 8, from the light field captured, sampled and/or acquired via a light field data acquisition device or camera having one physical aperture, two different virtual apertures may be simulated to generate, produce and/or provide at least two subsets of light field image data for each data acquisition or exposure. Each subset of light field data may generate a corresponding output image, wherein each of those images includes a perspective shift (for example, horizontal) relative to the other image, thereby generating, producing and/or providing two images of the scene from different perspectives.

Thereafter, the two related images, for example, one from the "left" perspective and one from the "right" perspective, may be further processed (for example, encoded and/or combined) to generate, produce and/or provide a 3D image. As noted above, the present inventions may employ any encoding or processing method, whether now known or later developed, to generate images of a scene from different perspectives to thereby provide or produce a 3D effect.

Notably, the data processing in connection with the embodiments described and illustrated herein may be implemented with processing circuitry disposed (in part or in whole) in/on the light field acquisition device or in/on an external processing system. As discussed in detail below, the processing circuitry may include one or more microprocessors, Application-Specific Integrated Circuits (ASICs), digital signal processors (DSPs), and/or programmable gate arrays (for example, field-programmable gate arrays). Indeed, the processing circuitry may be any type or form of circuitry whether now known or later developed. For example, the processing circuitry may include a single component or a multiplicity of components (microprocessors, ASICs and DSPs), either active and/or passive, which are coupled together to implement, provide and/or perform a desired operation/function/application.

Further, in operation, the processing circuitry may perform or execute one or more applications, routines, programs and/ or data structures that implement particular methods, tasks or operations described and illustrated herein. The functionality of the applications, routines or programs may be combined or distributed (for example, among a plurality of processors).

Further, the applications, routines or programs may be implemented by the processing circuitry using any programming language whether now known or later developed, including, for example, assembly, FORTRAN, C, C++, and BASIC, whether compiled or uncompiled code; all of which are intended to fall within the scope of the present inventions.

Figure 9C:
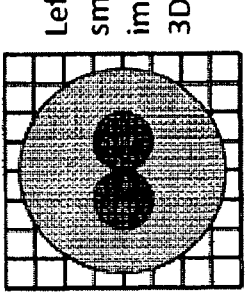
Figure 9D:
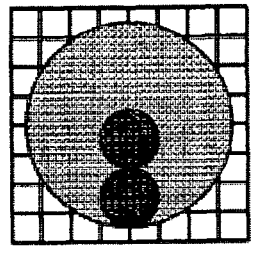
Figure 9A:
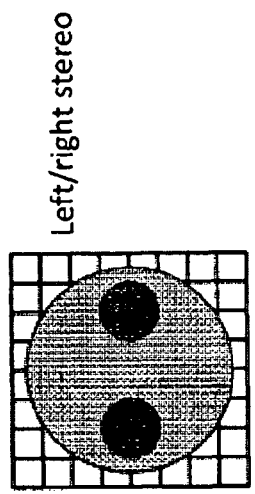
Figure 9B:
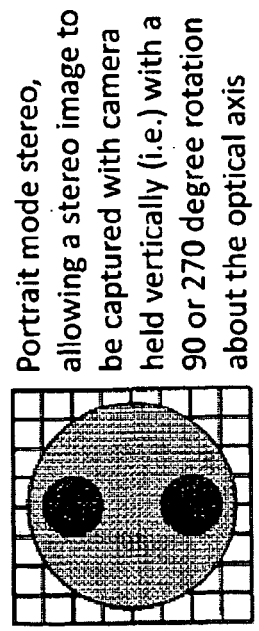
Figure 9J:
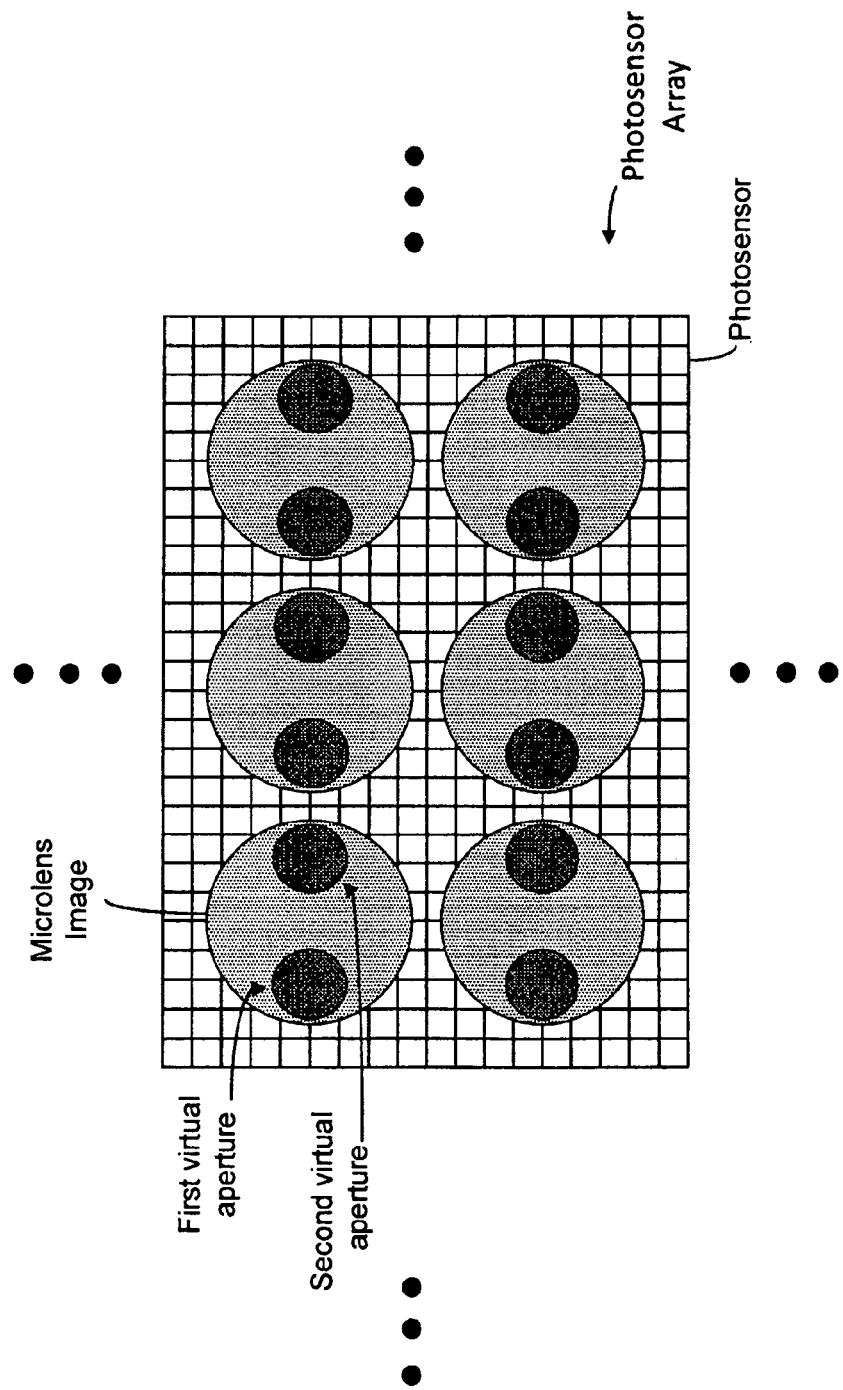
FIG. 9J illustrates an exemplary embodiment of a configuration of a particular virtual aperture pair in connection with a plurality of microlens images (each corresponding to a view of the physical aperture as seen through a particular lenslet/microlens of the microlens array, projected onto the photosensor array), according to at least certain aspects of certain embodiments of the present inventions; notably, for the sake of brevity, the exemplary embodiments of virtual apertures illustrated in FIGS. 9A-9I are not presented in array form as is the virtual aperture pair illustrated in FIG. 9J.

The light field data may be processed, captured and/or sampled to provide two or more virtual apertures—notwithstanding the light field data acquisition device or camera may include one physical aperture. In this regard, any two virtual apertures may be used to compute a pair of output refocused images from different perspectives. FIGS. 9A-9I and 25A-25D illustrate exemplary embodiments, thereby illustrating a range of 3D effects that may be achieved by processing the captured light field image with different virtual aperture pairs. The different axes along which pairs of virtual apertures may be chosen, for example, include:

1. The distance between the virtual apertures, ranging from close together (FIGS. 9C, 9D) to further apart (FIGS. 9A, 9B and 9G).
   a. Using virtual apertures that are farther apart will result in a pair of output images with a larger perspective shift between them, resulting in a correspondingly greater stereo disparity (i.e.) a greater amount of 3D effect in the output image.
   b. Moving the virtual apertures closer together similarly results a smaller stereo disparity in the output image, until the distance between the virtual apertures becomes zero and the resultant output image is 2D.
2. The distance from the main aperture origin of the virtual apertures.
   a. Virtual apertures that are not centered about the origin (FIG. 9D) result in an output image with a perspective shift, in this case to one side.
   b. The pair of virtual apertures could similarly have been placed above or below the horizontal axis, resulting in a perspective shift equivalent to moving your head up or down as you view the scene (FIG. 9I).
3. The rotational angle between the line joining the two virtual apertures and the horizontal axis.
   a. The 3D effect requires that the displayed images have left and right perspective-shifted components since the human eyes are left and right along a horizontal axis, however the ability to select the angle along which to choose virtual apertures permits the light field data acquisition device or camera to be rotated when the light field image is captured and still produce a left/right stereo effect in the output image.
   b. A 90-degree or 270-degree rotation corresponds to portrait mode (FIG. 9B), and arbitrary rotations are also possible (FIG. 9G). Note that the mapping from top/bottom virtual apertures to left/right refocused images depends upon the portrait orientation (90- or 270-degrees).
   c. Note that any dual-conventional-camera setup is only able to capture a pair of images along a single horizontal axis. Taking rotated (incl. portrait mode) images by rotating the camera pair during capture is not possible with this setup, however it is possible with a light field data acquisition device or camera.
   d. A finer-grained rotation, for example by a few degrees, when performed in post-processing permits the computed images to be aligned as desired by the user while still producing a perfect horizontal 3D disparity. An example of the usage of this feature is to slightly rotate an image to align the horizon in the captured scene with the horizontal axes of the image. If the image pair captured by a conventional dual-camera system is slightly rotated with respect to the horizon, then rotating the images after capture cannot yield the same perfect horizontal 3D disparity.
4. The size and shape of the virtual apertures.
   a. As with 2D refocusing, using a larger aperture results in a shallower depth of field in the output image, and vice-versa. This control of the depth-of-field may be employed, for example, when generating a 3D stereo image (FIGS. 9E, 9F, 9H) by controlling the size and shape of each virtual aperture.
   b. Small virtual apertures result in 3D images with a large depth of field, and large virtual apertures allow refocusing in 3D over shallow depths of field.

Notably, each characteristic, feature and/or aspect of the virtual apertures (for example, size, shape and/or relative locations) may be predetermined prior to data acquisition and/or defined, determined, adjusted, changed and/or adapted after data acquisition. For example, after data acquisition via the light field data acquisition device or camera, the user may select the characteristics of the virtual apertures to, for example, provide the desired 3D image. In this regard, the user may, after acquisition of the light field data, electronically define (or redefine) the size, shape and/or locations of the virtual apertures. In response, processing circuitry, using the acquired light field data, determines the light field image data associated with each of the virtual apertures and generates, computes and/or determines each image based thereon. Such data processing is discussed in more detail below.

Above or Below the Main Virtual Aperture Plane

Figure 10:
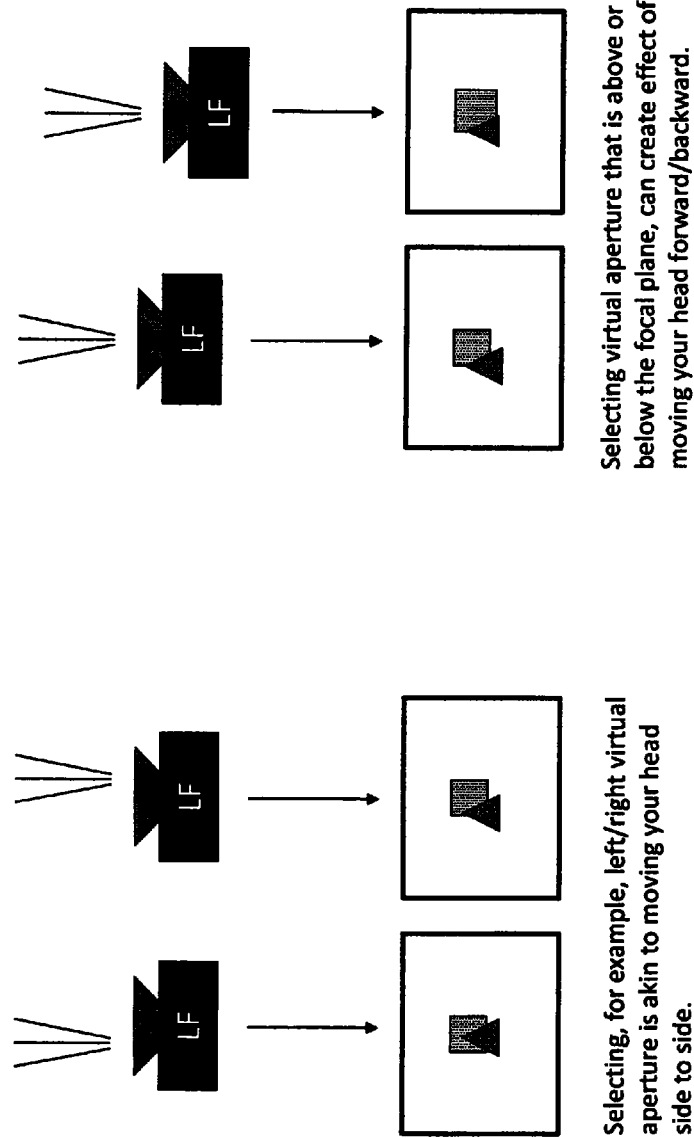
FIG. 10 illustrates an exemplary embodiment of a perspective shift in output images by providing a plurality of virtual apertures which are in different virtual aperture planes, according to at least certain aspects of certain embodiments of the present inventions; notably, this is akin to adjusting, forming and/or moving virtual apertures forward/backward in contrast to adjusting, forming and/or moving virtual apertures left/right.

In addition to, or in lieu of using virtual apertures that are in or on the same virtual aperture plane, the present inventions may be implemented using virtual apertures which are in different virtual aperture planes. In this way, the image data corresponding to a first virtual aperture is in a first virtual aperture plane and the image data corresponding to a second virtual aperture is in a second virtual aperture plane. This rendering conceptually results in an effect where it appears the camera moves toward or away from the subject, as illustrated in FIG. 10. Such a configuration or embodiment provides a perspective shift equivalent to moving your head closer to or farther from the scene objects.

To further illustrate this concept, it can be noted that a virtual aperture's location can be considered as point in a 3D space, where moving the location of the virtual aperture within this 3D space is equivalent to "moving your head" in a corresponding manner within the 3D region about the imaging device's physical aperture. The "main virtual aperture plane" conceptually coincides with the physical aperture plane, and moving the virtual aperture's location within the main virtual aperture plane may be used to generate perspective views of the scene corresponding to "moving your head" left/right/up/down within the physical aperture plane. Conceptually moving the virtual aperture above or below the main virtual aperture plane corresponds to "moving your head" forward or backwards in relation to the physical aperture, and can be thought of as moving the virtual aperture into different virtual aperture planes. FIG. 25E illustrates this concept.

Notably, the image data corresponding to one or more of the images may be generated using the acquired light field data and thereafter refocusing a portion (or all) of thereof to generate a refocused image which includes a virtual focal plane that is different from the physical focal plane of the light field data acquisition device or camera at/during acquisition of the original light field data. This refocusing process is discussed in detail in U.S. patent application Ser. No. 12/622, 673 ("System and Method for Acquiring, Editing, Generating and Outputting Video Data", Pitts, et al., Nov. 20, 2009), U.S. patent application Ser. No. 12/632,979 ("Light Field Camera and System, and Methods of Using and Manufacturing Same", Knight et al., Dec. 8, 2009), and U.S. patent application Ser. No. 12/698,843 ("Light Field Camera Image File and Configuration Data, and Method of Using, Storing and Communicating Same", Knight et al., Feb. 10, 2010)—as well as application referenced in such foregoing application which are incorporated by reference therein. For the sake of brevity, the foregoing specifically identified applications as well as those applications referenced therein are incorporated by reference herein, in their entirety.

Figure 11:
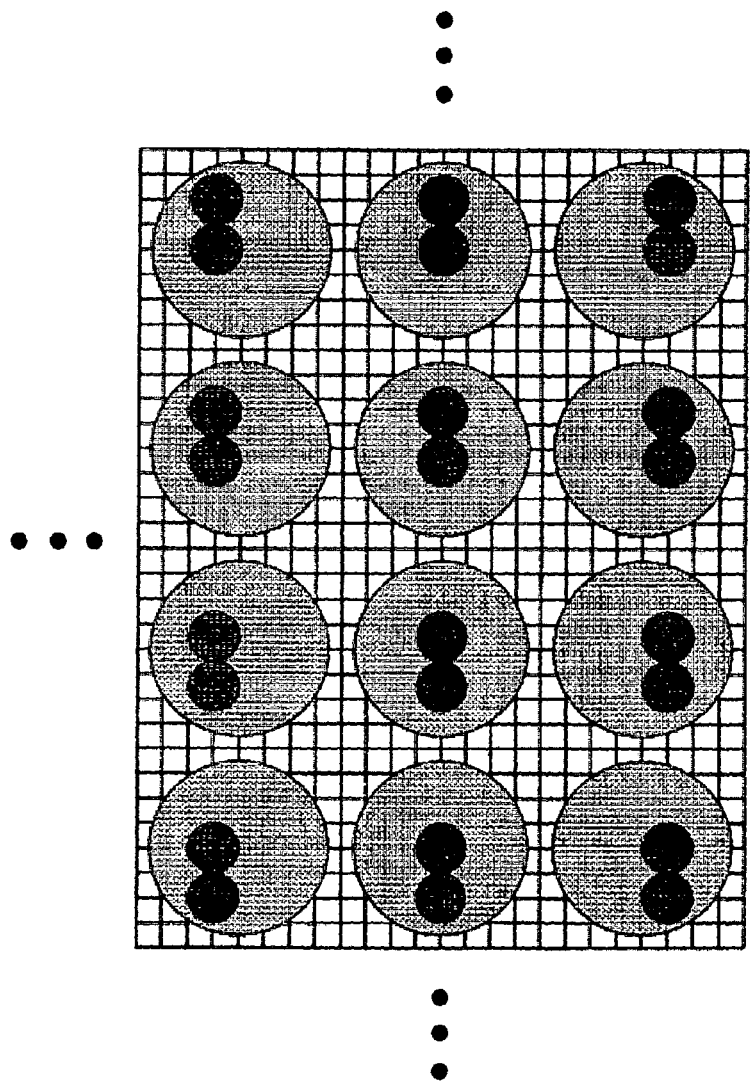
FIG. 11 illustrates an exemplary embodiment of per-microlens-image virtual aperture choices for providing a plurality of virtual apertures which are in different virtual aperture planes thereby providing a forward/backward perspective shift of a 3D image, according to at least certain aspects of certain embodiments of the present inventions, wherein refocusing a virtual aperture above/below the main virtual aperture plane corresponds to selecting a different virtual aperture from each microlens image, based on its location within the light field image.

In one embodiment, moving, providing or selecting different virtual aperture planes may be implemented in refocusing by utilizing a different virtual aperture in each microlens image in the light field image, as illustrated in FIG. 11. Note that this figure, like many aspects of most figures, is not to scale: in practice, there may be thousands to millions of microlenses or lenslets in the microlens array (rather than as illustrated) as well as millions (or more) photosensors of the photosensor array—wherein hundreds (or more) of photosensors are associated with one of the microlenses or lenslets of the microlens array, and the forward/backward perspective shift may be achieved by very small changes in the virtual aperture positions between neighboring microlens images.

Implementing Virtual Aperture Shifts

There are many ways to process a light field to produce an output refocused image, one of which comprises three main components: (1) ray processing that preserves high-frequencies for high output image resolution (high-frequency ray processing); (2) a method to detect and eliminate aliasing in out-of-focus blur regions (correction of out-of-focus aliasing); and (3) a method to control artifacts in output images related to variations in spatial intensity (correction of spatial intensity variations).

High Frequency Ray Processing

In one implementation, the resolution of output images may be improved by exploiting structured aliasing and oversampling in the recorded light field in order to extract high frequency, alias-free detail.

Aliasing occurs in the 4D light field space, because the set of rays measured by each sensor pixel in the light field acquisition device is not band-limited, and contains high frequencies. In light field acquisition device designs utilizing a microlens array, the set of recorded rays typically is the set of rays passing through the aperture of the microlens array, and the physical extent of the sensor pixel. The microlens and sensor pixels have areas with hard boundaries, which capture high-frequency information above the Nyquist rate of the microlens and sensor sampling frequencies.

Figure 12:
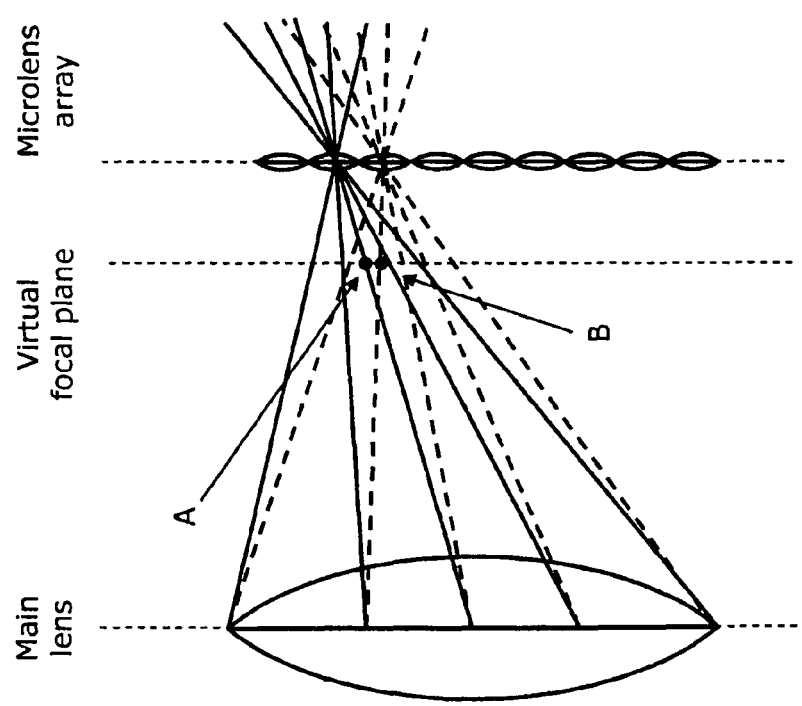
FIG. 12 is an illustration of an exemplary embodiment of oversampling in the recorded light field due to spatial proximity of the set of ray-bundles that come from pixels under different microlenses, some of which converge closely in space, according to at least certain aspects of certain embodiments of the present inventions; notably, ray bundles from different microlenses come very close together on various virtual focal planes, for example, at positions A and B on FIG.

Oversampling occurs not in the 4D light field space, but in various 2D focal planes due to spatial proximity of the set of ray-bundles that come from pixels under different microlenses, some of which converge closely in space. For example, FIG. 12 illustrates that ray bundles from different microlenses come very close together on various virtual focal planes, for example, at positions A and B on FIG. 12. The separation is less than the separation between neighboring ray bundles from the same microlenses.

Improved resolution is obtained in software focusing corresponding to various virtual focal planes by exploiting the dense spatial oversampling of ray bundles passing through the virtual focal plane, and the high-frequency information captured in each aliased ray bundle.

High-frequency image information may be employed by taking into account fractional accuracies between the registration of the microlens array and the grid of sensor pixels. Overview:

Measure an accurate geometric model of optics/microlens array/sensor assembly.

For each sensor pixel, deduce from the geometric model its (x,y,u,v) ray coordinates with sub-pixel precision; single-precision floating point numbers are more than sufficient for this purpose.

Improved resolution is obtained by projecting rays using this fractional accuracy, and using reconstruction filtering that preserves the projected details.

One technique for implementing high-resolution refocusing is:

1. For each source light field pixel (i.e., captured light field sample):
   a Interpret the pixel as a 3D ray inside the light field acquisition device.
   b Calculate its projected location in the computed image. The projected location is a function of the extent to which the captured image is being refocused.
   c Weight the sample according to the aperture being simulated in the computed output image.
      i For example, a broader depth of field can be produced by simulating a narrower aperture.
   d For each output pixel within a radius R of the projected location:
      i Compute the distance D between the output pixel and the projected location.
      ii Compute a weight W=f(D) by applying the reconstruction filter function f to the distance.
      iii Weight the light field sample by W.
      iv Accumulate the weighted sample into the output pixel.

FIG. 13 illustrates a single light field sample, in which the rectangular grid represents the output image pixels. The light field sample is weighted and accumulated into the shaded pixels.

Once all light field samples have been processed, the resultant output image is the desired refocused image. Subsequent processing may apply further image processing operations, for example sharpening and noise reduction, to this refocused image.

The following paragraphs describe this process in more detail.

An exemplary light field acquisition device captures a four-dimensional (4D) light field that is encoded in the captured 2D image. (See, for example, Ren Ng's PhD dissertation, "Digital Light Field Photography", Stanford University 2006, incorporated here by reference in its entirety, for a discussion of the XYUV light field model and the associated 2D encoding).

The XYUV light field coordinates may be expressed in various units. The units employed in this description are as illustrated in FIG. 14 and as described below; define the following variables, where all coordinate variables have normalized units with valid values in the range [0, 1].

(xOut,yOut) is a coordinate in the output (refocused/computed) image.

(x,y,u,v) is a 4D light field coordinate of a source pixel, where the (x,y) components refer to spatial position of the center of the microlens image that the pixel lies within, and the (u,v) components refer to its position within that microlens image.

(s,t) are values which relate to the geometry of the source light field image, where s is the pitch of microlens images across the light field image divided by the width of the light field image (both measured in pixels), and similarly for tin the vertical dimension. In the example of FIG. 14, s=8/24=1/3, and t=8/16=1/2.

By way of example of determining the (x,y,u,v) coordinate of a source pixel, consider the top-left black pixel in FIG. 14, which has the source image coordinate (2,2) using the standard image coordinate system in which the top-left image pixel has the coordinate (0,0).

This black pixel is within the top-left of the 6 microlens images in the light field, whose center location is (4.0, 4.0) in the source image. Normalizing each component of this microlens image's center location by the corresponding light field image width and height (resp.) to a value in the range [0,1] gives (x,y)=(4.0/24.0, 4.0/16.0)= (0.166667, 0.25), to six significant figures.

Within the top-left microlens image, the (2,2) pixel's conceptual center coordinate (2.5, 2.5) is normalized to a position within the microlens image as (u,v)=(2.5/8.0, 2.5/8.0)=(0.3125, 0.3125).

The light field coordinate is hence (x,y,u,v)=(0.166667, 0.25, 0.3125, 0.3125).

Psi ($\psi$) is a value that relates to the refocusing depth of an image. When computing a refocused image, the parameter psi may be used to specify what focus depth to use for the computed refocused image.

Psi=0 corresponds to a refocused image whose focus depth corresponds to that of the captured light field itself; that is, a psi=0 image has objects in focus if they were in focus in the captured light field image. Psi>0 and psi<0 correspond to focus depths that are "further away" and "closer", respectively. FIG. 15 provides an illustration of this.

Given a captured light field sample at light field coordinate (x,y,u,v), and computing a refocused image at a focus depth of $\psi$, the location in the refocused image that the light field sample maps to is given by:

$$xOut = x - \psi * s * (u - 0.5)$$

$$yOut = y - \psi * t * (v - 0.5)$$

A light field coordinate (x,y,u,v) comprises both the spatial location (x,y) and the directional information (u,v) of a light ray. By restricting the rays used to compute a refocused image according to their directional information, different main lens apertures can be simulated. FIG. 16A provides a 1D visualization of the set of captured light field rays that have the same spatial location (x,y); note that this set comprises rays coming from a number of different (u,v) directions.

When simulating a smaller aperture, for example, only (x,y,u,v) light field samples whose (u,v) directional components are within a desired range are used to compute the refocused image, as illustrated in FIG. 16B. This technique permits refocused images to be generated with extended depths of field (EDoF). For example, in one exemplary embodiment, a light field acquisition device may be used to capture an image using an f/4 aperture, and this technique can be used to produce, for example, an image with an f/11 depth of field.

By way of example, a simple aperture function which is characterized as a circle with three-quarters of the radius of the full aperture could be defined as:

$$A(x,y,u,v) = 1, \text{ if } SQRT((u-0.5)^2+(v-0.5)^2) < (0.75*0.5) = 0, \text{ otherwise}$$

Note that aperture functions may be of any shape or size, and may feature a tapered edge rather than a hard edge (as is featured in the example aperture function above).

Light field projection is a geometric computation that comprises the following steps:
1. Given a sensor pixel p in the source image, translate it to an (x,y,u,v) light field coordinate.
2. Given an (x,y,u,v) light field coordinate and an aperture function A, compute the aperture weight $W_A = A(x,y,u,v)$ with which to accumulate this pixel.
3. Given an (x,y,u,v) light field coordinate and a focus depth of y, use the refocusing equations to compute the output image location (xOut,yOut) that the source pixel p maps to.
4. Accumulate the source pixel p into the output image pixels within a local neighborhood of that output image location:
    a For each output pixel in the local neighborhood, compute the reconstruction filter weight with which to accumulate this pixel: $W_R$. (This is described in the following sections.)
    b The total weight with which to accumulate the pixel is $W = W_R * W_A$.

FIG. 17 is a 1D illustration of a reconstruction filter function. The axis titles in FIG. 17 provide an illustration of how the filter is used.

The reconstruction filter may employ, implement and/or include a cubic function, for example as described by Don Mitchell and Arun Netravali in *Reconstruction Filters in Computer Graphics*, ACM SIGGRAPH Computer Graphics 22, 4 (1988), p 221-228. Moreover, the reconstruction filter may employ, implement and/or include a windowed sinc function. Notably, all functions that are consistent with the operation of the present inventions may be employed, implemented and/or included in the reconstruction filter and all such reconstruction filters are intended to fall within the scope of the present inventions.

The reconstruction filter width is the parameter governing the resolution/sharpness of the computed output image. A narrow filter results in a sharp but possibly aliased image, while a wider filter results in a smoother image. Different reconstruction filter sizes are illustrated in FIGS. 18A and 18B, which depict examples of the extent to which source light field samples are "spread out" when accumulated into the output image.

Note that the term "filter width" here refers to the sizing of a filter such that its shape doesn't change, as is illustrated in FIGS. 19A and 19B, which represent an example where the right filter's width (FIG. 19B) is half that of the left filter's (FIG. 19A). Note also that, as discussed herein, different reconstruction filter shapes may be employed in the present inventions. Indeed, all reconstruction filter shapes that are consistent with the present inventions may be employed and/or implemented and all such reconstruction filters are intended to fall within the scope of the present inventions.

A practical method for determining the filter width to use is to build up an empirical database that selects the best filter width for set of given refocusing depths, and to interpolate within this database for any desired depth. The database may be manually constructed by producing images with different filter widths for a range of refocusing depths and then choosing the filter width that results in the sharpest artifact-free image for each. Automated approaches to selecting the filter width via image analysis are also possible.

There are no hard and fast rules for what constitutes the best filter size, as there is a subjective component—different people may prefer images that have been filtered differently. As a general guideline, reasonable filter widths for the cubic reconstruction functions may fall within the range of ($M*(N+\psi)$ to ($3*M*(N+\psi)$)) for sharpest output, and may be around (5*M*(N+ψ)) for aliasing-free ("out-of-focus") output (as described herein), where M=(output image width/source light field image width), and N=the number of source pixels across each light field microlens image.

A variation on the above implementation that reduces the computational cost of the refocusing techniques is to make the projection and reconstruction operations into a two-pass operation:
1. Pass 1
   a For each source light field pixel (i.e., captured light field sample):
      i Compute its projected location in the computed image. The projected location is a function of the extent to which the captured image is being refocused. (This is the same as in the above).
      ii Accumulate the light field sample into a "small neighborhood" around that output image location. The neighborhood size is independent of the reconstruction filter size.
   b The resultant image is referred to as the "projection image".
2. Pass 2:
   a Perform reconstruction filtering on the image produced by pass 1.

FIG. 20 illustrates the accumulation of a light field sample into two example projection image neighborhoods. The nearest neighbor approach writes each light field sample into a single output pixel (the nearest one to the projected output location), and the bilinear approach spreads each light field sample out into a 2×2 grid of the projection image.

Once the first pass has completed, the projection image comprises a grid of unevenly weighted pixels, where the weight of each pixel is a function of how many light field samples were accumulated into it. FIG. 21 is an example projection image illustrating this, with the darkness/lightness of each pixel representing its weight.

In pass two of the technique, the reconstruction filter is applied to the projection image to compute the final output image. Once reconstruction filtering is complete, the per-pixel weights are divided into their corresponding pixel color values, resulting in a reconstructed image that is comprised of evenly weighted pixels.

The performance improvements of this approach stem from two sources:
1. The reconstruction filtering performs a number of operations that is tied to the number of projection image pixels. In the originally presented technique, the reconstruction filtering performs a number of operations that is tied to the number of light field samples.
2. The reconstruction filter itself can be implemented, for example as a separable convolution on the projection image, rather than as a 2D filtering operation for each pixel.

The above implementation can be used to generate output images with shifted perspectives. For a desired perspective center within the same virtual aperture plane, expressed as (uc,vc) in the same normalized (u,v) coordinate system as above, the refocusing equations are modified to become the following, where setting (uc,vc)=(0.5, 0.5) would keep the perspective centered:

$$xOut = x - \psi * s * (u - uc)$$

$$yOut = y - \psi * t * (v - vc)$$

and the aperture weight is calculated from the aperture function by A(x, y, u−uc+0.5, v−vc+0.5).

A perspective shift forward/backward between different virtual aperture planes may be similarly implemented via the following modifications, where mx and my are multipliers, and (mx,my)=(0,0) corresponds to not shifting the virtual aperture forward/backward:

$$xOut = x - \psi * s * (u - uc + (x - 0.5) * mx)$$

$$yOut = y - \psi * t * (v - vc + (y - 0.5) * my)$$

with the aperture weight A(x, y, u−uc+(x−0.5)*mx+0.5, v−vc+(y−0.5)*my+0.5). This is illustrated in FIG. 11, wherein the virtual aperture position within each microlens image is different, and notably in this illustration, the further from the center of the photosensor lies a particular microlens image, the further "outwards" the virtual aperture location within that microlens image moves, The amount of "dilation/contraction" or "spreading" of virtual aperture positions is determined by the values of mx and my, where more positive values correspond to greater "dilation" or "spreading out" of virtual aperture locations, and more negative values correspond to greater "contraction" of virtual aperture locations.

Correction of Out-of-Focus Aliasing

The light field processing computes an output image from a light field that contains both high detail and minimal aliasing by reconstructing computed images with some knowledge of the world scene. In particular, rays of light that originate from objects that are in focus in a computed image may be reconstructed differently from rays of light originating from objects that are out of focus—that is, may be filtered with different reconstruction filter sizes. This may be required to eliminate aliasing artifacts in out-of-focus image regions that may manifest when the reconstruction filter size is tuned for maximum sharpness in in-focus image regions.

The approach is as follows:
1. From the source light field image, compute a set of sub-aperture images, as described in Ren Ng's PhD dissertation, "Digital Light Field Photography", Stanford University 2006, incorporated here in its entirety by reference in its part regarding computing a set of sub-aperture images. These sub-aperture images are low-resolution, broad depth of field, perspective views of the world scene.
2. Using these sub-aperture images, compute a scene depth map using existing techniques that take as input a set of images of a scene from different perspectives, for example image registration techniques (as discussed, for example, by B. D. Lucas and T. Kanade in *An iterative image registration technique with an application to stereo vision*, Proceedings of Imaging Understanding Workshop (1981), pages 121-130).
   a There is a substantial body of research in the literature about computing depth maps from such source data, and the light field processing methods described herein will work with any of these algorithms.
   b Express the computed depth map as a function that maps (xOut,yOut) output image spatial coordinates to depths, where the depths are expressed in the units of psi.
3. Using the depth map, a focus mask image can be created for the desired output focus depth psi (ψ), in which each (xOut,yOut) output image coordinate maps to a value in the range [0,1], where 0 denotes an out-of-focus spatial location in the output image, and 1 denotes an in-focus location.
   a For each depth map coordinate (xOut,yOut), set the corresponding focus mask image value according to the difference between the desired output image ψ and the depth map's iv, for example by the following equation (clamping the result to the range [0,1]):

FocusMask[xOut,yOut]=1.0−0.25*abs($\psi$−DepthMap[xOut,yOut])

4. When performing the reconstruction filtering step in producing an output refocused image, vary the reconstruction filter width at each (xOut,yOut) point in the output image according to the value corresponding to the (xOut,yOut) coordinate in the focus mask image.
   a. Choose the reconstruction filter sizes to use for in-focus and for out-of-focus output image regions, for example as described in the previous sections; call the filter widths wi and wo, respectively.
   b. Use a spatially varying reconstruction filter (e.g. a cubic), where the width of the filter at each output image location (xOut,yOut) is calculated as:

$w=wi*$FocusMask$[x$Out$,y$Out$]+wo*(1.0−$FocusMask$[x$Out$,y$Out$])$

Correction of Spatial Intensity Variations

Capturing light field data on a light field sensor can result in certain specific artifacts that may result in image quality artifacts when a light field is processed to create an output image.

As illustrated in FIG. 22, light passing through each microlens/lenslet in the microlens array illuminates a certain area on the image sensor. The boundaries of the projected microlens/lenslet image will fall across some number of capture elements on the image sensor.

Any capture elements that receive partial illumination will record a partial value corresponding to the partial illumination. If the partial illumination is not accounted for in some manner, the image created during output image computation will have various visual artifacts due to the partial illumination of the boundary pixels.

Some imaging sensors have different light capture efficiencies based on the angle of incidence of the incoming light ray. In some digital camera sensors, a larger fraction of light hitting a pixel at a target angle is captured than light arriving off of the target angle. In a light field sensor, pixels at different locations under the projected microlens/lenslet image will have photons arriving over a different distribution of angles. As a result, certain pixels under the project microlens/lenslet image will have different capture efficiencies, and thus potentially different recorded values based on the same number of input photons.

FIG. 23 illustrates two different pixels receiving an identical number of photons, but from different angles, where the capture efficiency of the first pixel is e1 and the second pixel is e2. Although the total incoming light is the same, the recorded values will only be the same if the capture efficiencies are also the same. In many systems, the capture efficiencies would vary based on the incident angle, and the recorded values would be different.

A technique for addressing these artifacts is to pre-process the light field image prior to refocusing or computing other output images from it. This pre-processing step adjusts source pixel values to account for the aforementioned sources of intensity variation. In the ideal case, the adjustments would perfectly reverse all such variations, however due to pixel saturation, such perfection in unattainable; if a pixel was recorded saturated, then there is no way to know what its "true" value would have been (in terms of the intensity of light that was actually incident on it), and thus there is no way to determine what its "true" value should be after adjustment.

There are multiple methods to perform these light field pixel adjustments. The most direct and simple method, and also the method that gives the most precise set of adjustments, is to use a calibration image. The procedure is as described below:

1. Take a non-saturated photograph of a uniform white surface, to measure the intensity variations directly. Had there been no microlens-related intensity variations, the captured image may have been uniformly white itself, however due to the variations, the captured image instead looks like an array of circular disks.
2. Determine a normalization pixel value for this image. In one embodiment, the normalization value may be the maximum pixel value from the image. In another embodiment, the normalization value may be the average pixel value for the image.
3. Produce a calibration image comprising a multiplier corresponding to each source pixel, where each pixel's multiplier is computed as the normalization pixel value (from the prior step) divided by the corresponding pixel value in the captured image.

When a subsequent light field is processed (e.g. refocused), prior to performing the light field processing, perform a per-pixel multiplication of each light field pixel with it corresponding calibration image pixel. In cases where the calibration value is less than 1 and the light field pixel value is saturated (or nearly so), a new light field pixel value may be obtained by interpolation from neighbors in lieu of, or combined with, the method described immediately above.

A specific light field acquisition device may require multiple calibration images, corresponding to different physical capture settings (e.g., zoom lens position) which may change the spatial intensity variations in the captured images.

In another embodiment, spatial intensity variations may be corrected by analyzing the captured image in order to remove or reduce the effects of the light variation. This method may be performed in the following manner:

1. Create a 4 dimensional table, with a dimension to represent each of X, Y, U, and V. The dimensions of this table may be small relative to the size of the light field source data (for example, a table that is 10×10×20×20).
2. For each source pixel in the light field, compute its corresponding (x,y,u,v) position within the table. Accumulate the pixel value into the table at this position.
3. Once all pixels values are accumulated, the table may be filtered or processed to smooth out the shape of the data, and each entry in the table may be normalized based on the number of source pixel contributions to that entry.
4. Determine a table entry normalization value. In one embodiment, the normalization value may be the average pixel value for the image.
5. Update each table entry to create a calibration multiplier, where each entry's multiplier is computed as the normalization value (from the prior step) divided by the table entry value.

When a subsequent light field is processed (e.g. refocused), prior to performing the light field processing, perform a per-pixel multiplication of each light field pixel with its corresponding entry in the table based on a 4 dimensional (x,y,u,v) lookup. In cases where the calibration value is less than 1 and the light field pixel value is saturated (or nearly so), a new light field pixel value may be obtained by interpolation from neighbors in lieu of, or combined with, the method described immediately above.

Computing Images with a Perspective Shift

One technique to compute images with perspective shifts is described above. This covers both perspective shifts within a virtual aperture plane (left/right and up/down), in addition to perspective shifts between virtual aperture planes (forward/backward).

A more general formulation of the refocusing equations to implement perspective shifts can be expressed as follows, for arbitrary functions f and g:

$$x\text{Out}=f(x,y,u,v,\psi)$$

$$y\text{Out}=g(x,y,u,v,\psi)$$

In general, the position of each virtual aperture may be characterized as a 3-dimensional quantity, and any two virtual aperture positions within the 3-dimensional space of possible choices may be used to generate a 3D stereo image. Notably, two virtual aperture positions that are located within a virtual aperture plane that is parallel to the main virtual aperture plane and that are symmetric in terms of size and shape with respect to a perpendicular line that splits the line that joins the two virtual apertures tend to provide a good or suitable 3D image (FIG. 24).

More than Two Virtual Apertures

As indicated above, when implementing the 3D processing according to the present inventions, the light field data acquisition device or camera with one physical aperture may be characterized, considered and/or illustrated as having a plurality of virtual apertures (two or more). (See, for example, FIG. 2 which illustrates two virtual apertures—namely the first virtual aperture and the second virtual aperture). Thus, even though the examples illustrate a pair of virtual apertures being chosen to render a 3D stereo image, the present inventions may generate output images for more than two virtual apertures (for example, three, four, etc. virtual apertures) having any number of positions, shapes, and sizes, thus producing multiple different perspectives on a scene. (See, for example, FIGS. 25A-25D). Indeed, displays that can make use of more than two different perspectives may readily employ the images (still or video) of a scene having more than two different perspectives.

3D Compositing

The multiple perspective-shifted images may be composited, combined, encoded and/or employed using any technique now known or later developed to produce a 3D effect—including those described earlier. For example, in one embodiment, the 3D processing may employ separate red/blue/green color channels to encode the two different images and view them with red/cyan glasses. In another embodiment, the 3D processing techniques includes different polarization for the different images. There are many techniques for performing 3D compositing of images that correspond to different perspective views of the same scene, and one with skill in the art of 3D image processing and/or 3D image display will be familiar with such techniques. An example of the anaglyph technique is described on the Internet, for example, on Wikipedia. Notably, such techniques for performing 3D compositing of images that correspond to different perspective views of the same scene may be implemented with the imaging circuitry and/or techniques hereof and are intended to fall within the scope of the present inventions.

Zero Parallax Plane Depth

One parameter that applies to the compositing relates to whether the 3D object will appear to "pop out of" or "go into" the screen or page (FIG. 26). This parameter is referred to as the "zero parallax plane", location or depth, where objects at the zero parallax plane depth will appear to be "on the screen". Further, objects at depths closer than the zero parallax plane depth (i.e., with "negative parallax") will appear to "pop out" of the screen, and objects at depths farther than the zero parallax plane depth (i.e., with "positive parallax") will appear to go into the screen. Adjustment, control and/or changes to the zero parallax plane may be implemented by implementing, controlling and/or applying global shifts in opposite directions (left/right or right/left) to the two images before compositing them, for example, by shifting all pixels in the left image by, for example, five pixels to the left, and all pixels in the right image by, for example, five pixels to the right.

Systems and processes implementing the light field 3D rendering and/or processing techniques of the present inventions may include independent definable parameters of (1) a scene depth which is in focus and (2) a scene depth which is defined, selected and/or chosen to be located at the zero parallax plane. In addition, such parameters may be made the same or different which may control the 3D effect of the video or image.

1. Choosing the zero parallax plane depth to be the same as the in-focus depth may create a less eye-straining viewing experience for the viewer by placing the subject of interest (which is in focus) at the most "comfortable" depth for viewing. Note that rendering objects too far in front of or behind the zero parallax plane may cause eye strain and other discomfort in viewers, and may make the 3D effect less accessible to older viewers.
2. In those situations where an all-in-focus image (or multiple subjects in the image are in focus) is computed from the captured light field image using techniques described in the applications which have been incorporated by reference, the zero parallax plane may be placed in the middle (or substantially in the middle) of the depths of interest, which may minimize any potential eye strain resulting from viewing the nearest and farthest depths.

Pinning

One effect that the systems and processes of the present inventions may be used to minimize and/or avoid may be "pinning", which occurs when an object that is rendered with negative parallax (i.e., which "pops out" of the screen) is clipped by the edge of the viewing area (e.g. the edge of the window on the screen that is displaying the image). Objects that have been "pinned" may appear both in front of (due to stereoscopic parallax) and behind (due to occlusion) the screen, and may result in an unpleasant viewing experience.

Taking advantage of the information available in the captured light field, a depth analysis may be performed to detect when pinning occurs, by determining the scene depths of objects along the image edges. The zero parallax plane depth may be chosen to match or to be close to the depths of these edge-adjacent objects to either remove or reduce any pinning effects.

One example embodiment of this manner of analysis, given a depth map that maps output image coordinates to scene depths as described herein, is to examine some or all of the output image pixels within some threshold distance (e.g. 5, 10, 20, etc. pixels) of an output image edge, and by querying the depth of each of these pixels using the depth map, determine the depth that is the "closest to the viewer" amongst this set of output image pixels. This corresponds to the most negative psi value, using the depth map formulation described earlier. This depth may be chosen as the zero parallax plane depth, ensuring that no pinning effects occur.

In general, automated analysis of scene depths may be advantageous to support the best choices for 3D compositing.

Selective 3D Effect

The systems and processes of the present inventions may also generate images and/or views whereby one or more objects are provided in 3D while other objects are not provided in 3D. In this embodiment, the user or system may designate or select one or more objects (for example, a subject/person in a scene) that may be rendered with the 3D effect (employing any of the embodiments herein) while other objects (for example, the background and/or other subjects/objects) are rendered in 2D.

In this embodiment, the light field image data is acquired and/or captured via the light field data acquisition device or camera. Two related output images corresponding to one or more subjects/objects (for example, two refocused output or virtual images) may be obtained, generated and/or computed using the captured light field data corresponding to light that came from two different directions; thereby providing or generating two images of the one or more subjects/objects that correspond to images that could or would have been captured using two different, virtual apertures. The aspects of the image other than the one or more objects (for example the background) may employ the light field data corresponding to the entire physical aperture (or a portion thereof). As such, each subset of light field data corresponding to the one or more subjects/objects may generate at least two different output images, wherein each image includes a perspective shift (for example, horizontal) relative to the other image, thereby generating, producing and/or providing two images of the scene from different perspectives, and the remaining portions of the image may be generated without relative shifting.

Thereafter, the two related images corresponding to the one or more subjects/objects, for example, one from the "left" perspective and one from the "right" perspective, may be further processed (for example, encoded and/or combined) to generate, produce and/or provide a 3D image. As noted herein, the present inventions may employ any encoding or processing method, whether now known or later developed, to generate images of a scene from different perspectives to thereby provide or produce a 3D effect.

Where the systems and processes of the present inventions render or generate video implementing the selective 3D effect, such systems and/processes may employ subject tracking to maintain or provide one or more subjects/persons in 3D over a plurality of video frames. Such tracking may be implemented in conjunction with the embodiments described in U.S. patent application Ser. No. 12/622,673 ("System and Method for Acquiring, Editing, Generating and Outputting Video Data", Pitts, et al., Nov. 20, 2009), including the key frame embodiments and focus planning embodiments.

Extended Depth of Field 3D

The systems and processes of the present inventions may also employ "extended depth of field". For example, in one embodiment, the systems and techniques of the present inventions may generate, produce and/or provide a 3D image or 3D video having a predetermined focus (or foci) across a plurality of depths (for example, over those depths including one or more subjects/objects of interest. This may result in images or video (as the case may be) with higher resolution and/or lower noise. By way of example, in FIGS. 27A and 27B, images generated for right eye viewing using typical or normal refocusing and extended depth of field are shown, respectively.

Conceptually, extended depth of field 3D is like creating two very small virtual apertures or "viewpoints" and computing a stereo pair of images based on the very small apertures (see FIG. 28). However, unlike using a very small aperture, extended depth of field imaging may use most, substantially all, or all of the data in the light field, and may result in higher resolution and/or lower noise in computed images. Like the virtual apertures previously described herein, the virtual viewpoints may be moved or shifted to view the image from a different perspective or viewing location.

Continuing the conceptual description, extended depth of field imaging computes an image for a virtual viewpoint by using light captured by the entire aperture, but shifting the captured light such that the computed image appears as if it were captured using a camera with a very small aperture in the location of the virtual viewpoint. When this extended depth of field imaging is applied using two virtual viewpoints, stereoscopic images may be produced.

In one embodiment, a pair of stereoscopic extended depth of field images may be generated by performing the following set of operations:

1. Select two virtual viewpoint functions, one corresponding to each eye. Each viewpoint conceptually corresponds to a point location for a very small virtual aperture. This viewpoint function may be generally represented as a mapping from a coordinate in the light field to a virtual viewpoint, as (uViewpoint, vViewpoint)=fv(x, y, u, v).
2. Acquire a light field depth function, df(x,y,u,v), where df takes in the 4D coordinates (x,y,u,v) for a ray or ray bundle in the light field and returns a scalar value representing a depth. The scalar depths returned by this function may correspond to the psi value(s) where the ray bundle associated with that coordinate is/are in focus, using the terminology of the prior sections.
3. For each coordinate in the light field and associated pixel data, use the virtual viewpoint, psi, and light field coordinates to determine the location(s) where the pixel data should be accumulated in the output image.
4. In cases where the output coordinates are the same for a plurality of light field pixel data with divergent psi values, the light field pixel data corresponding to the background object (for example, data with larger psi values) may be discarded.

Notably, while the process above is described for stereoscopic imaging, the number of virtual apertures is not limited to a stereo pair, and the process may be used with any number of virtual apertures, including, for example, two, three, four, etc. virtual apertures—each virtual aperture providing a different perspective of the image (still or video).

Selection of Virtual Viewpoint Functions

The selection of the virtual viewpoints may be performed in a similar manner to the selection of a virtual aperture, as described above. Notably, and unlike a virtual aperture, a virtual viewpoint function returns a point and has no size. That is, the virtual viewpoint corresponds to a (u,v) perspective point as in the previous sections herein, however unlike in FIGS. 7A and 7B, there is not a notion of a virtual aperture as a subset of a full aperture being used to restrict the set of light rays that are processed to just those that correspond to a certain direction. Rather, even light rays that do not correspond to the direction of the virtual viewpoint may be used in computing the output image.

In one embodiment, the virtual viewpoint functions do not vary with the spatial coordinate in the light field, and may be simplified to (uViewpoint1, vViewPoint1) and (uViewpoint2, vViewpoint2). This embodiment is conceptually similar to a two camera system with very small apertures as described above.

In other embodiments, the virtual viewpoint functions may be represented in the more general form as (uViewpoint, vViewpoint)=fv(x, y, u, v). In these embodiments, effects including perspective changes and rendering above or below the main aperture plane may be achieved, as described previously herein.

Acquire Depth Function for Source Light Field

Conceptually, the depth function is a mapping that takes as an input a coordinate (for example, a light field coordinate or a scene coordinate) and returns a depth and/or psi value where the depth is predetermined according to a criterion or criteria (for example, the best, greatest and/or highest focus). In another manner of description, the psi value returned by the depth function is the location of best, greatest and/or highest focus for the subject from which the corresponding light rays originated.

In one embodiment, the depth function may be created by any known or unknown way to create a depth map, for example, by using a two-step process. In the first step, an output depth map corresponding to output locations may be generated. This output depth map contains a focus depth for each output pixel location. This output depth map is further described in U.S. patent application Ser. No. 12/622,673 ("System and Method for Acquiring, Editing, Generating and Outputting Video Data", Pitts, et al., Nov. 20, 2009) and may be acquired and/or determined using any embodiment described therein. It may also be computed according to the example embodiment of light field processing, including depth map creation, that is presented herein. In the second step, this output depth map may be converted to a light field depth function in the following manner:

1. Initialize a table with one entry for each coordinate in the light field
2. For each spatial coordinate in the output depth map that maps to a particular psi value
   a. Determine all source contributing pixels in the light field that would contribute to a refocused image at that output location rendered at that psi.
   b. For each source contributing pixel, set the table value equal to that psi if either of the following conditions applies:
      i. The table value is not yet set
      ii. The table value is set, but the set value corresponds to an depth further from the capture device than the depth represented by that psi.
3. Optionally, unset table entries may be determined by interpolation from surrounding table entries.

Computing an Output Image Having an Extended Depth of Field

One technique to compute an extended depth of field image, using variables previously defined herein, may be described as follows:

Start with the input parameters, including a light field, light field coordinates (x, y, u, v) for each light field pixel, a virtual viewpoint (uViewpoint, vViewpoint), and a depth function, df, containing a focused psi value per source coordinate in the light field. (s,t) are values which relate to the geometry of the source light field image, where s is the pitch of microlens images across the light field image divided by the width of the light field image (both measured in pixels), and similarly for t in the vertical dimension.

Given the variable definitions and the input parameters, the following equations map a source light field coordinate to an output image coordinate:

$\psi = df(x,y,u,v)$ $x\text{Out} = x - s*\psi*(u - u\text{Viewpoint})$ $y\text{Out} = y - t*\psi*(v - v\text{ViewPoint})$ By applying the above equations using two viewpoints, a set of stereoscopic 3D images may be generated.

Notably, shifts corresponding to changing the zero parallax plane, described herein, may also be applied to extended depth of field stereo images. The shifts may be incorporated as an additional offset in the projection, as a separate image translation operation, or in any other manner.

Exemplary Device Embodiments

The present inventions may employ any light field acquisition device, now known or later developed, to measure, sample, acquire, record, estimate, and/or determine a light field. For example, the present inventions may employ the devices and processes described and illustrated in U.S. patent application Ser. No. 12/622,673, U.S. patent application Ser. No. 12/632,979 ("Light Field Camera and System, and Methods of Using and Manufacturing Same", Knight et al., Dec. 8, 2009), and/or U.S. patent application Ser. No. 12/698,843 ("Light Field Camera Image File and Configuration Data, and Method of Using, Storing and Communicating Same", Knight et al., Feb. 10, 2010).

Moreover, the processing circuitry which implements one or more of the operations described and/or illustrated herein, may be a portion of the light field acquisition device and/or a post-processing system. The present inventions may employ any processing circuitry now known or later developed to compute, generate and/or render an image or video having or implementing one or more 3D effects. For example, the processing circuitry may include one or more processors, one or more state machines, one or more processors implementing software, one or more gate arrays, programmable gate arrays and/or field programmable gate arrays. Indeed, the processing circuitry may implement any of the embodiments of the aforementioned U.S. Patent Applications as well as one, some and/or all of the embodiments described and illustrated herein.

Further, as mentioned above, in operation, the processing circuitry performs or executes one or more applications, routines, programs and/or data structures that implement particular methods, tasks or operations described and illustrated herein. The functionality of the applications, routines or programs may be combined or distributed. Further, the applications, routines or programs may be implementing by the processing circuitry using any programming language whether now known or later developed; all of which are intended to fall within the scope of the present inventions.

Single-Lens 3D Light Field Video Recorder and/or Camcorder

One exemplary embodiment is to use light field processing to enable 3D video output from a single-lens light field data acquisition device.

For example, a 3D light field video camera may contain a physical autofocus (AF) system to create a physical focus on the subject of interest. Because of the microlens array, the physical AF may utilize a modified contrast AF procedure, such as the one illustrated in FIG. 29, in which a contrast AF block analyzes refocused images (at a fixed virtual focal depth F) from its AF zones, rather than analyzing the pixel data at those zones taken directly from the sensor.

The result is video-rate capture of light field frames, from which the light field processing system may render output, for example at fixed virtual focal depth F as defined above, with stereo 3D output.

This exemplary device has the advantage that it provides 3D video output in a form-factor that is very similar to familiar video camera designs with a single lens and sensor. In addition, as compared to the example below, the current device example may have reduced on-camera processing requirements because it renders output frames at a fixed virtual focal depth.

3D Light Field Video Camera #2

In another example, a video camera or device with the following properties (FIG. 30) may be employed in connection with the 3D processing, circuitry and/or systems inventions described herein:

1. Compact, easy to use, with form factor like a recorder or Camcorder or any other consumer video camera.
2. From the user's perspective, can record video in 2D, 3D, or both simultaneously.
    a. The light field captured by the device is able to produce all of these types of outputs dictated by the post-capture processing that is performed.
    b. Output video stream may be in a standard 2D and/or 3D video format for viewing using a standard 2D and/or 3D video player.
3. Can view either or both of 2D and 3D output images on camera display (e.g., LCD) during live view/capture.
4. Retains all benefits and options of light field video of U.S. patent application Ser. No. 12/622,673 ("System and Method for Acquiring, Editing, Generating and Outputting Video Data", Pitts, et al., Nov. 20, 2009), with addition of 3D processing and encoding as described and/or illustrated herein.
    a. 3D encoding may be user definable and/or chosen to correspond to or match the 3D display device or methods that are available and/or predetermined.

Note that FIG. 30 illustrates one exemplary embodiment of a 3D light field video camera. Many of the components are optional (physical AF, camera orientation sensor, choice of external ports and storage media, etc.) and may be interconnected in different ways.

In addition to the user controls described for light field video in general (optical zoom, focal plane, depth of field, etc.), the user may control one, some or all of:

1. The 3D disparity (i.e.) the "amount" of 3D-ness in the output video stream, ranging from highly 3D to barely 3D to 2D.
2. The characteristics of the virtual apertures (for example, size, shape and/or relative locations).
3. The zero parallax plane depth (i.e.) the degree to which the 3D effect will "come out of" or "go into" the screen.

Notably, the user may control many of the characteristics after acquisition of the light field data via the light field data acquisition device or camera. For example, the user may select or implement the 3D disparity after data acquisition. In this regard, the user may, after acquisition of the light field data, electronically define (and/or redefine) the amount of 3D effect and the size, shape and/or locations of the virtual apertures. In response, processing circuitry, using the acquired light field data and the user inputs, determines the light field image data associated with each of the virtual apertures and generates, computes and/or determines each image based thereon.

In addition thereto, or in lieu thereof, as with the other light field data acquisition device or camera controls (focus, depth of field, etc.), these 3D effect controls may be manipulated interactively by the user as video is being recorded, may be chosen automatically by the device or camera, or may follow some preset/scripted configuration.

The 3D light field camera or acquisition device may include automatic analysis of multiple parameters (for example, automatic focus, 3D effect, depth/field of view and/or tracking). For example, in one embodiment, the 3D light field camera or acquisition device may choose what scene depth will be in focus and what scene depth will be the zero parallax plane, as described in an earlier section. Certain considerations include, for example, minimizing eye strain of the viewer, and reducing the pinning effect.

The 3D light field camera or acquisition device may also include sensors to determine orientation, position, vibration and/or illumination. For example, where the 3D light field camera or acquisition device supports multiple camera positions, rotations and/or orientations, including portrait mode, such camera or device may include an orientation sensor (for example, gyroscope or accelerometers) in the camera or device. The orientation of the camera or device is detected by this component and is fed as an input to the light field processing circuitry, enabling the output image to be appropriately oriented and rendered in 3D stereo.

A 3D Light Field Still Camera

As with the 3D light field video camera, 3D processing and output may be implemented in a light field still camera, enabling it to similarly output images that are 2D, 3D, or both. Notably, an advantage of 3D light field imaging vs. conventional dual-camera 3D imaging is that in the present inventions, one light field camera or acquisition device (having a single lens and single sensor/exposure) may be employed, which may enable, for example, a 3D light field DSLR that supports the full range of interchangeable lenses to acquire and/or output images that are 2D, 3D, or both. For the avoidance of doubt, the embodiments and/or inventions described herein are entirely applicable to video and still cameras/imaging. Although entirely applicable, for the sake of brevity, the discussions directed to video will not be repeated for still—and vice versa.

Exemplary 3D Light Field Data Files

In one embodiment, the light field data may be stored in any of the embodiments described in (1) U.S. patent application Ser. No. 12/622,673 ("System and Method for Acquiring, Editing, Generating and Outputting Video Data", Pitts, et al., Nov. 20, 2009) and/or (2) U.S. patent application Ser. No. 12/698,843 ("Light Field Camera Image File and Configuration Data, and Method of Using, Storing and Communicating Same", Knight et al., Feb. 10, 2010). For example, the light field data of the video or still images may be stored in an electronic data file which includes one or more sets of light field data. (See, for example, FIGS. 31A and 31B). The light field data file may include one or more sets of light field data which, in whole or in part, is/are compressed or uncompressed and/or processed or unprocessed. A set of light field data may be (video or still) data of a scene, image or "exposure" acquired, captured and/or sampled via a light field data acquisition device or camera. The light field data file may be any file format or structure, whether the data contained therein is, in whole or in part, in compressed or uncompressed form, and/or whether the data contained therein is, in whole or in part, processed or unprocessed. Notably, any file format or file structure of the light field data file, whether now known or later developed, is intended to fall within the scope of the present inventions.

In one exemplary embodiment, the file format or structure of the light field data includes metadata (for example, as a header section). (See, for example, FIG. 31B wherein in this exemplary embodiment, such header is located in the beginning of the file—although it need not be). The header section may include definitional type data that provides information regarding the light field data and/or the environment or parameters in which it was acquired, captured and/or sampled. In addition, the header section may include information regarding one or more 3D parameters of the light field data—for example, the characteristics of the virtual apertures (for example, the number of virtual apertures, and the size, shape, location/position of one, some or all of the virtual apertures) and the type or form of encoding employed in connection with the generation of the 3D images.

The light field data file may be stored and/or maintained in memory (for example, DRAM, SRAM, Flash memory, conventional-type hard drive, tape, CD and/or DVD). (See, for example, FIGS. 32A-32C). Such memory may be accessed by processing circuitry to perform 3D processing (for example, generating, manipulating and/or editing 3D images (whether video or still)) corresponding to the light field data. Notably, the processing circuitry may also implement other processing—after acquisition or recording thereof (including, for example, adjusting, selecting, defining and/or redefining the focus and/or depth of field after acquisition of the light field data—as described in the U.S. Patent Applications identified and/or detailed herein).

In one embodiment, the processing circuitry may access the light field data file (having one or more sets of light field data) and, based on or in response to user inputs or instructions, perform 3D or 2D processing, and/or other image processing (for example, adjusting, selecting, defining and/or redefining the focus and/or depth of field of an image after acquisition of light field data associated with such image). Thereafter, the processing circuitry may store the newly generated image within the light field data file (for example, append such image thereto) and/or overwrite the associated light field data contained in the light field data file. In addition thereto, or in lieu thereof, the processing circuitry may create (in response to user inputs/instructions) a separate file containing the image which was generated using the associated light field data.

As mentioned above, in operation, the processing circuitry (in the light field acquisition device and/or post-processing system) may perform or execute one or more applications, routines, programs and/or data structures that implement particular methods, tasks or operations described and illustrated herein (for example, acquiring and/or editing the refocusable image or video data and/or generating or rendering output video data corresponding to refocusable image or video data using one, some or all of the aforementioned encoding, editing and/or rendering techniques). The operations of the applications, routines or programs may be combined or distributed. Further, the processing circuitry may implement one or more, or all of such editing and/or rendering techniques in any combination and all permutations; such techniques may be employed alone or in combination with one or more of the other techniques of acquiring and/or editing the light field data and/or encoding, generating and/or rendering output image or video data corresponding to light field data. The techniques, methods and/or applications may be implemented by the processing circuitry using any programming language whether now known or later developed, including, for example, assembly, FORTRAN, C, C++, and BASIC, whether compiled or uncompiled code; all of which are intended to fall within the scope of the present inventions.

Notably, the light field data acquisition device or camera may include a display to allow the user to view an image or video generated using one or more sets of light field data. (See for example, FIGS. 32C and 32D). The display may facilitate the user to implement desired or predetermined processing of one or more sets of light field data in a light field data file. The light field data acquisition device or camera may also couple to an external display as well as, for example, a recording device, memory, printer and/or processor circuitry (See, for example, FIGS. 32E, 32F and 32G). In this way, the light field data acquisition device, camera and/or post-processing circuitry may output image data to a display, processing circuitry (for example, a special purpose or general purpose processor), and/or a video recording device. (See, for example, FIGS. 32E, 32F and 32G). Moreover, such external devices or circuitry may facilitate, for example, storage of light field data files and 3D processing of light field data files.

The light field data of the file may be stored in 2D, 3D and/or raw light field data formats. Where the light field data is stored in a 2D format, the light field data may be "re-processed" to generate or render 3D video or images. Conversely, where the light field data is stored in a 3D format, the light field data may be "re-processed" to generate or render 2D video or images.

The light field data file may include an indication of the format type—for example, data in the header to indicate a 3D or 2D format. As noted above, the header may also include information regarding one or more 3D parameters of the light field data—for example, the characteristics of the virtual apertures (for example, the number of virtual apertures, and/or the size, shape, location/position of one, some or all of the virtual apertures) and the type or form of encoding employed in connection with the generation of the 3D images.

In addition, one or more sets of the 2D, 3D and/or raw light field data may be appended to or integrated into associated image data in or having a Standard Image Format (for example, MPEG, JPEG, EXIF, BMP, PNG, PDF, TIFF and/or HD Photo data formats). (See, U.S. patent application Ser. No. 12/698,843 ("Light Field Camera Image File and Configuration Data, and Method of Using, Storing and Communicating Same", Knight et al., Feb. 10, 2010). In these embodiments, the one or more sets of light field data is/are associated with the image data in a Standard Image Format in that such one or more sets of light field data may be used to generate the 2D or 3D image which is represented in the Standard Image Format. (See, for example, FIGS. 33A-33C) The light field data may include one or more sets of light field data which, in whole or in part, is compressed or uncompressed and/or processed or unprocessed. Notably, the Standard Image Format may be an open format or a proprietary format.

Exemplary Processing of Files and File Structures Including Light Field Data

With reference to FIG. 34A, in one embodiment, circuitry may access a light field data file (for example, a Standard Image Format having a 3D image-light field data file) and read or display the 3D image corresponding to the Standard Image Format. Thereafter, and based on or in response to one or more inputs or instructions (for example, user inputs or instructions), the 3D video or still image corresponding to the Standard Image Format may be modified using, for example, the one or more data sets of the light field data associated with the image. In one embodiment, based on or in response to one or more inputs or instructions, circuitry may perform 3D to 2D processing (as described herein), modification of certain 3D parameters (for example, modifying the type of 3D encoding and/or modifying the number of virtual apertures, and/or the size, shape, location/position of one, some or all of the virtual apertures) or other image processing (for example, adjusting, selecting, defining and/or redefining the focus and/or depth of field of an image after acquisition of light field data associated with such image (wherein the image during acquisition included an original focus and depth of field)) to modify the image and thereby provide a new image (having, for example, (i) a new type of 3D encoding, (ii) a modification in the number of virtual apertures, and/or the size, shape, location/position of one, some or all of the virtual apertures), (iii) no 3D effect or encoding (i.e., a change from 3D to 2D), (iv) new focus and/or new depth of field). Thereafter, the circuitry may store or re-store the image within the Data File (for example, (i) replace or overwrite the previous image by storing data in the Standard Image Format which is representative of the new image or (ii) append data in the Standard Image Format which is representative of the such new image). In addition thereto, or in lieu thereof, the circuitry may create (in response to, for example, user inputs/instructions) a separate file containing data corresponding to the new image. Indeed, in addition to the data (in the Standard Image Format) which is representative of the image, such new or separate file may or may not contain the light field data associated therewith.

The processing (in any combination or permutation) may be repeated any number of times. (See, FIGS. 34B-34E). Moreover, when the circuitry is performing Light Field Processing to generate the modified image, the circuitry may employ the Standard Image Format-light field data File (or a portion thereof) as a frame buffer. Such a technique provides for efficient use of memory resources.

In another exemplary embodiment, the present inventions utilize the standard image portion of the Standard Image Format-light field data file as a "File Framebuffer" as described in U.S. patent application Ser. No. 12/698,843 ("Light Field Camera Image File and Configuration Data, and Method of Using, Storing and Communicating Same", Knight et al., Feb. 10, 2010). For the sake of brevity, such discussions will not be repeated.

Notably, when storing or re-storing the image after processing (for example, 2D to 3D or 3D to 2D) within the data file (for example, (i) replace or overwrite the previous image by storing data in the Standard Image Format which is representative of the new image or (ii) append data in the Standard Image Format which is representative of the such new image), the circuitry may, in response to user inputs or instructions, generate a new Standard Image Format-light field data file (wherein the light field data may be substantially unchanged) or generate a Standard Image File only (i.e., without the corresponding or associated light field data). The user may also instruct the circuitry to change the format of the Standard Image File prior to storing or re-storing the data (in the selected Standard Image Format) which is representative of the modified image.

Exemplary Mixed-Mode Display, Processing and Communication

With reference to FIG. 35, in one embodiment, a user may utilize any Standard Display Mechanism (as described in U.S. patent application Ser. No. 12/698,843) to view the Standard Image portion of a data file having 2D or 3D video or still images (for example, the exemplary electronic data files of FIGS. 33A-33C), reading and/or displaying the image corresponding to the Standard Image Format; a user may also utilize the read/display-modify-store/re-store process described above, possibly changing the 2D or 3D image of the Standard Image and/or light field data within the data file. A user may subsequently utilize a Standard Display Mechanism on the resulting data file, for example to view or share the image via the Internet, or to print it via a printing service. A user may subsequently repeat this process any number of times.

The following is an exemplary scenario utilizing an embodiment of the present inventions and, as such, is not intended to be limiting to the permutations and/or combinations of read/display-modify-store/re-store embodiments. With that in mind, in one exemplary embodiment, the user acquires a Data File in a Standard Image Format-light field data format having 3D video or a 3D still image. The light field data acquisition device or camera, in response to inputs/instructions (for example, user inputs/instructions), communicates the Data File to a computer system, which includes an image viewing computer program (for example, Standard Display Mechanisms) to provide and allow viewing of the data file as 3D or 2D video or image on a display. The light field data acquisition device or camera and/or computer system, in response to inputs/instructions (for example, user inputs/instructions), may also communicate the data file to an internet image sharing site (another Standard Display Mechanism), for example, in order to facilitate sharing of the data file.

Another user may then download the data file from the sharing site, and view it on a computer (Standard Display Mechanism which is, for example, local to the second user). The second user, employing a computer system, may open the Data File with a software program that implements the Read/Display-Modify-Store/Re-store process. The second user views the image, and applies or implements Light Field Processing (for example, changes the optical focus of the image on to a closer focal plane), and stores the resulting image into the File Framebuffer comprising the Standard Image portion of the Data File in the Standard Image Format. The second user then prints the Data File using a printer (another Standard Display Mechanism). The second user may then upload the Data File to an internet image sharing site (Standard Display Mechanism), which may be the same or a different sharing site. Another user (i.e., the first user or a third user) downloads the Data File and prints it. The preceding scenario illustrates certain aspects and exemplary embodiments of the present inventions.

There are many inventions described and illustrated herein. While certain embodiments, features, attributes and advantages of the inventions have been described and illustrated, it should be understood that many others, as well as different and/or similar embodiments, features, attributes and advantages of the present inventions, are apparent from the description and illustrations. As such, the above embodiments of the inventions are merely exemplary. They are not intended to be exhaustive or to limit the inventions to the precise forms, techniques, materials and/or configurations disclosed. Many modifications and variations are possible in light of this disclosure. It is to be understood that other embodiments may be utilized and operational changes may be made without departing from the scope of the present inventions. As such, the scope of the inventions is not limited solely to the description above because the description of the above embodiments has been presented for the purposes of illustration and description.

For example, in those embodiments where the light field data acquisition device connects to a processing system, such connection may be via wired and/or wireless architectures using any signaling technique now known or later developed. In addition, the configuration data may be provided and/or communicated to a post-processing system together with or separate from the associated light field data using any format know known or later developed. Indeed, the static-type configuration data may be provided and/or communicated to a post-processing system together with or separate from dynamic-type configuration data. All communication strategies, designs, formats, techniques and/or architectures relating thereto are intended to fall within the scope of the present inventions.

Importantly, each of the aspects of the present inventions, and/or embodiments thereof, may be employed alone or in combination with one or more of such aspects and/or embodiments. For the sake of brevity, those permutations and combinations will not be discussed separately herein. As such, the present inventions are not limited to any single aspect or embodiment thereof nor to any combinations and/or permutations of such aspects and/or embodiments.

As such, the above embodiments of the present inventions are merely exemplary embodiments. They are not intended to be exhaustive or to limit the inventions to the precise forms, techniques, materials and/or configurations disclosed. Many modifications and variations are possible in light of the above teaching. It is to be understood that other embodiments may be utilized and operational changes may be made without departing from the scope of the present inventions. As such, the foregoing description of the exemplary embodiments of the inventions has been presented for the purposes of illustration and description of exemplary embodiments. Many modifications and variations are possible in light of the above teaching. It is intended that the scope of the inventions not be limited solely to the description above.

The embodiments and inventions described herein may be implemented in conjunction with those embodiments and inventions described and/or illustrated in U.S. patent application Ser. No. 12/622,673 ("System and Method for Acquiring, Editing, Generating and Outputting Video Data", Pitts, et al., Nov. 20, 2009), U.S. patent application Ser. No. 12/632,979 ("Light Field Camera and System, and Methods of Using and Manufacturing Same", Knight et al., Dec. 8, 2009), and U.S. patent application Ser. No. 12/698,843 ("Light Field Camera Image File and Configuration Data, and Method of Using, Storing and Communicating Same", Knight et al., Feb. 10, 2010). For the sake of brevity, such applications are incorporated by reference herein, in their entirety.

Notably, the circuitry described and/or illustrated herein (or portions and/or combinations thereof) may be integrated or may be implemented using a plurality of discrete logic, whether a state machine, a special or general purpose processor (suitably programmed) and/or a field programmable gate array (or combinations thereof). All permutations and/or combinations of integrated, discrete, hardwired and programmable circuitry (which is programmed, for example, via software) for implementing the processing circuitry are intended to fall within the scope of the present inventions. For example, the memory, read/write circuitry and processing circuitry may be integrated in/on a monolithic integrated circuit device.

Moreover, the processing circuitry may share circuitry with other elements of the device and/or system (or components thereof) and/or perform one or more other operations, which may be separate and distinct from that described herein. As noted above, the processing circuitry may be implemented via one or more state machines, one or more processor (suitably programmed) and/or one or more field programmable gate arrays.

It should be further noted that the various circuits and circuitry disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and HLDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Indeed, when received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of circuits in a fabrication process.

Moreover, the various circuits and circuitry, as well as techniques, disclosed herein may be represented via simulations using computer aided design and/or testing tools. The simulation of the light field data acquisition device, post-processing system and/or processing circuitry (or portions the foregoing), and/or techniques implemented thereby, may be implemented by a computer system wherein characteristics and operations of such circuitry, and techniques implemented thereby, are imitated, replicated and/or predicted via a computer system. The present inventions are also directed to such simulations of the light field data acquisition device, post-processing system and/or processing circuitry (or portions the foregoing), and/or techniques implemented thereby, and, as such, are intended to fall within the scope of the present inventions. The computer-readable media corresponding to such simulations and/or testing tools are also intended to fall within the scope of the present inventions.

Notably, in the claims, the term "circuit" means, among other things, a single component (for example, electrical/electronic) or a multiplicity of components (whether in integrated circuit form, discrete form or otherwise), which are active and/or passive, and which are coupled together to provide or perform a desired operation. The term "circuitry", in the claims, means, among other things, a circuit (whether integrated or otherwise), a group of such circuits, one or more processors, one or more state machines, one or more processors implementing software, one or more gate arrays, programmable and/or field programmable gate arrays, or a combination of one or more circuits (whether integrated or otherwise), one or more state machines, one or more processors, one or more processors implementing software, one or more gate arrays, programmable and/or field programmable gate arrays. The term "data" means, among other things, a current or voltage signal(s) (plural or singular) whether in an analog or a digital form, which may be a single bit (or the like) or multiple bits (or the like).

What is claimed is:

1. A method of varying a three dimensional (3D) effect in a stereo image of a scene, the method comprising:
 a) at a light field data acquisition device, acquiring light field data representing light rays from the scene via one acquisition;
 b) in a processor, identifying a first set of at least two positions associated with the light field data acquisition device, wherein each position in the first set corresponds to a virtual aperture and further corresponds to a subset of light rays of the acquired light field data, each subset of light rays coming from a direction, and wherein:
the virtual aperture corresponding to each position in the first set is different from the virtual aperture corresponding to any other position in the first set; and
the subset of light rays corresponding to each position in the first set comes from a direction that is different than the direction of the subset of light rays corresponding to any other position in the first set;
c) in the processor, for each of at least two of the subsets of light rays corresponding to positions in the first set, generating image data of the scene using light field data for the subset of light rays associated with the corresponding virtual aperture, wherein the image data represents an image of the scene from a perspective corresponding to the position of the virtual aperture;
d) in the processor, generating a first 3D stereo image of the scene using the image data generated from at least two of the subsets of light rays corresponding to positions in the first set, wherein the first 3D stereo image has a first 3D effect;
e) in the processor, identifying a second set of at least two positions associated with the light field data acquisition device, wherein each position in the second set corresponds to a virtual aperture and further corresponds to a subset of light rays of the acquired light field data, each subset of light rays coming from a direction, and wherein at least one of the positions within the second set is different from any of the positions identified in step b), and wherein:
the virtual aperture corresponding to each position in the second set is different from the virtual aperture corresponding to any other position in the second set; and
the subset of light rays corresponding to each position in the second set comes from a direction that is different than the direction of the subset of light rays corresponding to any other position in the second set;
f) in the processor, for each subset of light rays associated with positions in the second set for which image data was not generated in step c), generating image data of the scene using light field data for the subset of light rays associated with the corresponding virtual aperture, wherein the image data represents an image of the scene from a perspective corresponding to the position of the virtual aperture;
g) in the processor, generating a second 3D stereo image of the scene using the image data generated from at least two of the subsets of light rays corresponding to positions in the second set, wherein the second 3D stereo image has a second 3D effect that is different than the first 3D effect; and
h) at an output device, outputting the first and second 3D stereo images.

2. The method of claim 1 wherein generating each 3D stereo image of the scene comprises 3D encoding the image data representing the images of the scene from the perspectives corresponding to the at least two positions of the virtual apertures.

3. The method of claim 2 wherein 3D encoding the image data representing the images of the scene from the perspectives corresponding to the at least two positions of the virtual apertures comprises encoding the image data representing the image of the scene from one perspective using a first color channel and encoding the image data representing the image of the scene from the other perspective using a second color channel.

4. The method of claim 1 further comprising receiving a user input which determines an amount of 3D effect of the 3D stereo image.

5. The method of claim 1 wherein the perspectives comprise different perspectives of the scene within a virtual aperture plane.

6. The method of claim 1 wherein the perspectives comprise different perspectives of the scene within different virtual aperture planes.

7. A method of varying a three dimensional (3D) effect in a stereo image of a scene, the method comprising:
a) at a light field data acquisition device, acquiring light field data representing light rays from the scene via one acquisition;
b) in a processor, identifying a first set of at least two positions, wherein each position in the first set corresponds to a virtual aperture within a physical aperture of the light field data acquisition device and further corresponds to a subset of light rays of the acquired light field data, each subset of light rays coming from a direction, wherein a size of each virtual aperture is less than a size of the physical aperture, the virtual apertures comprising a first virtual aperture at a first position within the physical aperture and a second virtual aperture at a second position within the physical aperture, and wherein:
the virtual aperture corresponding to each position in the first set is different from the virtual aperture corresponding to any other position in the first set; and
the subset of light rays corresponding to each position in the first set comes from a direction that is different than the direction of the subset of light rays corresponding to any other position in the first set;
c) in the processor, for each of at least two of the subsets of light rays corresponding to positions in the first set, generating image data of the scene using light field data for the subset of light rays associated with the corresponding virtual aperture, wherein the image data represents an image of the scene from a perspective corresponding to the position of the virtual aperture;
d) in the processor, generating a first 3D stereo image of the scene using the image data generated from at least two of the subsets of light rays corresponding to positions in the first set, wherein the first 3D stereo image has a first 3D effect;
e) in the processor, identifying a second set of at least two positions, wherein each position in the second set corresponds to a virtual aperture within the physical aperture of the light field data acquisition device and further corresponds to a subset of light rays of the acquired light field data, each subset of light rays coming from a direction, and wherein at least one of the positions within the second set is different from any of the positions identified in step b), and wherein:
the virtual aperture corresponding to each position in the second set is different from the virtual aperture corresponding to any other position in the second set; and
the subset of light rays corresponding to each position in the second set comes from a direction that is different than the direction of the subset of light rays corresponding to any other position in the second set;
f) in the processor, for each subset of light rays associated with positions in the second set for which image data was not generated in step c), generating image data of the scene using light field data for the subset of light rays associated with the corresponding virtual aperture, wherein the image data represents an image of the scene from a perspective corresponding to the position of the virtual aperture;

g) in the processor, generating a second 3D stereo image of the scene using the image data generated from at least two of the subsets of light rays corresponding to positions in the second set, wherein the second 3D stereo image has a second 3D effect that is different than the first 3D effect; and h) at an output device, outputting the first and second 3D stereo images.

8. The method of claim 7 further comprising receiving a user input which is representative of at least one of a size, shape and location of at least one of the first virtual aperture and the second virtual aperture.

9. The method of claim 7 further comprising defining at least two characteristics of the first virtual aperture and the second virtual aperture.

10. The method of claim 7 wherein generating each 3D stereo image of the scene comprises 3D encoding the image data representing the images of the scene from the perspectives corresponding to the at least two positions of the virtual apertures.

11. The method of claim 10 wherein 3D encoding the image data representing the images of the scene from the perspectives corresponding to the positions of the virtual apertures comprises encoding the image data representing the image of the scene from one perspective using a first color channel and encoding the image data representing the image of the scene from the other perspective using a second color channel.

12. The method of claim 7 wherein the perspectives comprise different perspectives of the scene within a virtual aperture plane.

13. The method of claim 7 wherein the perspectives comprise different perspectives of the scene within different virtual aperture planes.

14. A light field acquisition device comprising:

a photosensor array, configured to acquire light field data representing light rays from a scene via one acquisition, wherein the photosensor array comprises a plurality of photosensors;

processing circuitry, coupled to the photosensor array, configured to identify a first set of at least two positions associated with the light field data acquisition device, wherein each position in the first set corresponds to a virtual aperture and further corresponds to a subset of light rays of the acquired light field data, each subset of light rays coming from a direction, and wherein:

the virtual aperture corresponding to each position in the first set is different from the virtual aperture corresponding to any other position in the first set; and the subset of light rays corresponding to each position in the first set comes from a direction that is different than the direction of the subset of light rays corresponding to any other position in the first set; and a microlens array, configured to direct light rays onto the photosensor array including a subset of light rays corresponding to each identified position, wherein the microlens array comprises a plurality of microlenses and wherein, for each identified position in the first set, each microlens of the microlens array is associated with a subset of photosensors associated with that identified position;

wherein the processing circuitry is further configured to:
for each of at least two of the subsets of light rays corresponding to positions in the first set, generate image data of the scene using light field data for the subset of light rays associated with the corresponding virtual aperture, the light field data being acquired by the corresponding subset of photosensors associated with each microlens of the microlens array, wherein the image data is representative of an image of the scene from a perspective corresponding to the position of the virtual aperture;

generate a first 3D stereo image of the scene using the image data generated from the light field data from at least two of the subsets of photosensors corresponding to positions in the first set, wherein the 3D stereo image has a first 3D effect;

identify a second set of at least two positions associated with the light field data acquisition device, wherein each position in the second set corresponds to a virtual aperture and further corresponds to a subset of light rays of the acquired light field data, each subset of light rays coming from a direction, and wherein at least one of the positions within the second set is different from any of the positions identified previously by the processing circuitry, and wherein:

the virtual aperture corresponding to each position in the second set is different from the virtual aperture corresponding to any other position in the second set;

the subset of light rays corresponding to each position in the second set comes from a direction that is different than the direction of the subset of light rays corresponding to any other position in the second set; and for each identified position in the second set, each microlens of the microlens array is associated with a subset of photosensors associated with that identified position;

for each subset of light rays associated with positions in the second set for which image data was not previously generated, generate image data of the scene using light field data for the subset of light rays associated with the corresponding virtual aperture, the light field data being acquired by the corresponding subset of photosensors associated with each microlens of the microlens array, wherein the image data is representative of an image of the scene from a perspective corresponding to the position of the virtual aperture;

generate a second 3D stereo image of the scene using the image data generated from the light field data from at least two of the subsets of photosensors corresponding to positions in the second set, wherein the second 3D stereo image has a second 3D effect that is different than the first 3D effect;

the device further comprising an output device, coupled to the processing circuitry, configured to output the first and second 3D stereo images.

15. The light field acquisition device of claim 14 wherein the processing circuitry generates each 3D stereo image of the scene by 3D encoding the image data generated from the light field data from the at least two subsets of photosensors.

16. The light field acquisition device of claim 15 wherein 3D encoding of the each image data of the scene comprises 3D encoding the first image data of the scene using a first color channel and encoding the second image data of the scene using a second color channel.

17. The light field acquisition device of claim 14 wherein a relationship between the first subset of photosensors associated with each microlens and the second subset of photosensors associated with each microlens defines a difference between the perspectives within a virtual aperture plane.

18. The light field acquisition device of claim 17 further comprising:
an interface, coupled to the processing circuitry, configured to receive input data which is representative of the relationship between the first subset of photosensors associated with each microlens and the second subset of photosensors associated with each microlens.

19. The light field acquisition device of claim 14 wherein a relationship between the subsets of photosensors associated with each microlens defines a difference between the perspectives within different virtual aperture planes.

20. The light field acquisition device of claim 19 further comprising:
an interface, coupled to the processing circuitry, configured to receive input data which is representative of the relationship between the subsets of photosensors associated with each microlens.

21. A light field acquisition device comprising:
a photosensor array, configured to acquire light field data representing light rays from a scene via one acquisition, wherein the photosensor array comprises a plurality of photosensors;
a physical aperture;
a microlens array, configured to direct light onto the photosensor array, wherein the microlens array comprises a plurality of microlenses and each microlens of the microlens array directs light passing through the physical aperture to a plurality of associated photosensors;
processing circuitry, coupled to the photosensor array, configured to:
identify a first set of at least two positions associated with the light field data acquisition device, wherein each position in the first set corresponds to a virtual aperture within the physical aperture and further corresponds to a subset of light rays of the acquired light field data, each subset of light rays coming from a different direction, and wherein:
the virtual aperture corresponding to each position in the first set is different from the virtual aperture corresponding to any other position in the first set; and
the subset of light rays corresponding to each position in the first set comes from a direction that is different than the direction of the subset of light rays corresponding to any other position in the first set; and
for each of the subsets of light rays corresponding to positions in the first set, generate image data of the scene using light field data which correlates to the corresponding virtual aperture, wherein the image data represents an image of the scene from a perspective corresponding to the position of the corresponding virtual aperture;
generate a first 3D stereo image of the scene using the image data generated from the light field data correlating to at least two of the virtual apertures, wherein the 3D stereo image has a first 3D effect;
identify a second set of at least two positions associated with the light field data acquisition device, wherein each position in the first set corresponds to a virtual aperture within the physical aperture and further corresponds to a subset of light rays of the acquired light field data, each subset of light rays coming from a direction, and wherein at least one of the positions within the second set is different from any of the positions identified previously by the processing circuitry, and wherein:
the virtual aperture corresponding to each position in the second set is different from the virtual aperture corresponding to any other position in the second set; and
the subset of light rays corresponding to each position in the second set comes from a direction that is different than the direction of the subset of light rays corresponding to any other position in the second set;
for each of the subsets of light rays for which image data was not previously generated, generate image data of the scene using light field data which correlates to the corresponding virtual aperture, wherein the image data represents an image of the scene from a perspective corresponding to the position of the corresponding virtual aperture; and
generate a second 3D stereo image of the scene using the image data generated from the light field data correlating to at least two of the virtual apertures, wherein the second 3D stereo image has a second 3D effect different than the first 3D effect; and
an output device, coupled to the processing circuitry, configured to output the first and second 3D stereo images.

22. The light field acquisition system of claim 21 further comprising a user interface configured to receive a user input which is representative of a size, shape and/or location of the first virtual aperture and second virtual aperture.

23. The light field acquisition system of claim 22 wherein the user interface is configured to receive the user input after the photosensors of the photosensor array acquire the light field data corresponding to light from the scene.

24. The light field acquisition system of claim 21 wherein the processing circuitry is configured to generate the 3D stereo image of the scene by encoding the first image data of the scene and the second image data of the scene to provide a 3D effect.

25. The light field acquisition system of claim 24 wherein the processing circuitry is configured to encode the first image data of the scene and the second image data of the scene by encoding the first image data of the scene using a first color channel and encoding the second image data of the scene using a second color channel.

26. The light field acquisition system of claim 21 wherein a relationship between the first virtual aperture and the second virtual aperture defines a difference between the first perspective and the second perspective within a virtual aperture plane.

27. The light field acquisition system of claim 21 wherein a relationship between the first virtual aperture and the second virtual aperture defines a difference between the first perspective and the second perspective within different virtual aperture planes.

28. The light field acquisition system of claim 21 further comprising:
an interface, coupled to the processing circuitry, configured to receive input data of at least one of a size and a position of at least one of the first virtual aperture and the second virtual aperture.

29. The method of claim 1, wherein the virtual apertures represent positions within a single physical aperture.

30. The method of claim 1, wherein one of the positions within the second set is unchanged from a corresponding position in the first set.

31. The method of claim 1, wherein all of the positions of the second set are different from any of the positions of the first set.

32. The method of claim 1, wherein the distance between the virtual apertures corresponding to positions in the first set is different from the distance between the virtual apertures corresponding to positions in the second set.

33. The method of claim 1, wherein the angle of a line connecting the centers of the virtual apertures corresponding to positions in the first set is different from the angle of a line connecting the centers of the virtual apertures corresponding to positions in the second set.

34. The method of claim 1, wherein:
   identifying a first set of at least two positions comprises identifying positions corresponding to virtual apertures selected from a plurality of available virtual apertures; and
   identifying a first set of at least two positions comprises identifying positions corresponding to at least one different virtual aperture selected from the plurality of available virtual apertures.

35. The method of claim 1, wherein outputting the first and second 3D stereo images comprises generating and outputting video comprising a transition between the first and second 3D stereo images.

* * * * *